United States Patent
Shibayama

[11] Patent Number: 5,633,760
[45] Date of Patent: May 27, 1997

[54] ZOOM LENS

[75] Inventor: Atsushi Shibayama, Tokyo, Japan

[73] Assignee: Nikon Corporation, Tokyo, Japan

[21] Appl. No.: 379,928

[22] Filed: Jan. 27, 1995

[30] Foreign Application Priority Data

| Feb. 3, 1994 | [JP] | Japan | 6-011879 |
| Feb. 9, 1994 | [JP] | Japan | 6-015058 |
| Feb. 22, 1994 | [JP] | Japan | 6-024539 |
| Mar. 28, 1994 | [JP] | Japan | 6-057302 |

[51] Int. Cl.$^6$ .................................................. G02B 15/14
[52] U.S. Cl. ............................ 359/692; 359/684; 359/689
[58] Field of Search .................................. 359/692, 689, 359/686, 684

[56] References Cited

U.S. PATENT DOCUMENTS

| 4,679,913 | 7/1987 | Sato et al. | 359/692 |
| 4,848,883 | 7/1989 | Maruyama | 359/684 |
| 4,929,069 | 5/1990 | Shibayama | 359/692 |
| 5,126,884 | 6/1992 | Sato | 359/692 |
| 5,463,499 | 10/1995 | Ito et al. | 359/692 |

FOREIGN PATENT DOCUMENTS

| 2-73322 | 3/1990 | Japan . |
| 3-240013 | 10/1991 | Japan . |
| 5-19166 | 1/1993 | Japan . |
| 5-232383 | 9/1993 | Japan . |

*Primary Examiner*—Scott J. Sugarman
*Attorney, Agent, or Firm*—Shapiro and Shapiro

[57] ABSTRACT

There is provided a wide-angle zoom lens including in the following order from the object side: a first lens group having a positive refractive power, the first lens group consisting of, in the following order from the object side, a front lens subgroup which consists of a negative lens, and a rear lens subgroup which consists of at least one positive lens and at least one negative lens; and a second lens group having a negative refractive power, wherein an air gap between the first and second lens groups decreases upon zooming from a wide-angle end to a telephoto end, and the zoom lens satisfies the following conditions:

$$0.09 \leq D2/fW \leq 0.4$$

$$-0.6 \leq Q1 \leq 0.5$$

where fW is the focal length of the entire zoom lens system at the wide-angle end, D2 is the air gap between the front and rear lens subgroups, and Q1 is the shape factor of the negative lens in the front lens subgroup, the shape factor Q1 being defined by $Q1=(R2+R1)/(R2-R1)$, where R1 is the radius of curvature of an object-side lens surface of the negative lens in the front lens subgroup, and R2 is the radius of curvature of an image-side lens surface of the negative lens in the front lens subgroup.

47 Claims, 84 Drawing Sheets

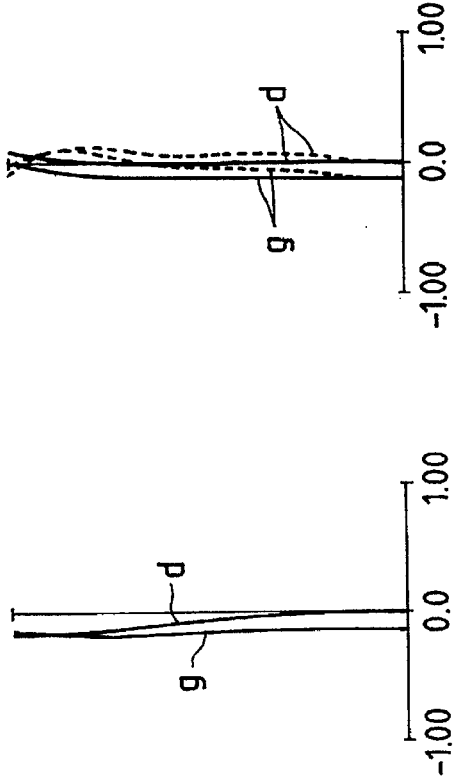

FIG. 11A SPHERICAL ABERRATION
FIG. 11B ASTIGMATISM
FIG. 11C DISTORTION
FIG. 11D CHROMATIC ABERRATION OF MAGNIFICATION

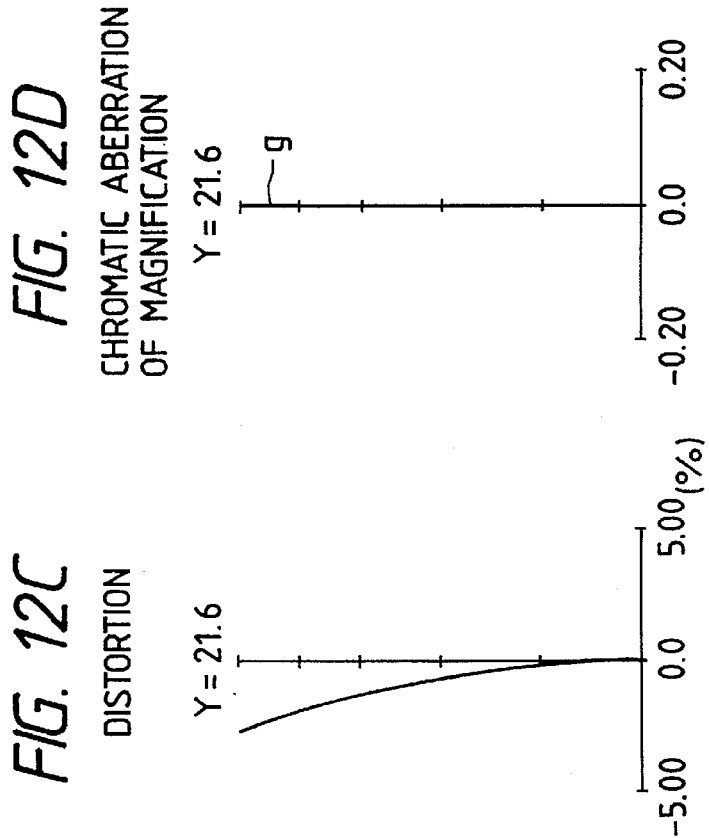

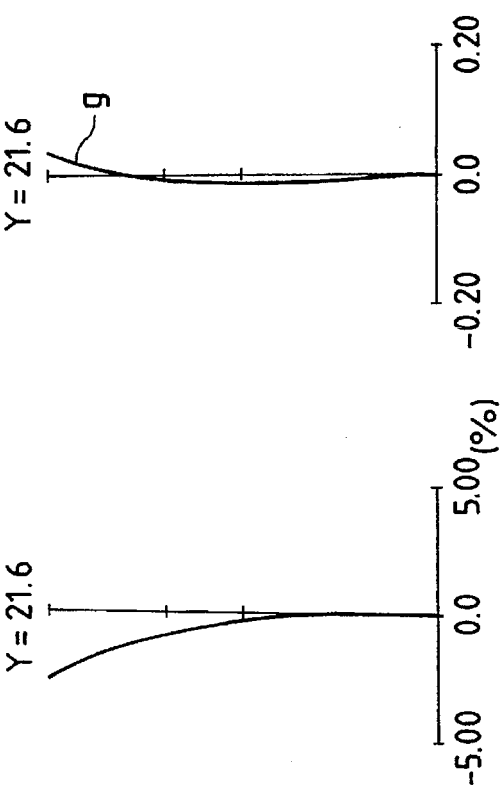
FIG. 13A SPHERICAL ABERRATION
FIG. 13B ASTIGMATISM
FIG. 13C DISTORTION
FIG. 13D CHROMATIC ABERRATION OF MAGNIFICATION

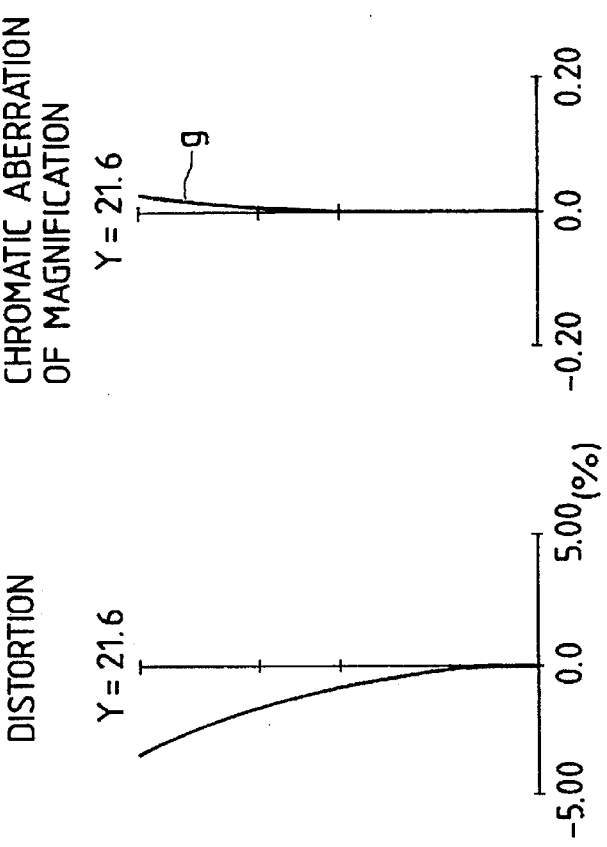

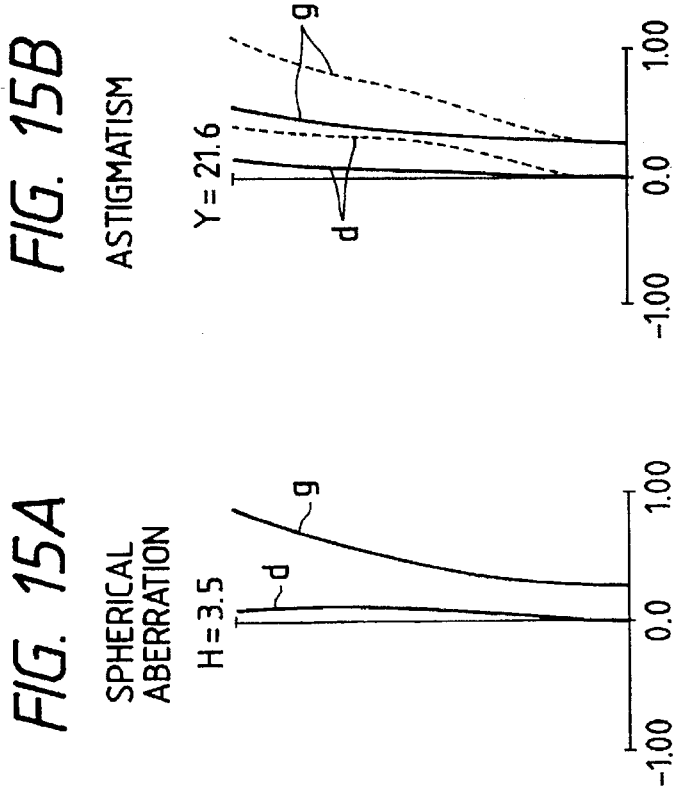

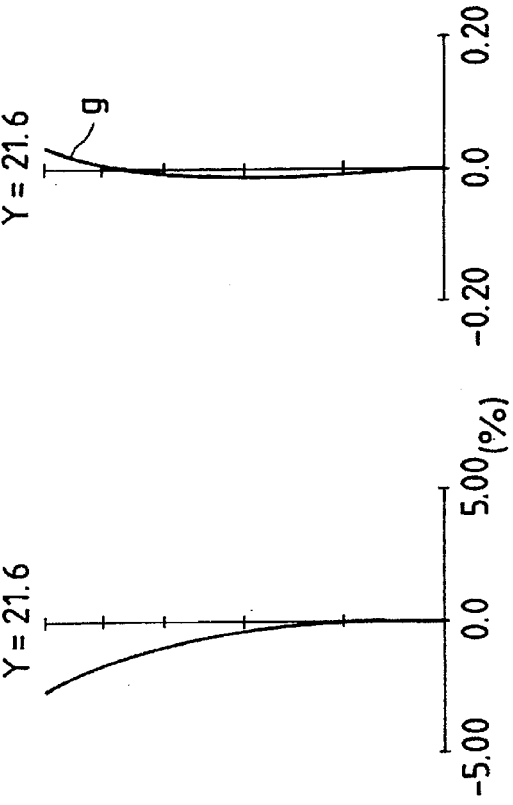
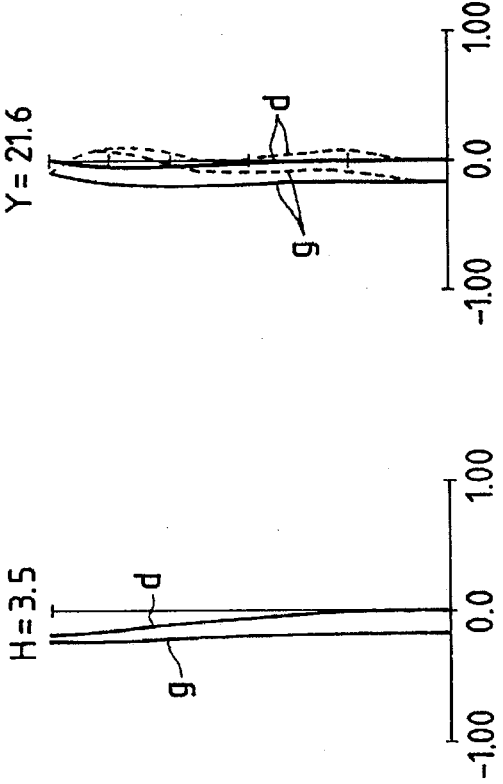
FIG. 16A SPHERICAL ABERRATION
FIG. 16B ASTIGMATISM
FIG. 16C DISTORTION
FIG. 16D CHROMATIC ABERRATION OF MAGNIFICATION

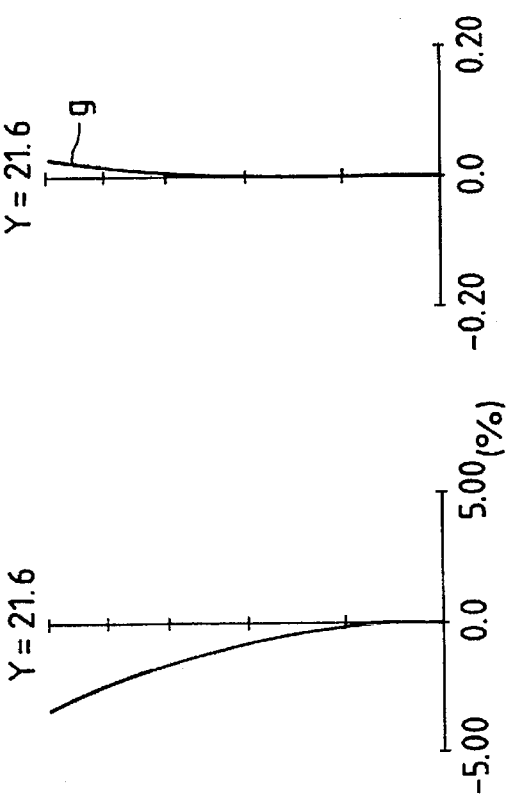

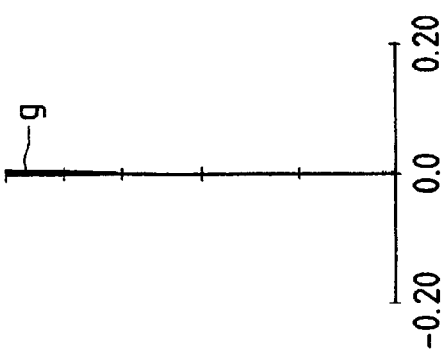
FIG. 18A SPHERICAL ABERRATION
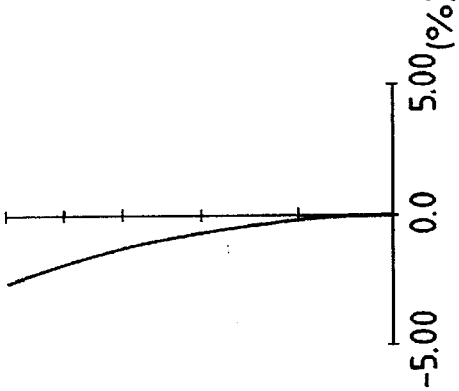
FIG. 18B ASTIGMATISM
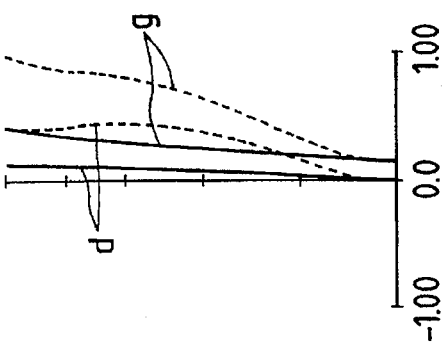
FIG. 18C DISTORTION
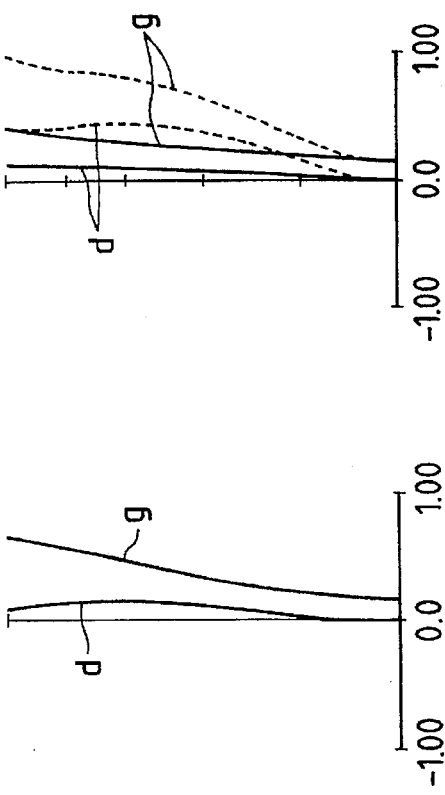
FIG. 18D CHROMATIC ABERRATION OF MAGNIFICATION

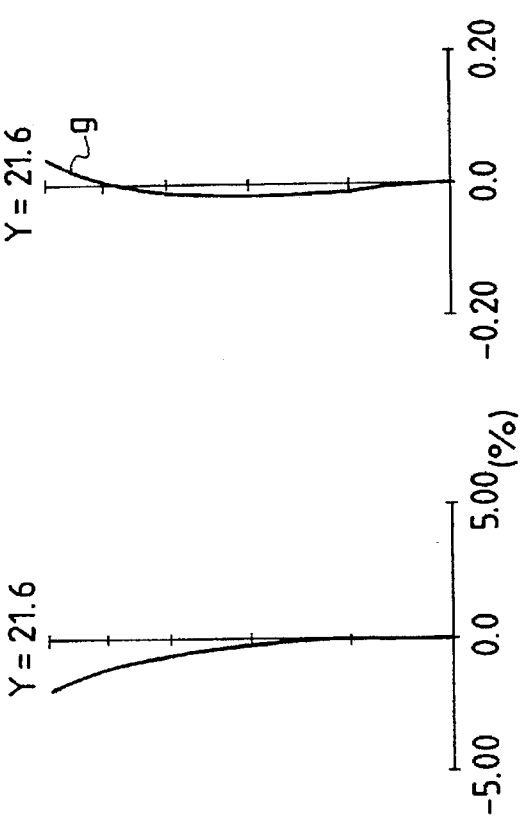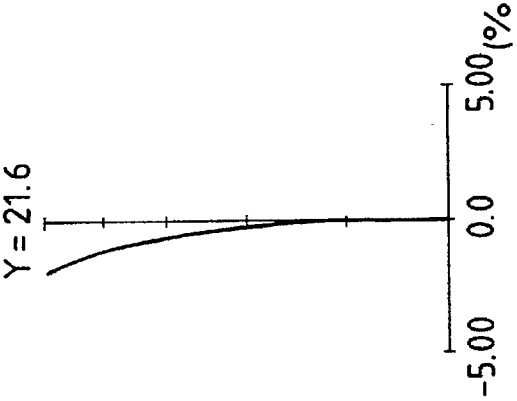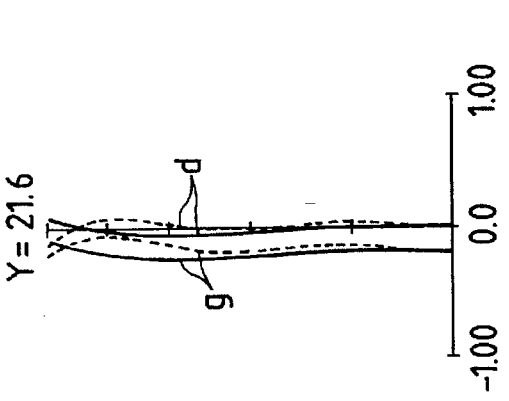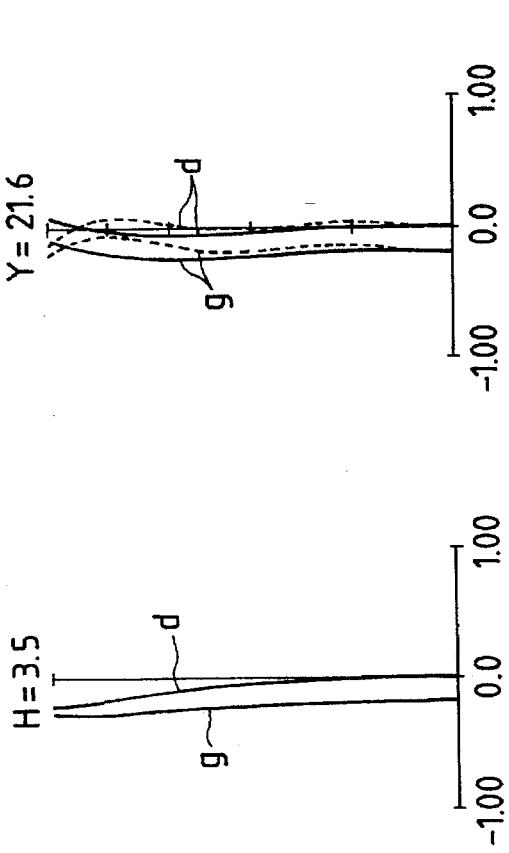

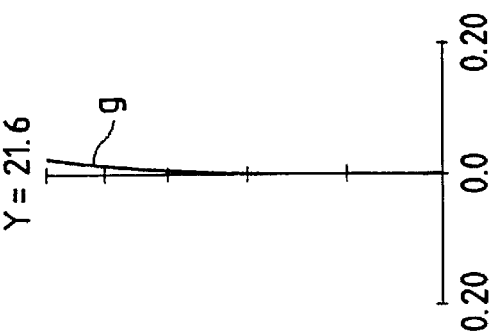
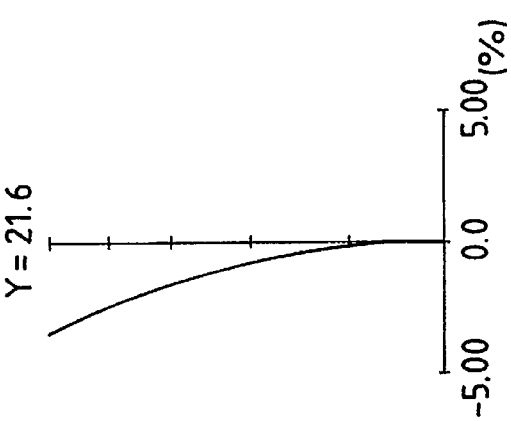
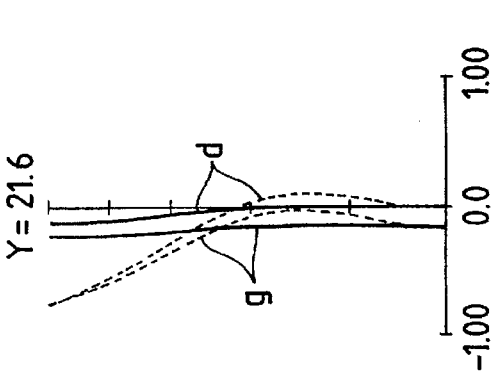
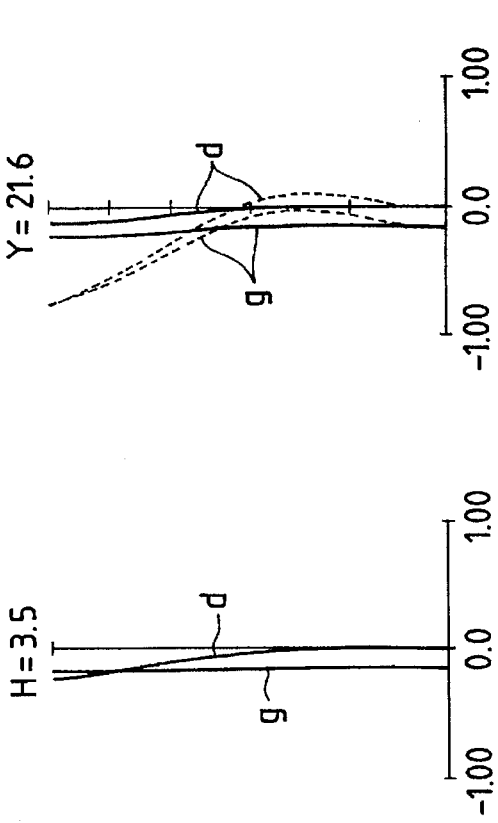

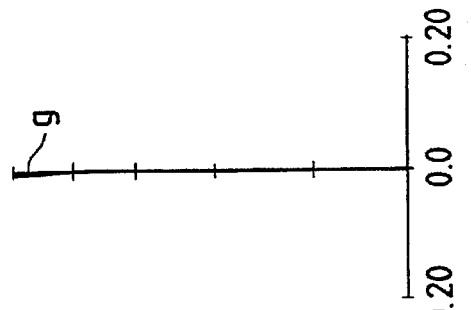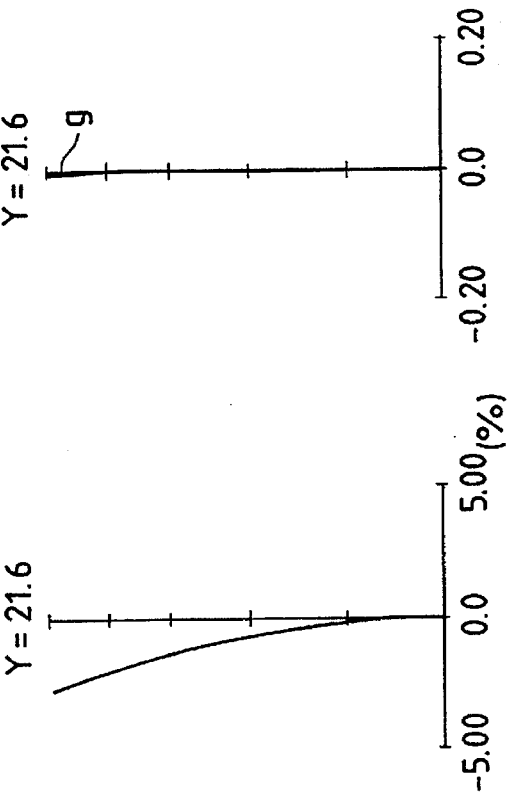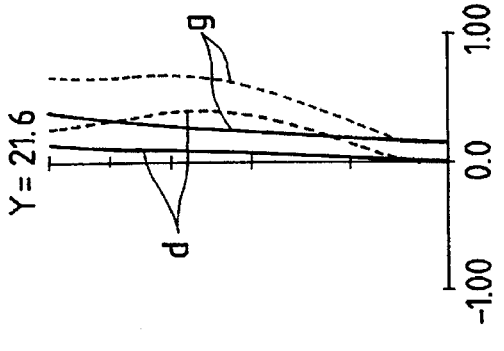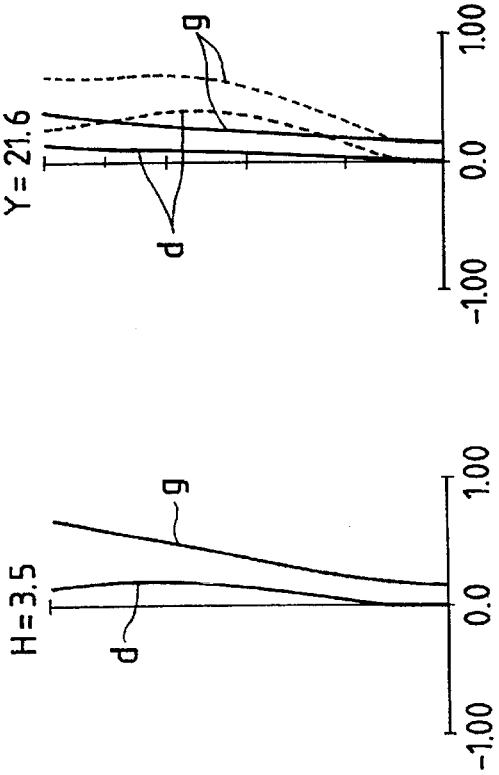
FIG. 21A SPHERICAL ABERRATION
FIG. 21B ASTIGMATISM
FIG. 21C DISTORTION
FIG. 21D CHROMATIC ABERRATION OF MAGNIFICATION

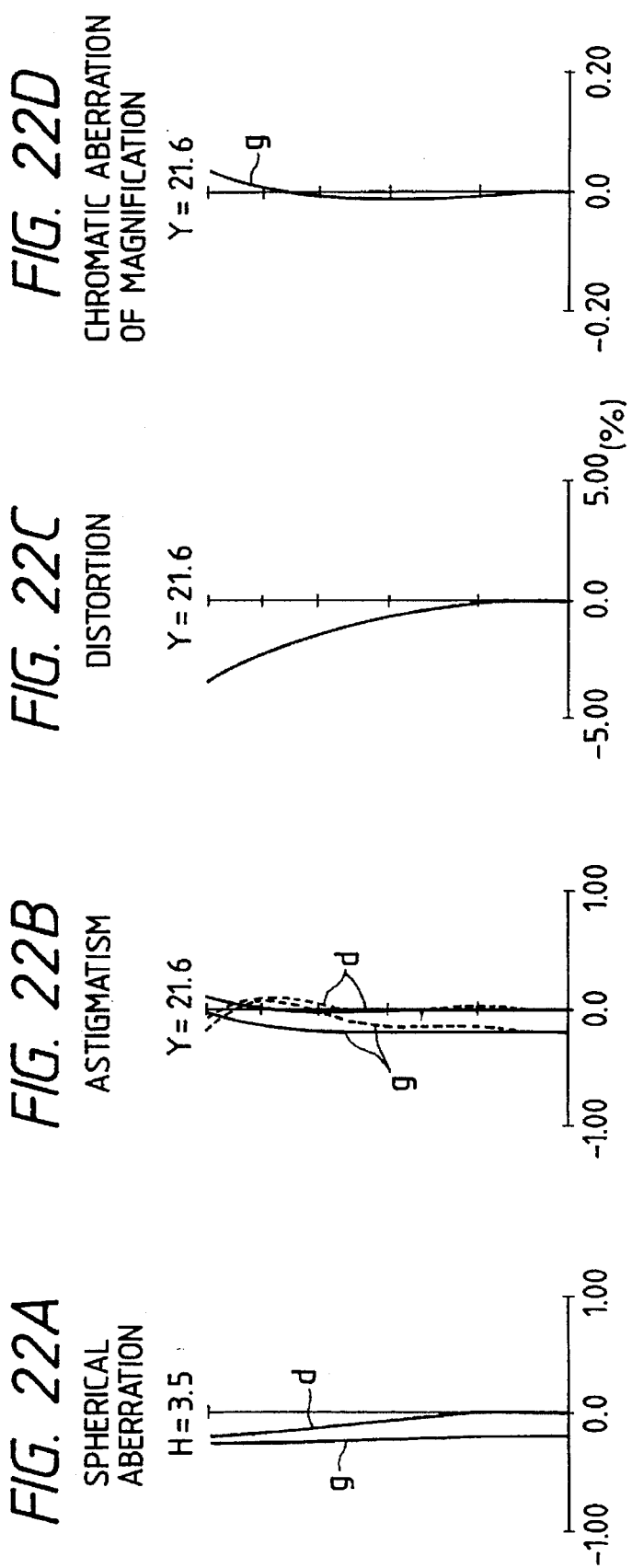
FIG. 22A SPHERICAL ABERRATION
FIG. 22B ASTIGMATISM
FIG. 22C DISTORTION
FIG. 22D CHROMATIC ABERRATION OF MAGNIFICATION

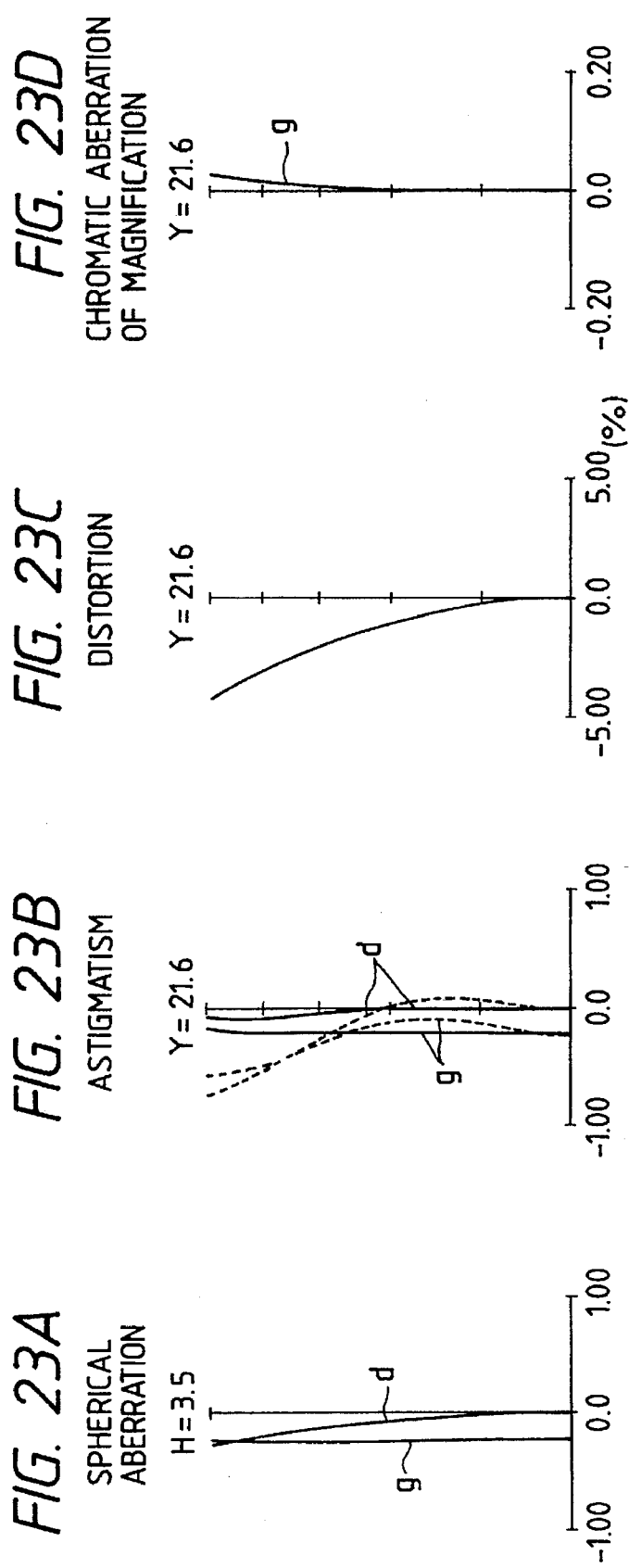

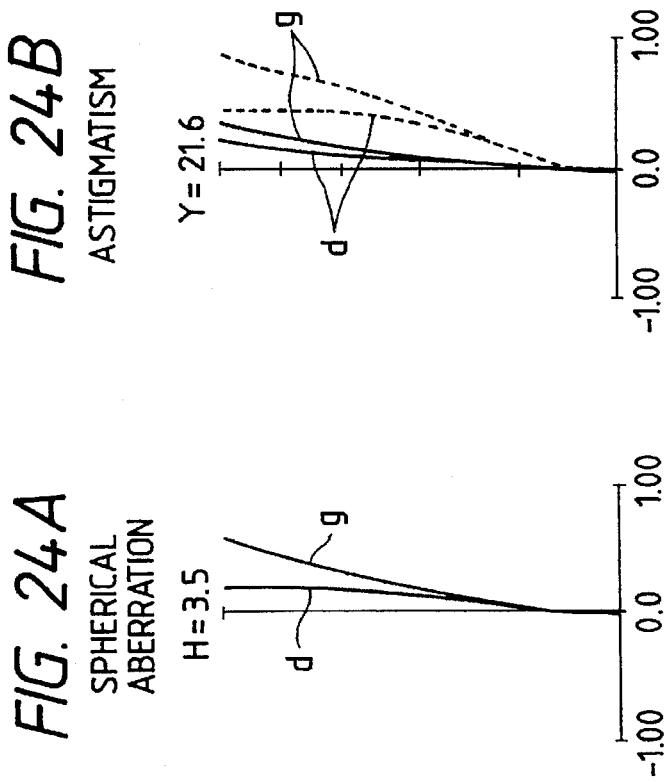

CHROMATIC ABERRATION
OF MAGNIFICATION

DISTORTION

ASTIGMATISM

SPHERICAL
ABERRATION

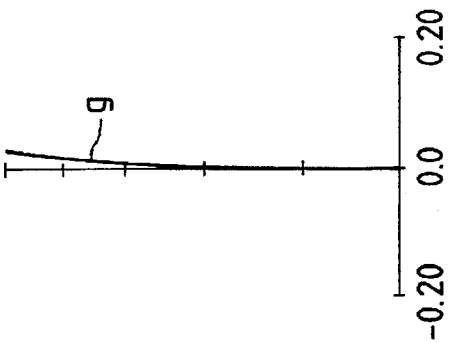
FIG. 26D CHROMATIC ABERRATION OF MAGNIFICATION
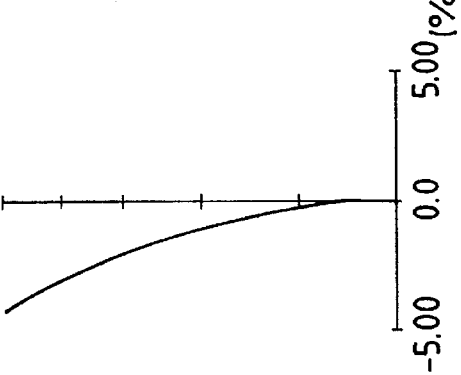
FIG. 26C DISTORTION
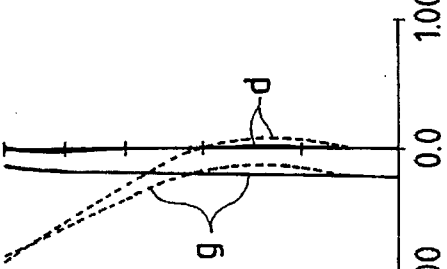
FIG. 26B ASTIGMATISM
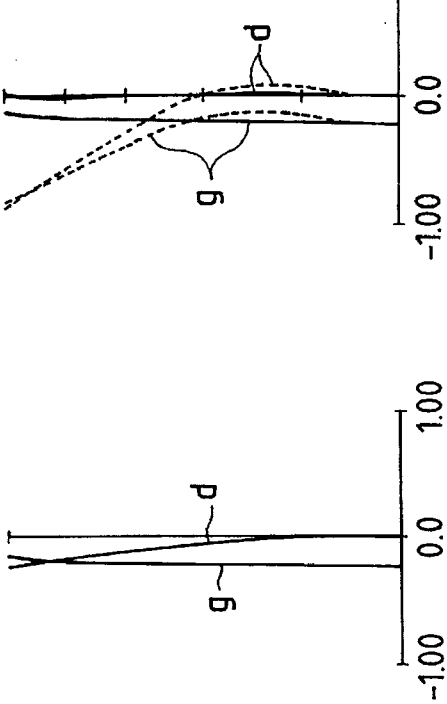
FIG. 26A SPHERICAL ABERRATION

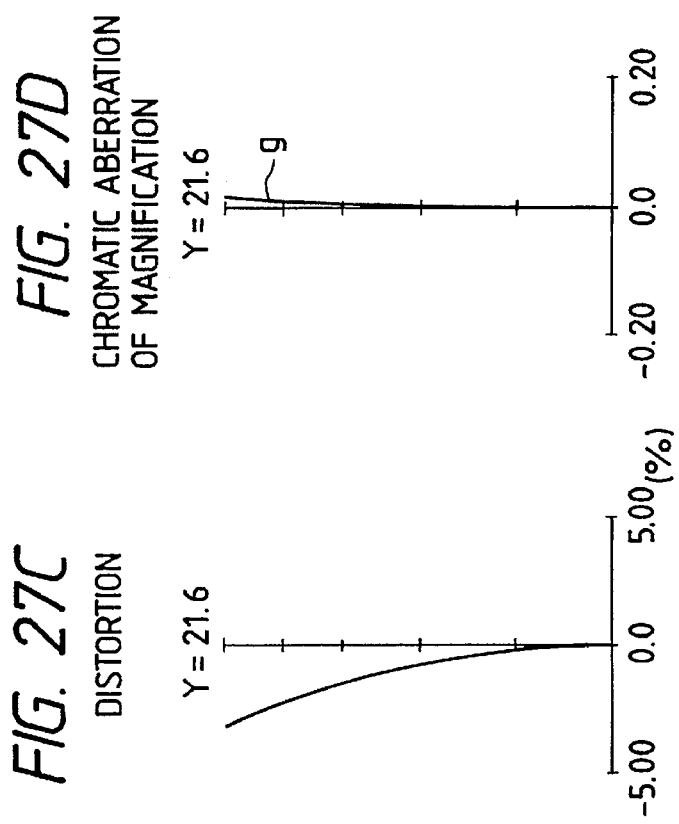
FIG. 27A SPHERICAL ABERRATION
FIG. 27B ASTIGMATISM
FIG. 27C DISTORTION
FIG. 27D CHROMATIC ABERRATION OF MAGNIFICATION

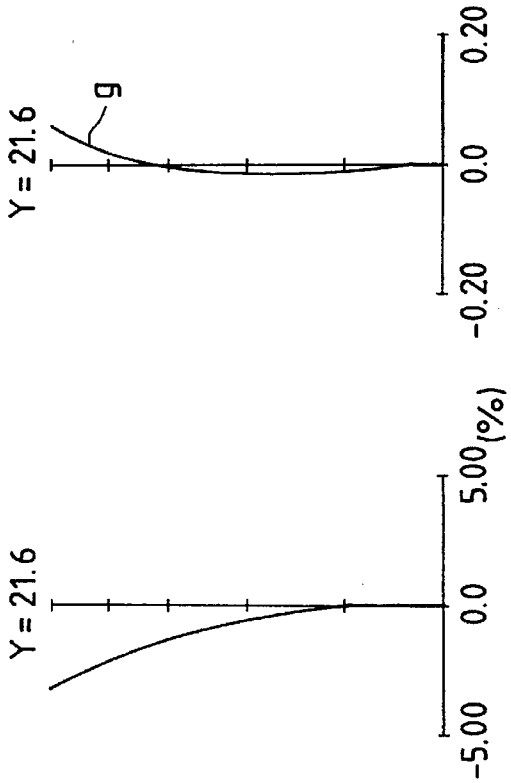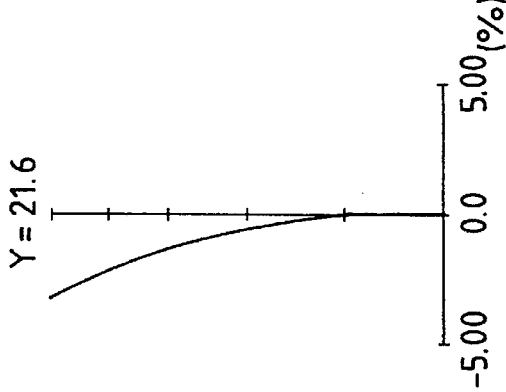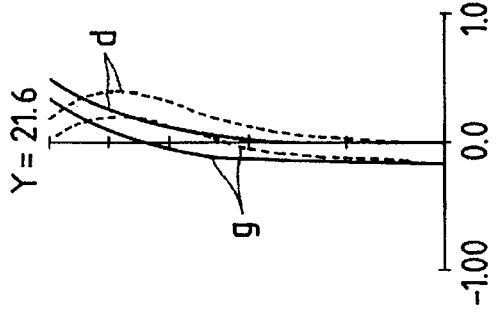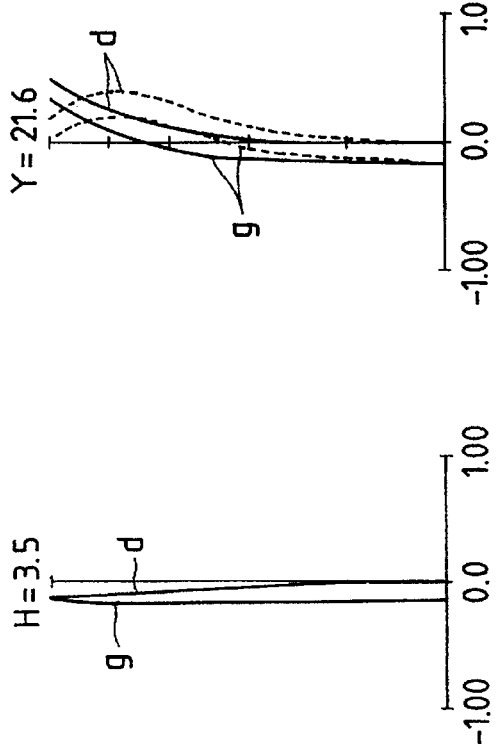

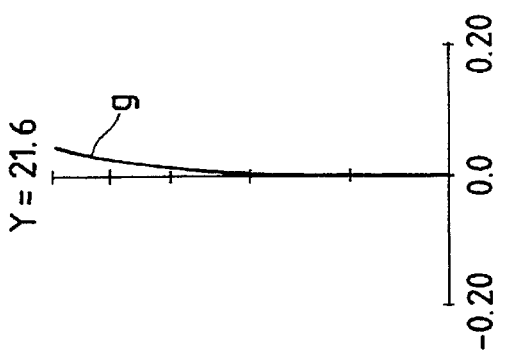
FIG. 29A SPHERICAL ABERRATION
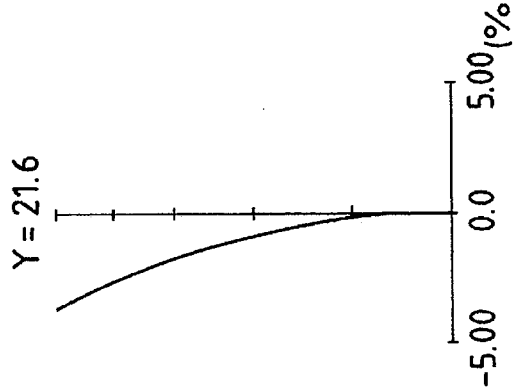
FIG. 29B ASTIGMATISM
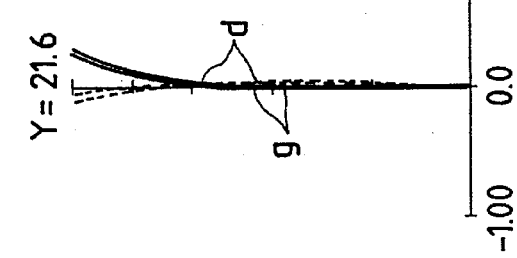
FIG. 29C DISTORTION
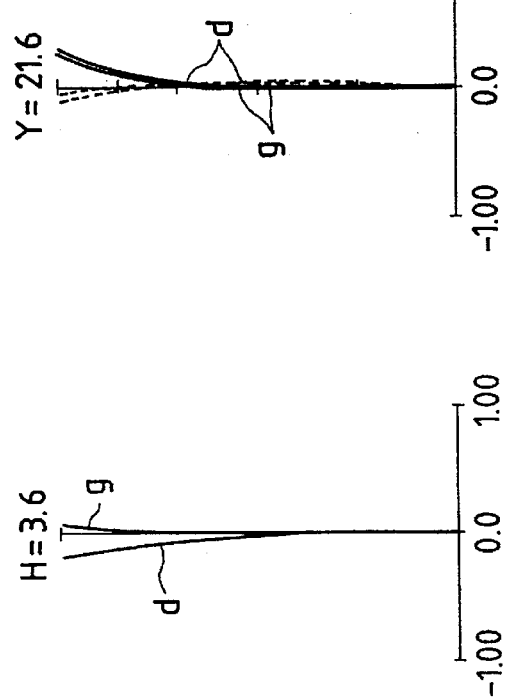
FIG. 29D CHROMATIC ABERRATION OF MAGNIFICATION

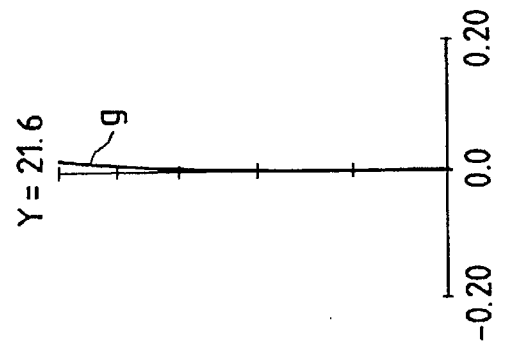
FIG. 30A SPHERICAL ABERRATION
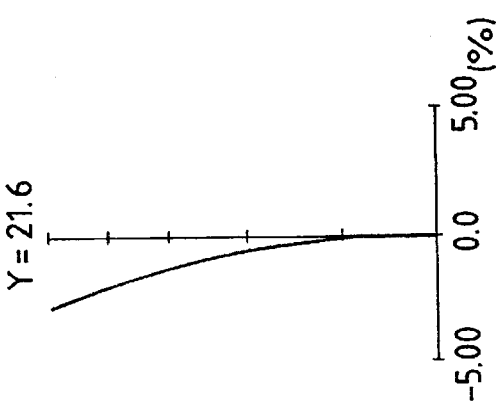
FIG. 30B ASTIGMATISM
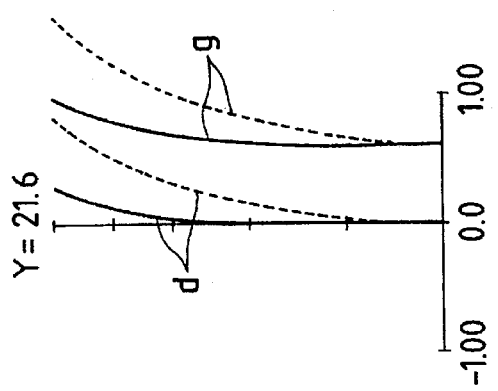
FIG. 30C DISTORTION
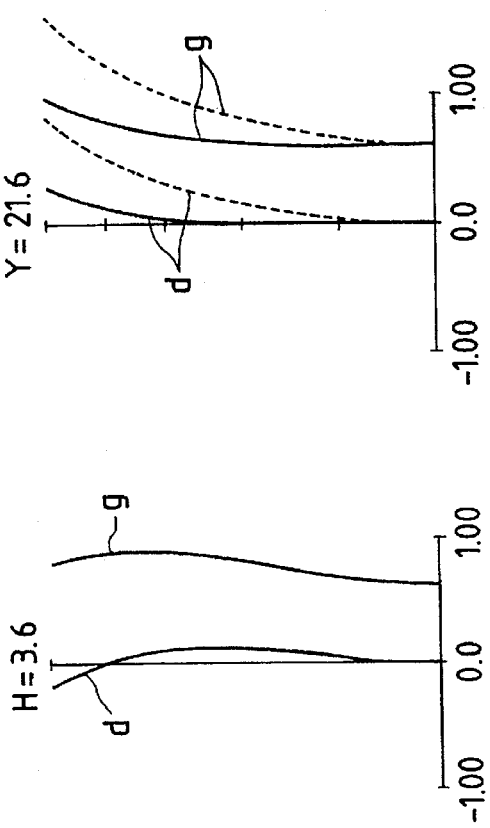
FIG. 30D CHROMATIC ABERRATION OF MAGNIFICATION

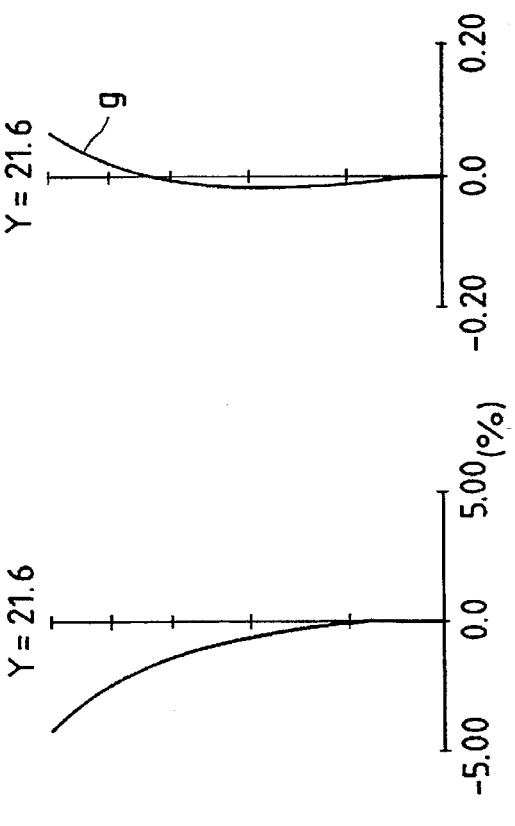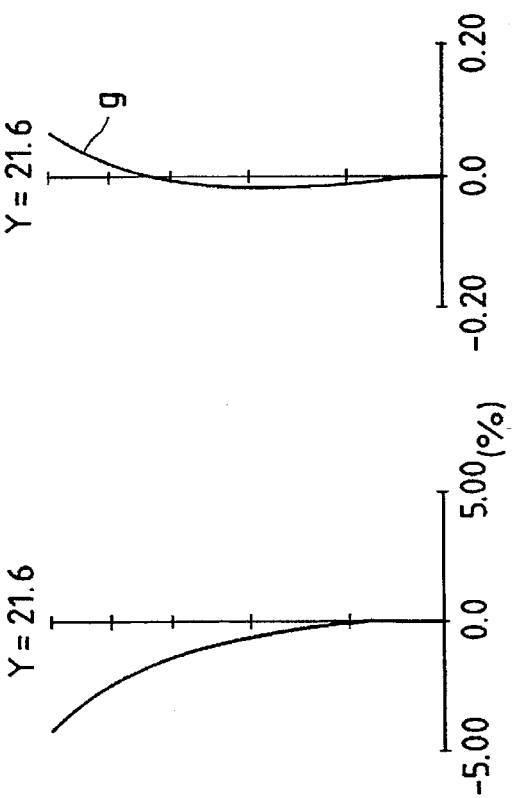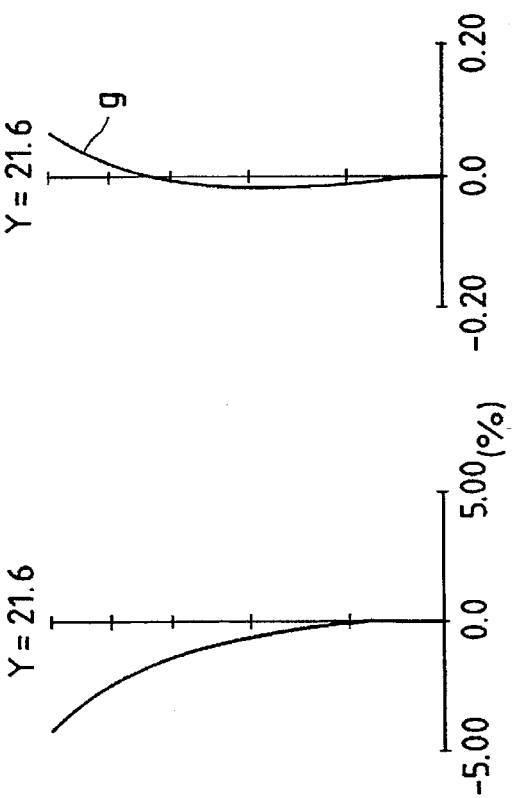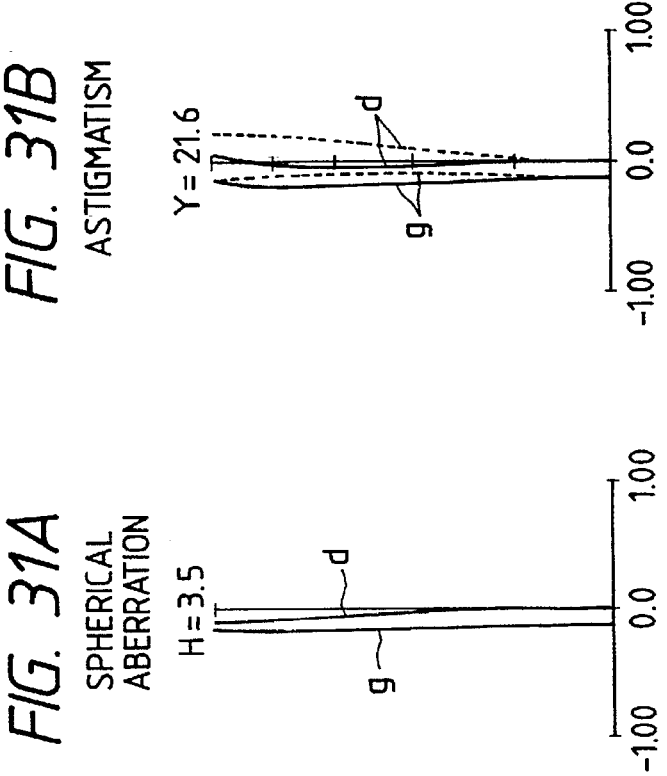

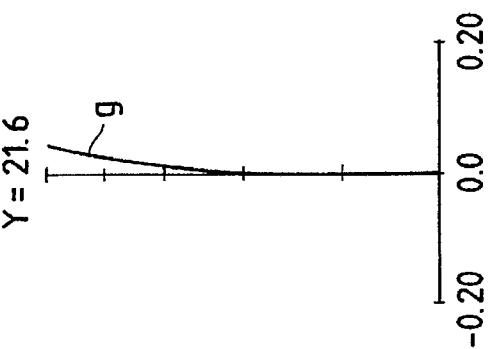
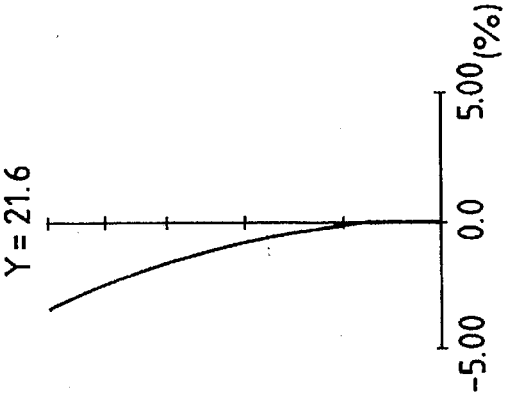
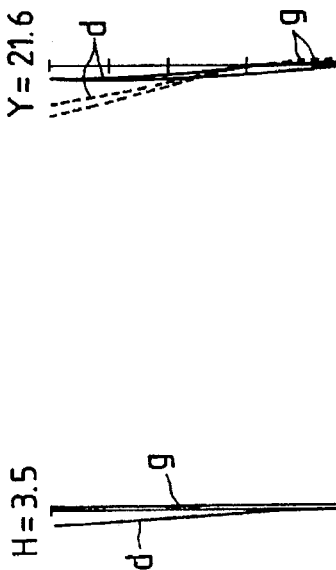
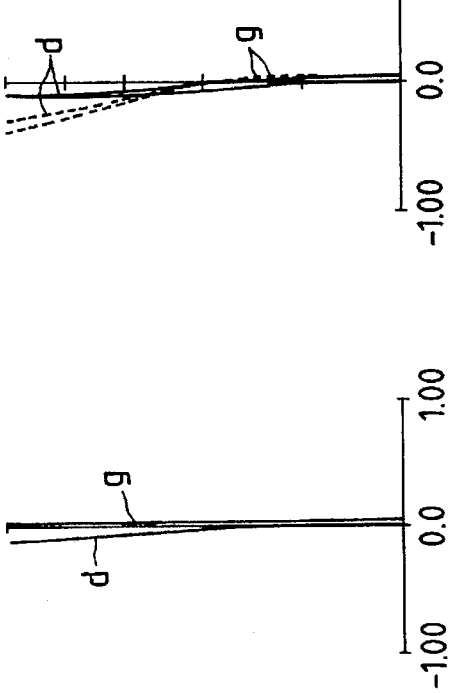
FIG. 32A SPHERICAL ABERRATION
FIG. 32B ASTIGMATISM
FIG. 32C DISTORTION
FIG. 32D CHROMATIC ABERRATION OF MAGNIFICATION

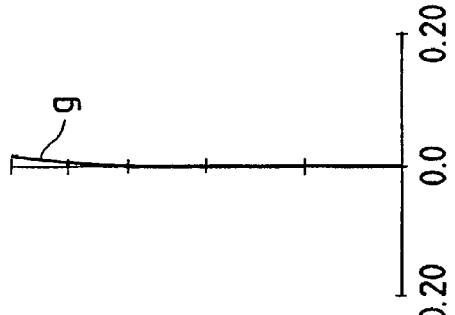
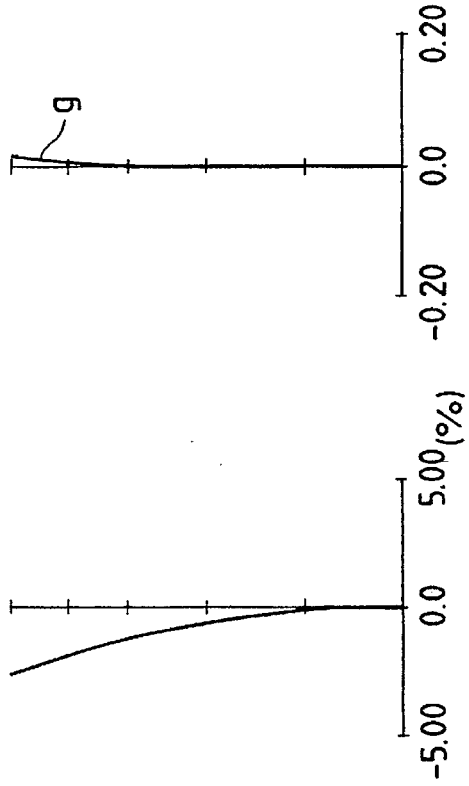
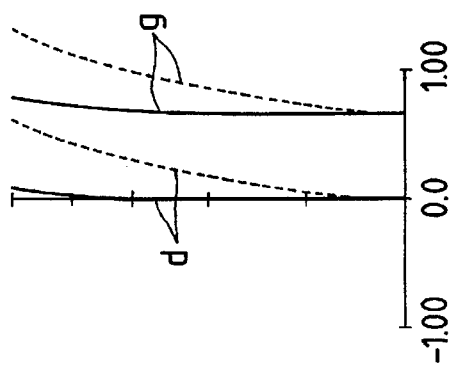
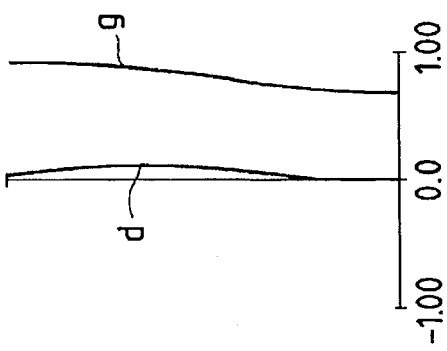

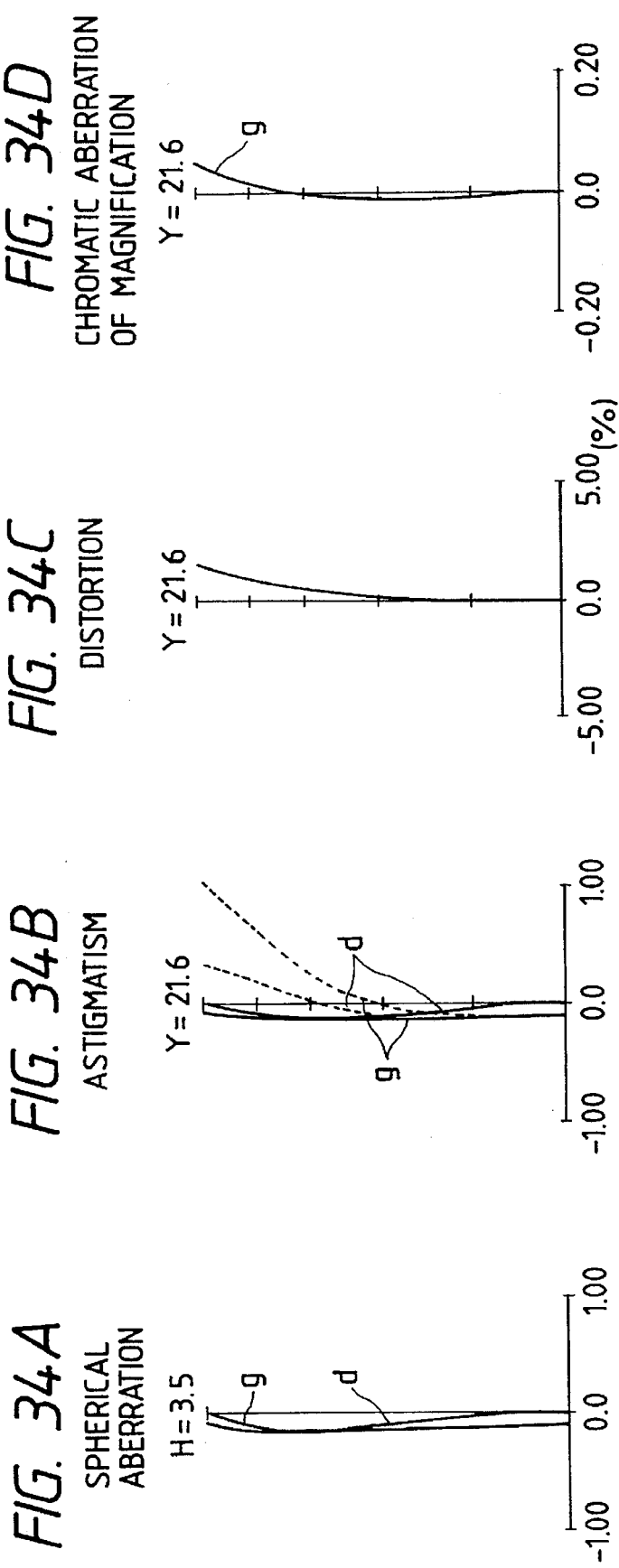

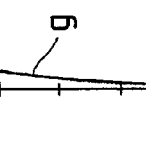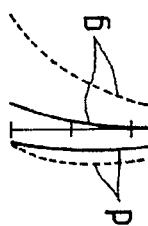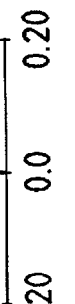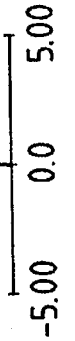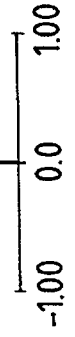
FIG. 35A SPHERICAL ABERRATION
FIG. 35B ASTIGMATISM
FIG. 35C DISTORTION
FIG. 35D CHROMATIC ABERRATION OF MAGNIFICATION

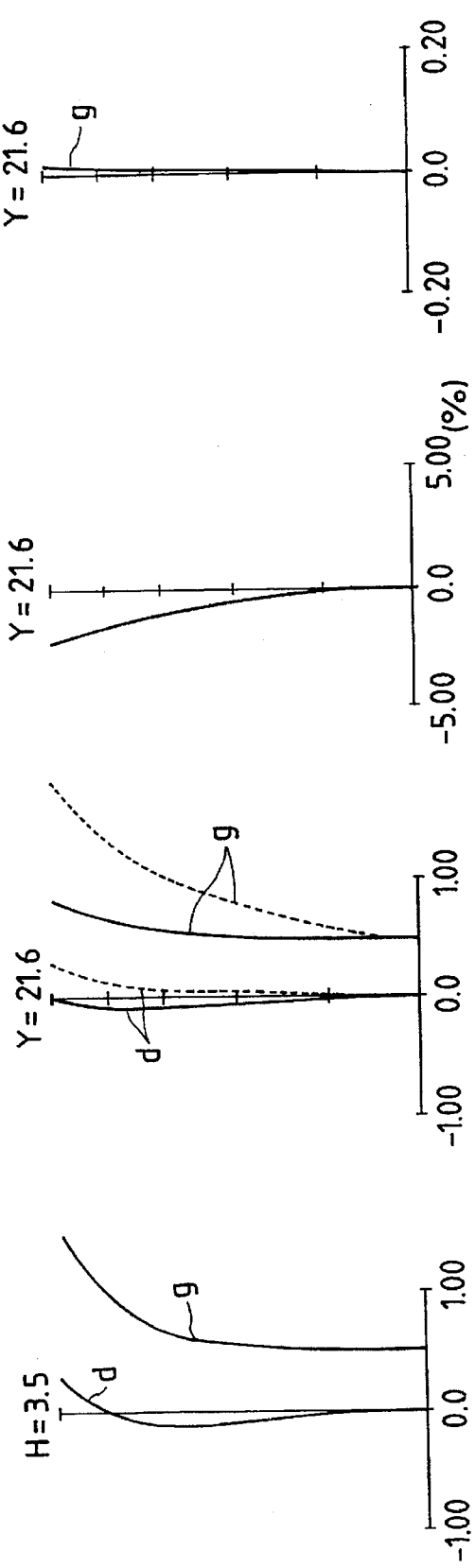

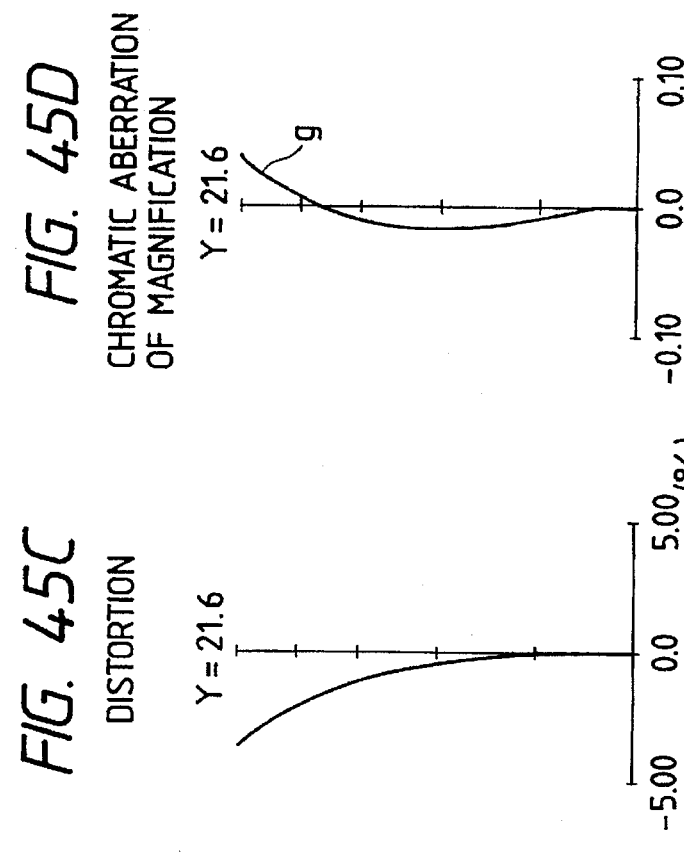
FIG. 45A SPHERICAL ABERRATION
FIG. 45B ASTIGMATISM
FIG. 45C DISTORTION
FIG. 45D CHROMATIC ABERRATION OF MAGNIFICATION

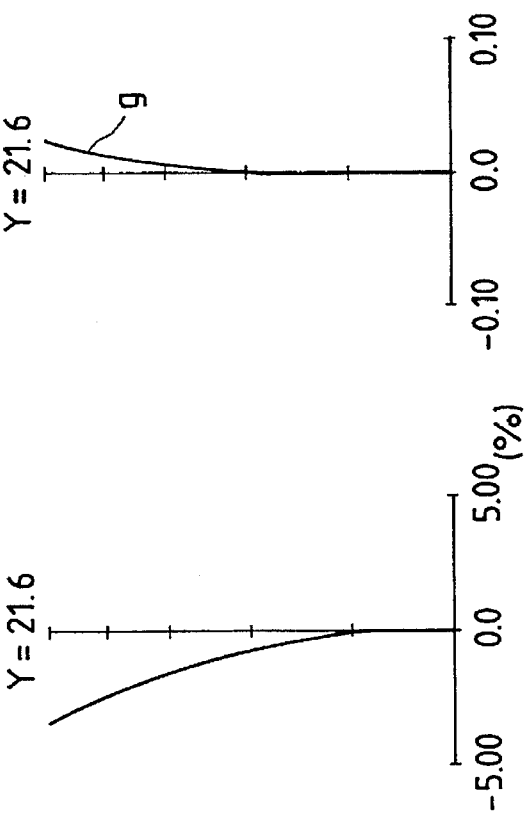
FIG. 46A SPHERICAL ABERRATION
FIG. 46B ASTIGMATISM
FIG. 46C DISTORTION
FIG. 46D CHROMATIC ABERRATION OF MAGNIFICATION

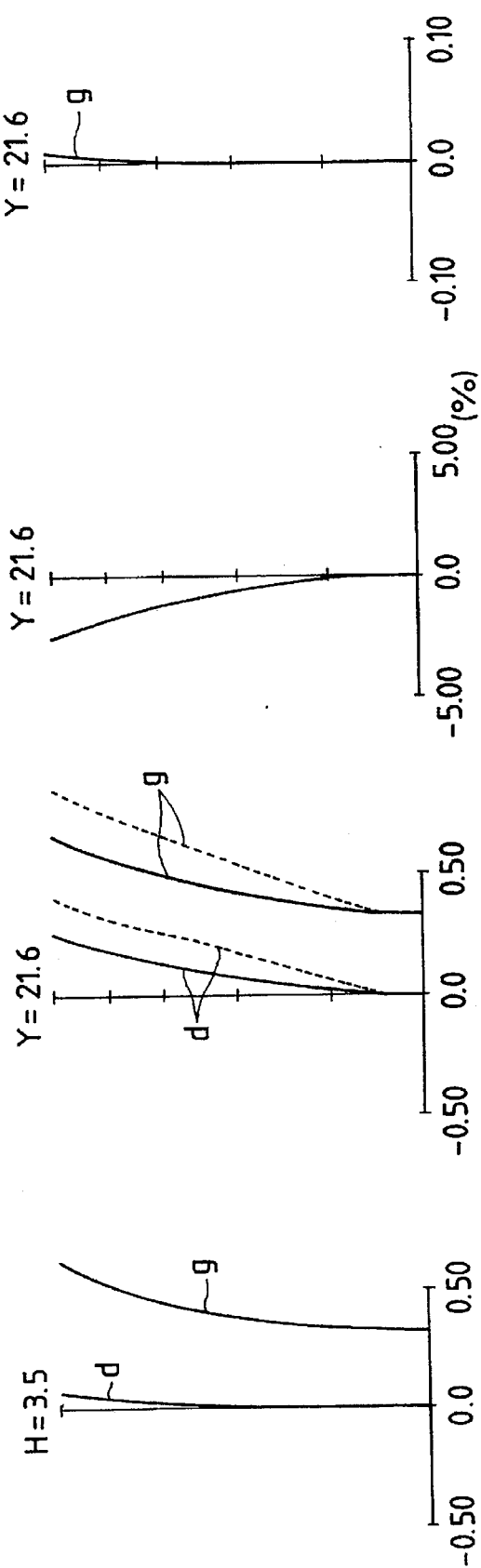

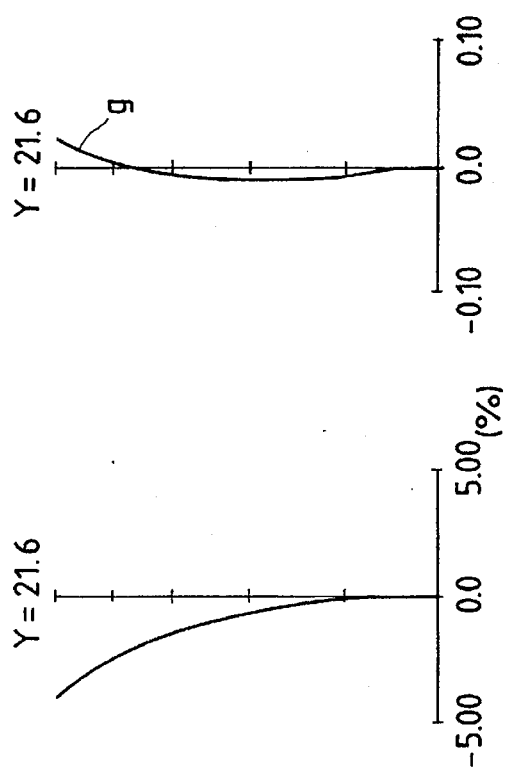
FIG. 48D CHROMATIC ABERRATION OF MAGNIFICATION
FIG. 48C DISTORTION
FIG. 48B ASTIGMATISM
FIG. 48A SPHERICAL ABERRATION

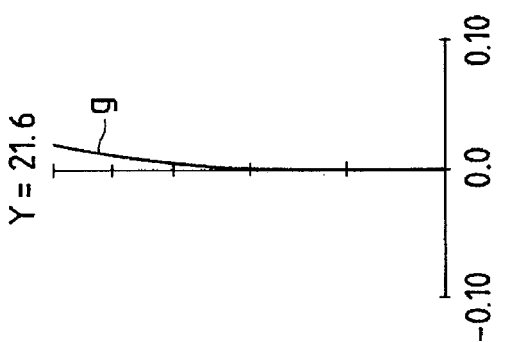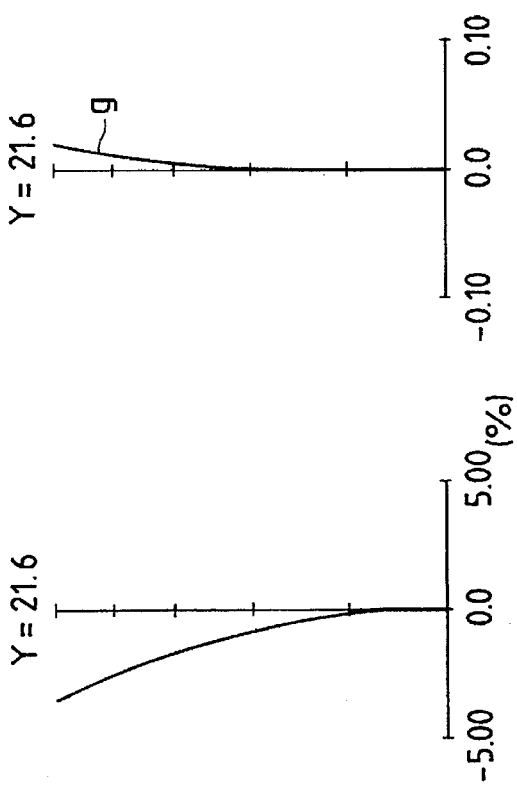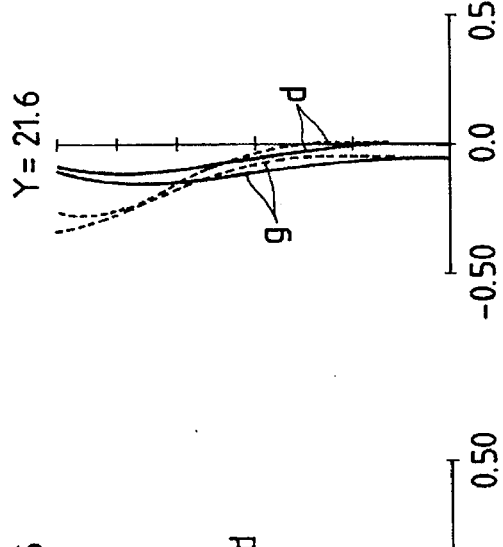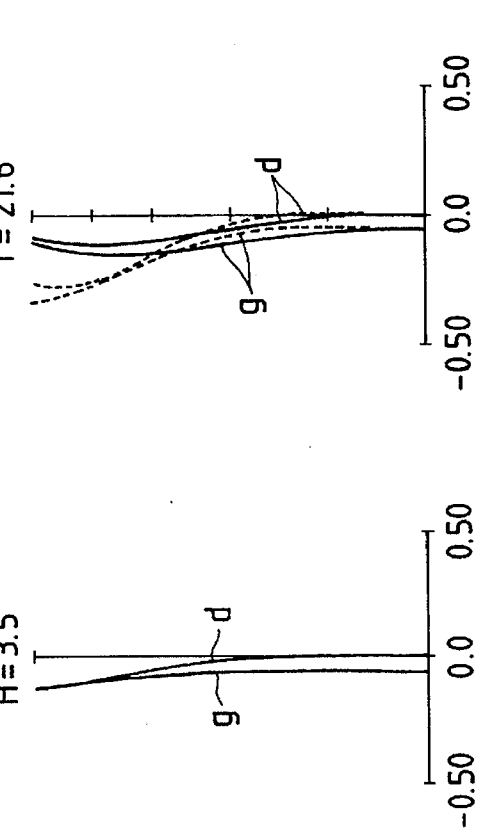

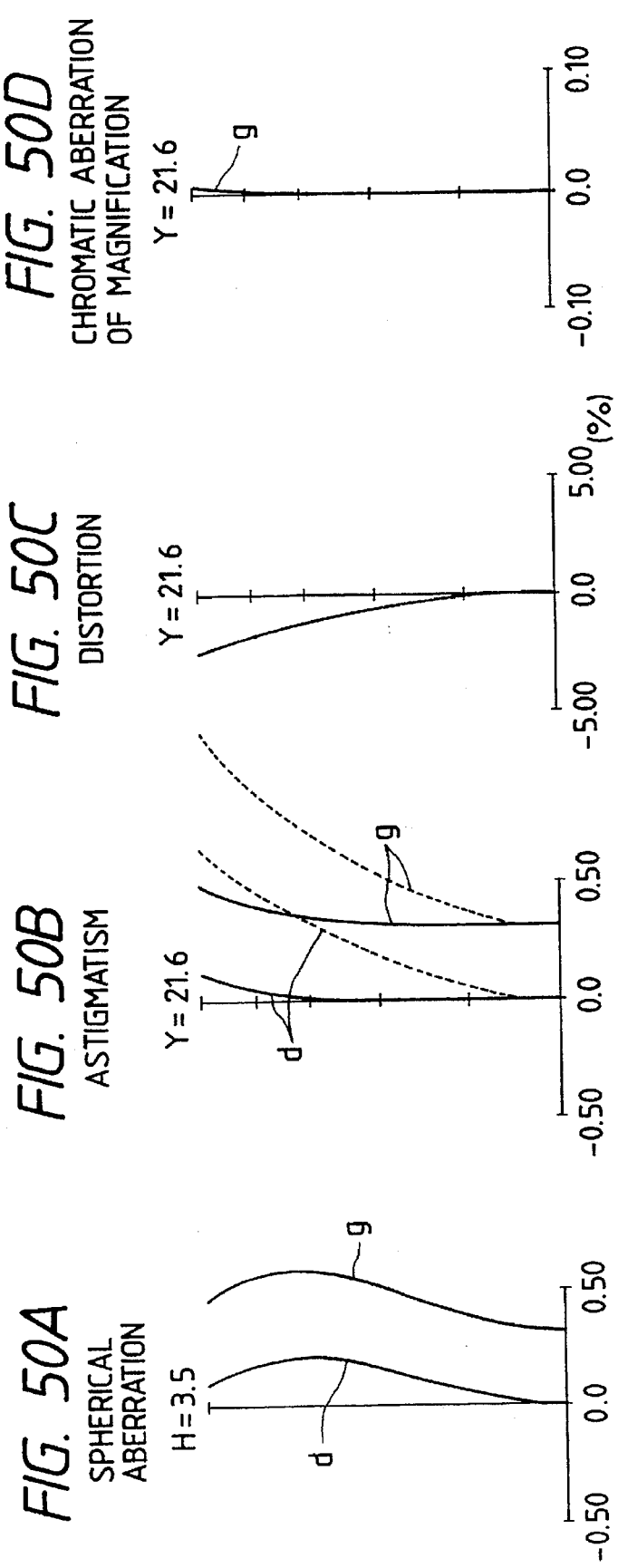

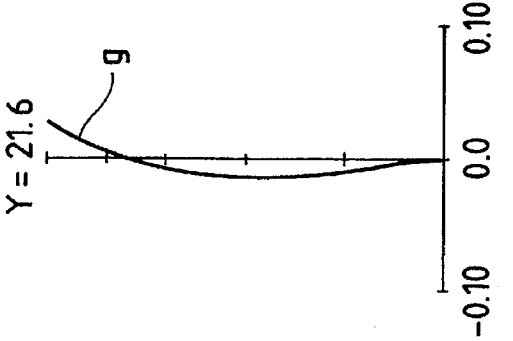
FIG. 51D CHROMATIC ABERRATION OF MAGNIFICATION Y=21.6
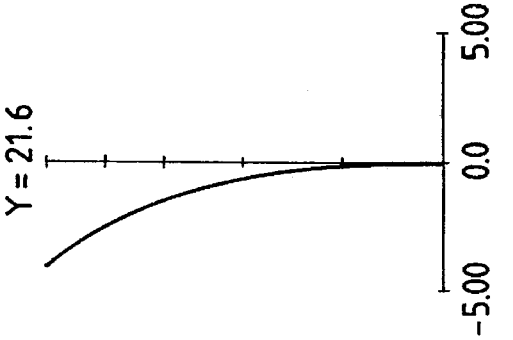
FIG. 51C DISTORTION Y=21.6
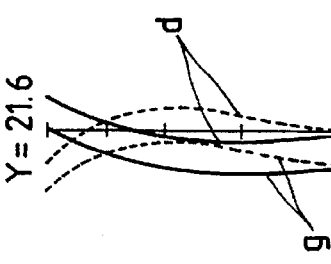
FIG. 51B ASTIGMATISM Y=21.6

FIG. 51A SPHERICAL ABERRATION H=3.5

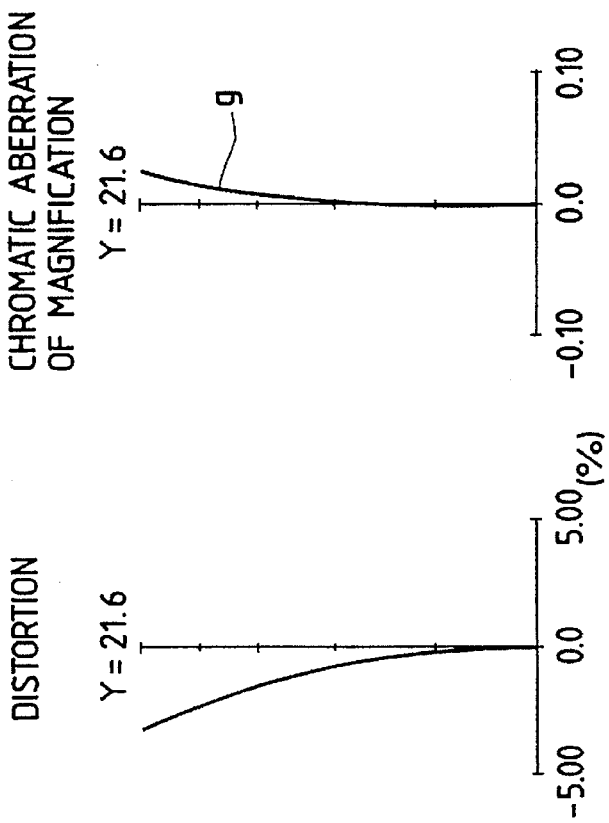
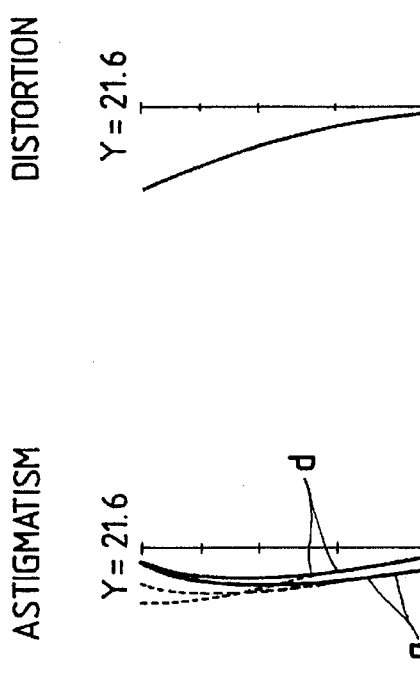
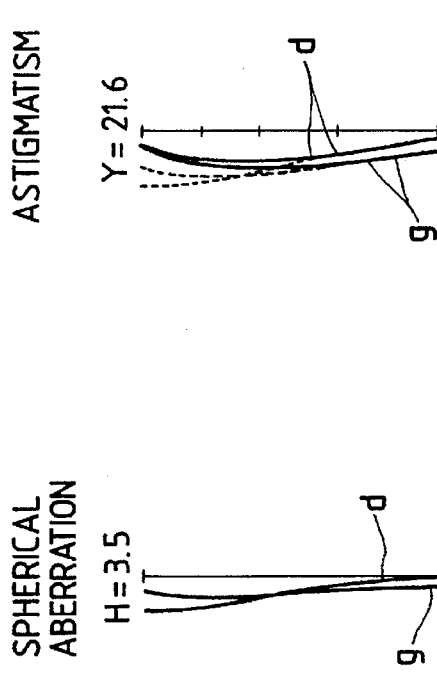

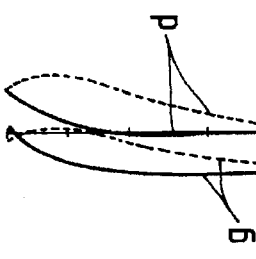
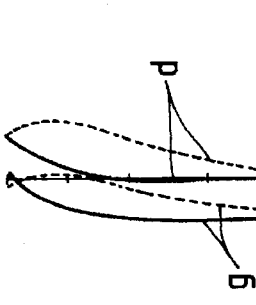
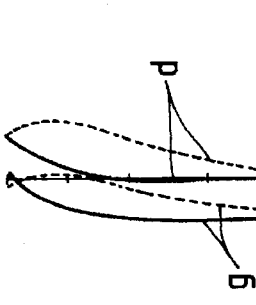
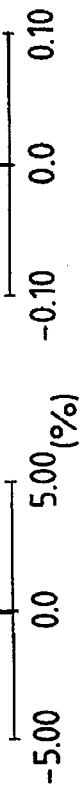

 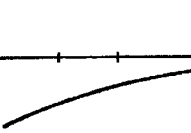 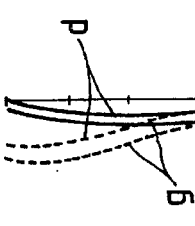 
 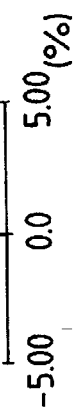 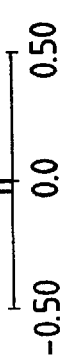 
FIG. 55A SPHERICAL ABERRATION
FIG. 55B ASTIGMATISM
FIG. 55C DISTORTION
FIG. 55D CHROMATIC ABERRATION OF MAGNIFICATION SPHERICAL ABERRATION  ASTIGMATISM  DISTORTION  CHROMATIC ABERRATION OF MAGNIFICATION

FIG. 57A  FIG. 57B  FIG. 57C  FIG. 57D

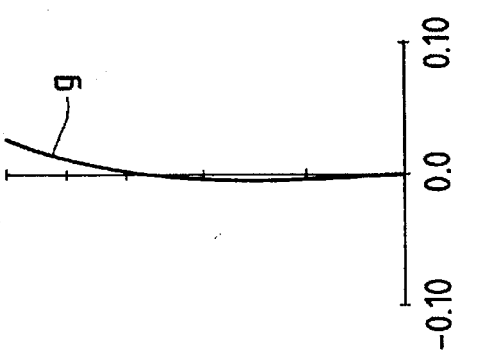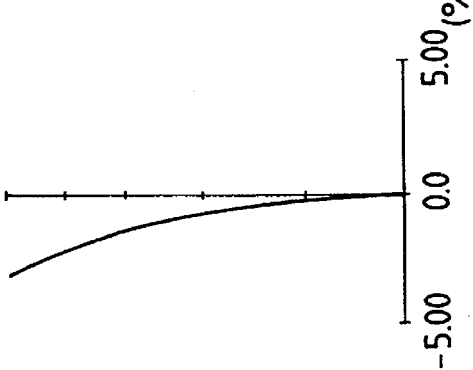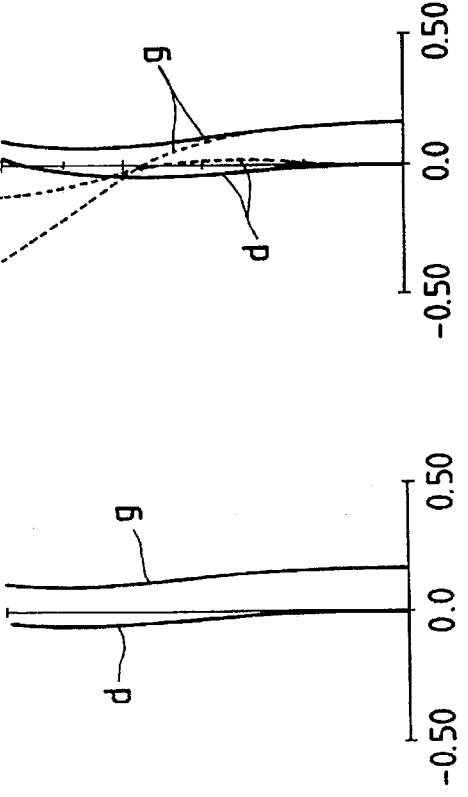

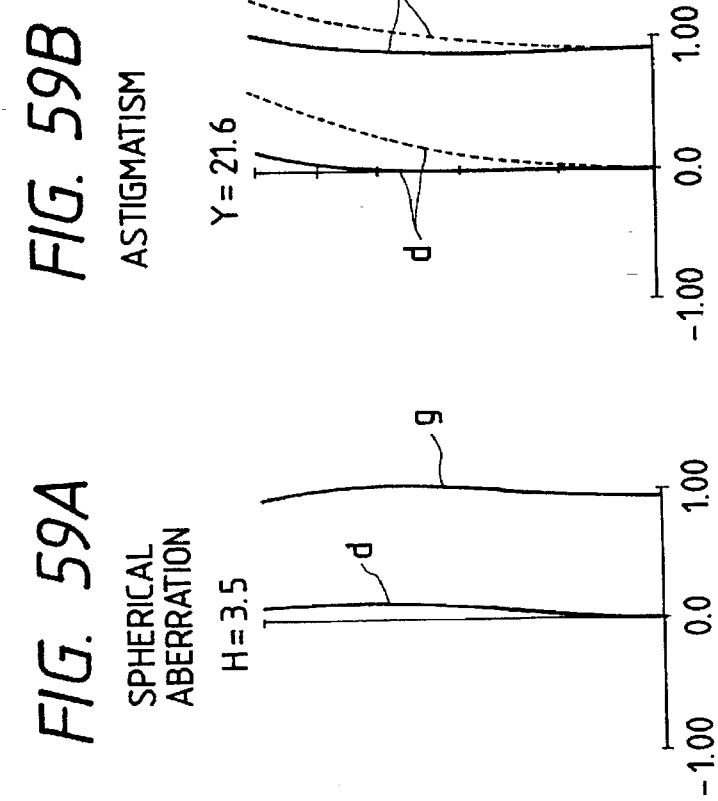

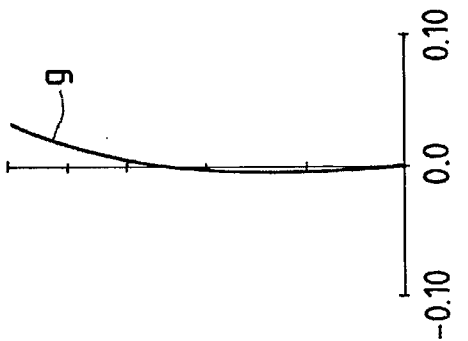
FIG. 61A
SPHERICAL ABERRATION
H=3.5
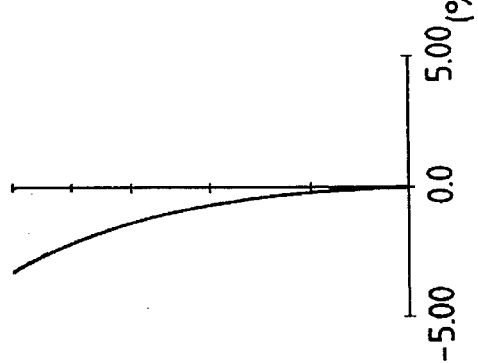
FIG. 61B
ASTIGMATISM
Y=21.6
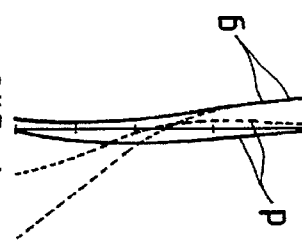
FIG. 61C
DISTORTION
Y=21.6
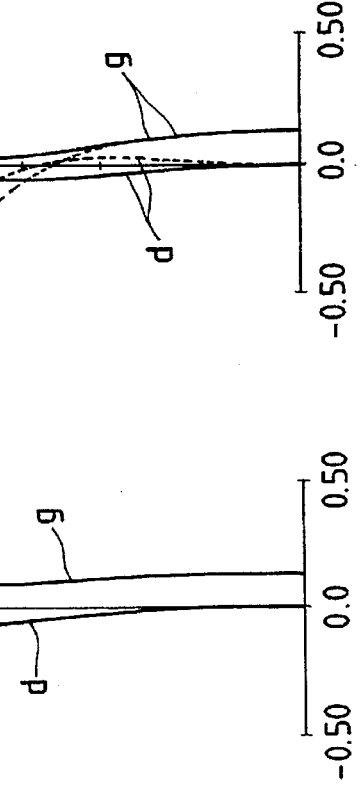
FIG. 61D
CHROMATIC ABERRATION OF MAGNIFICATION
Y=21.6

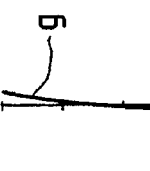
FIG. 62D CHROMATIC ABERRATION OF MAGNIFICATION
FIG. 62C DISTORTION
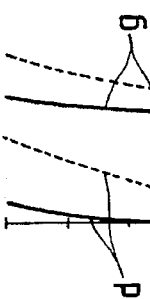
FIG. 62B ASTIGMATISM
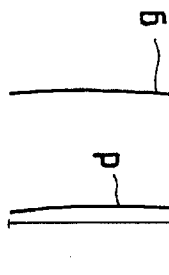
FIG. 62A SPHERICAL ABERRATION

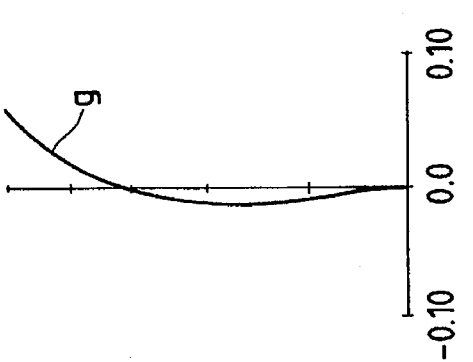
FIG. 63D CHROMATIC ABERRATION OF MAGNIFICATION
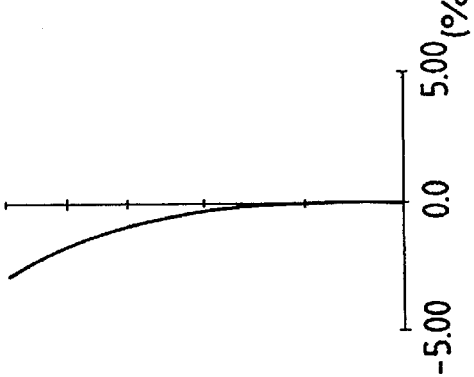
FIG. 63C DISTORTION
FIG. 63B ASTIGMATISM
FIG. 63A SPHERICAL ABERRATION

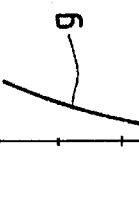
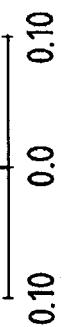
FIG. 64A
SPHERICAL ABERRATION
H=3.5
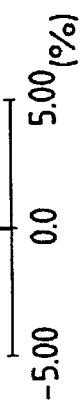
FIG. 64B
ASTIGMATISM
Y=21.6
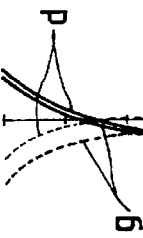
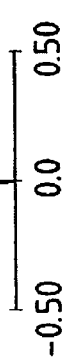
FIG. 64C
DISTORTION
Y=21.6
FIG. 64D
CHROMATIC ABERRATION OF MAGNIFICATION
Y=21.6

SPHERICAL ABERRATION
H=3.5

ASTIGMATISM
Y=21.6

DISTORTION
Y=21.6

CHROMATIC ABERRATION OF MAGNIFICATION
Y=21.6

SPHERICAL ABERRATION   ASTIGMATISM   DISTORTION   CHROMATIC ABERRATION OF MAGNIFICATION

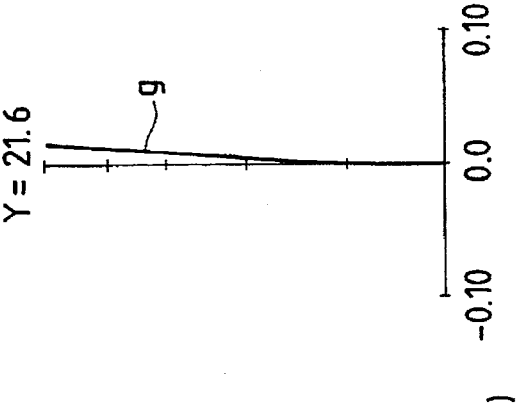
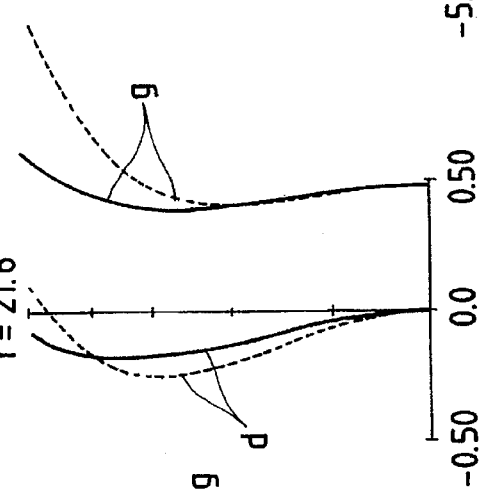
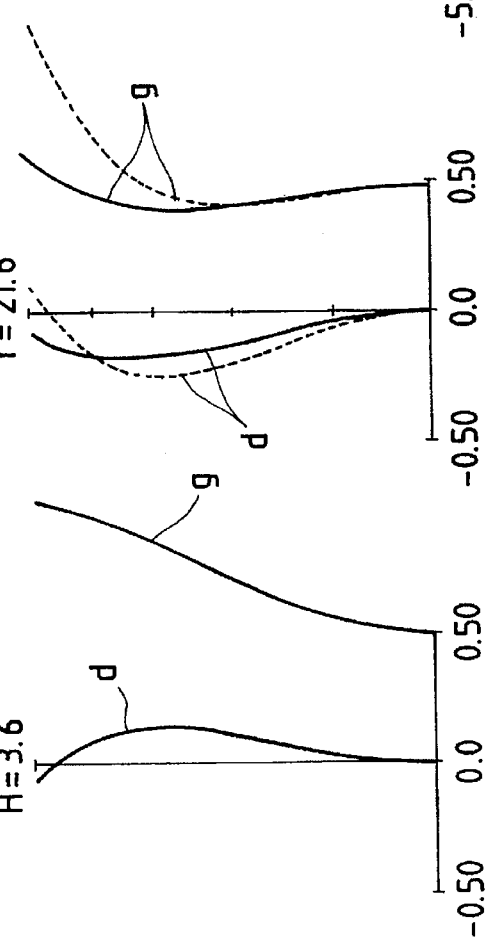

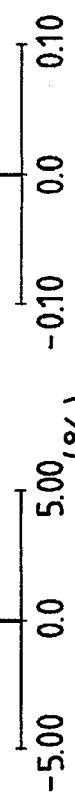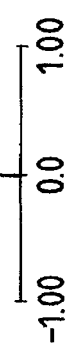

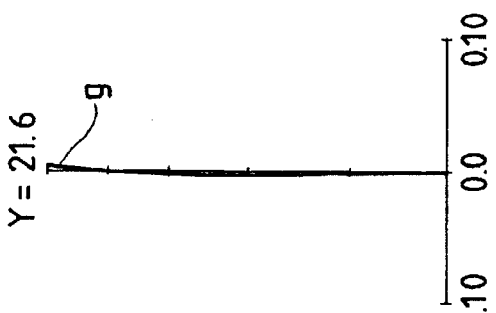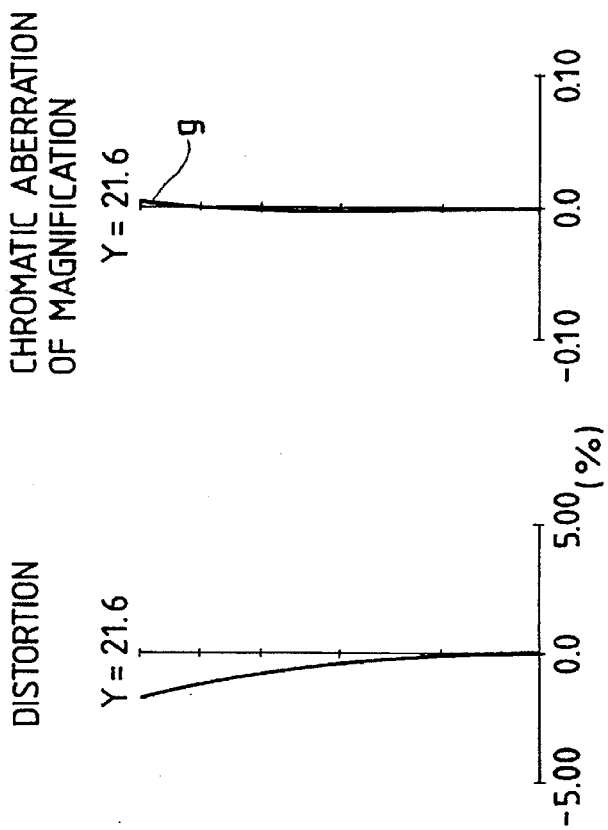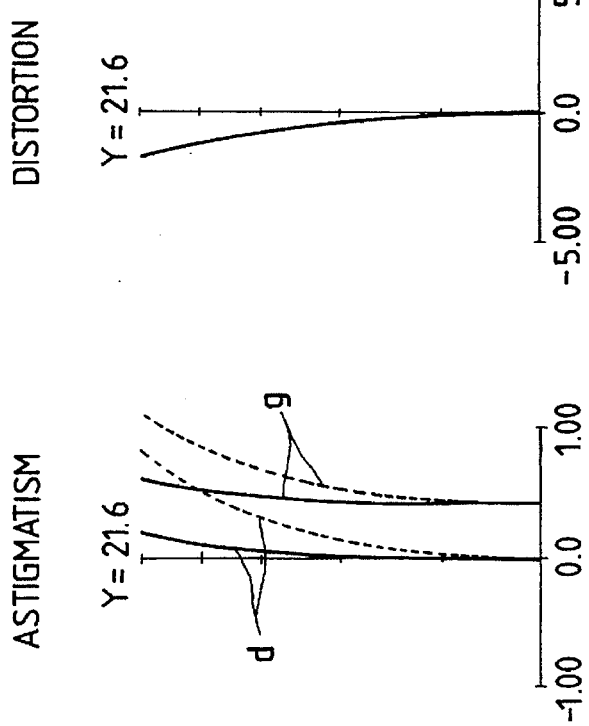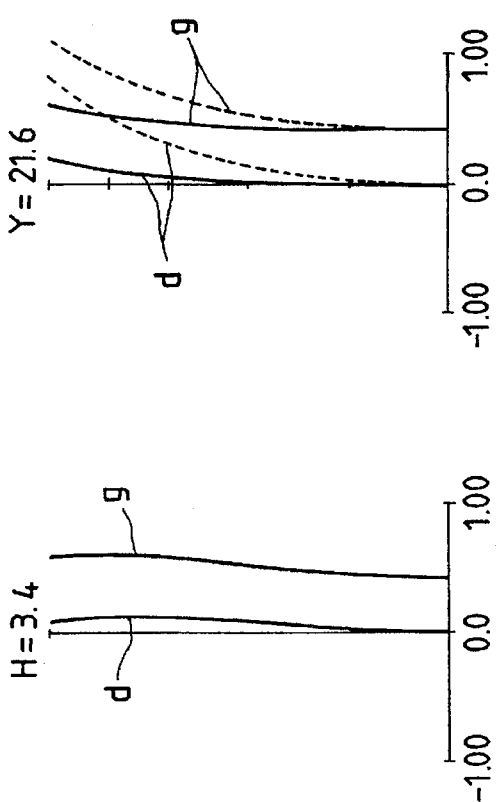

DISTORTION
Y = 21.6

ASTIGMATISM
Y = 21.6

R = 1000
SPHERICAL ABERRATION
H = 3.5

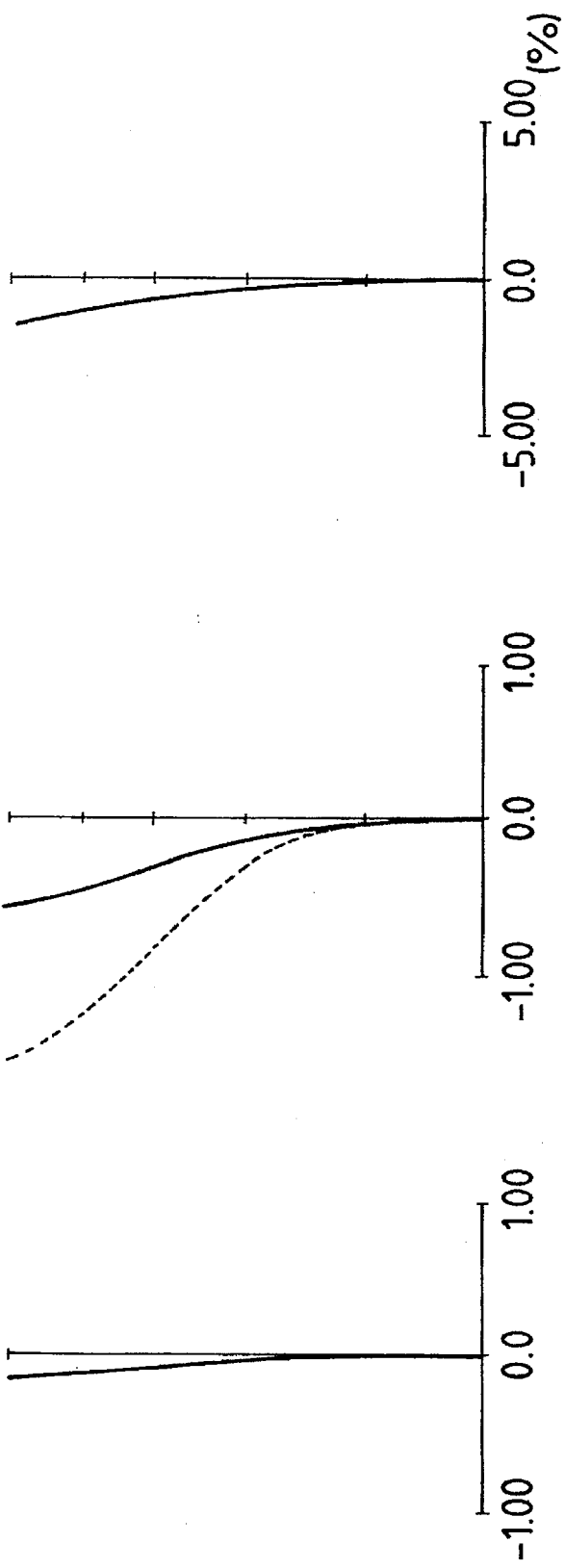

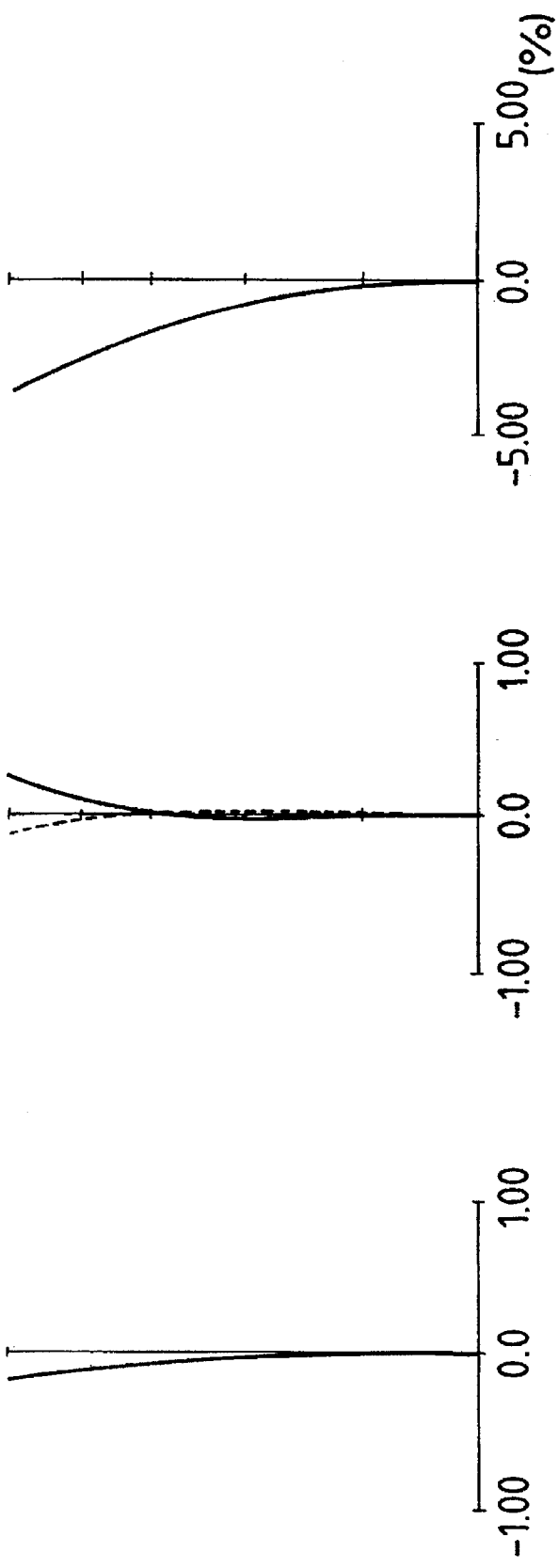

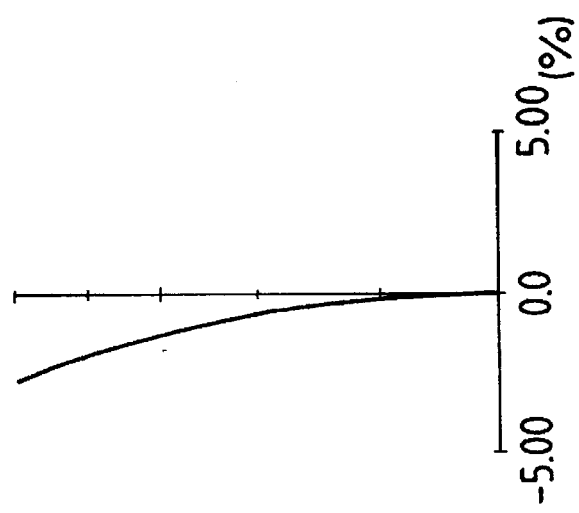

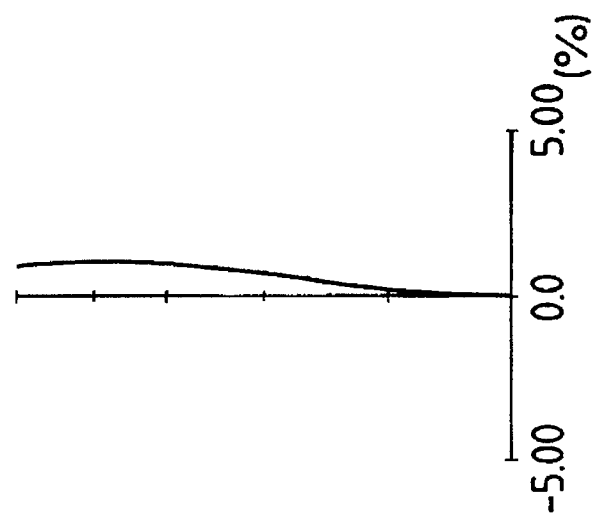
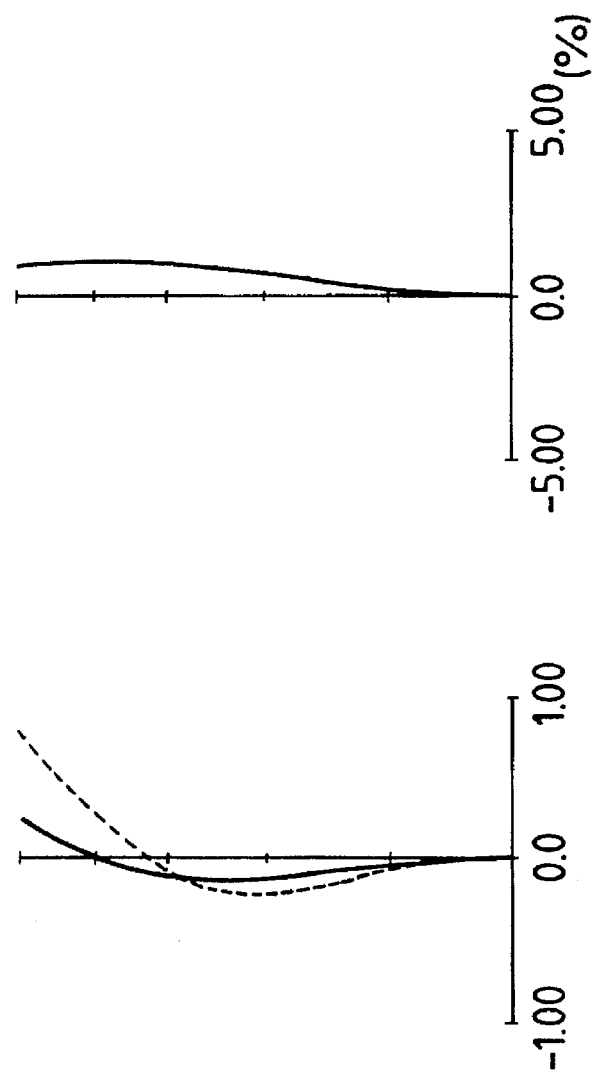
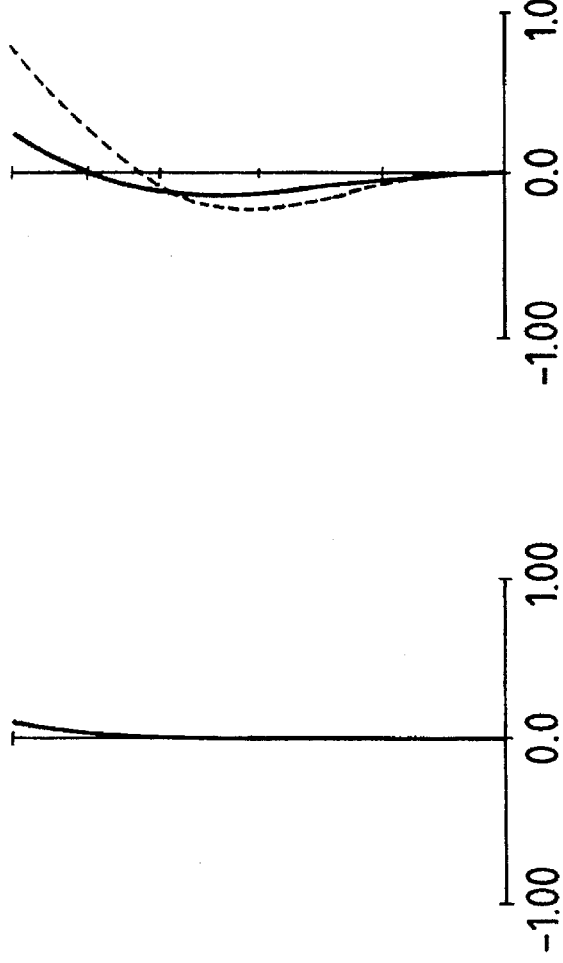

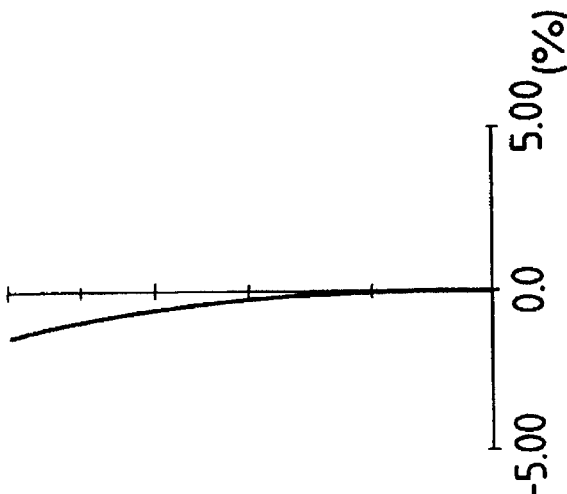
FIG. 86C
FIG. 86B
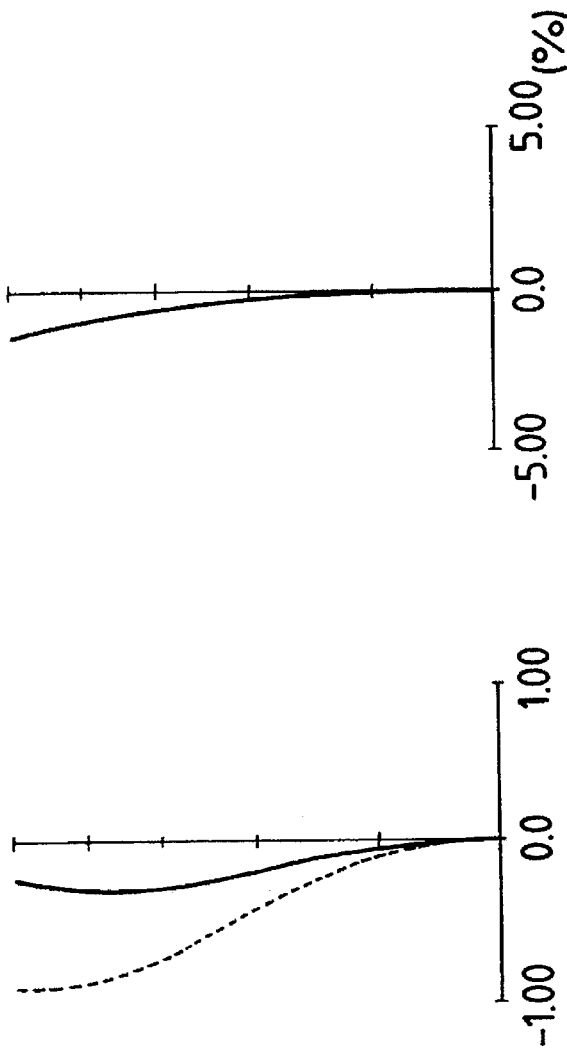
FIG. 86A
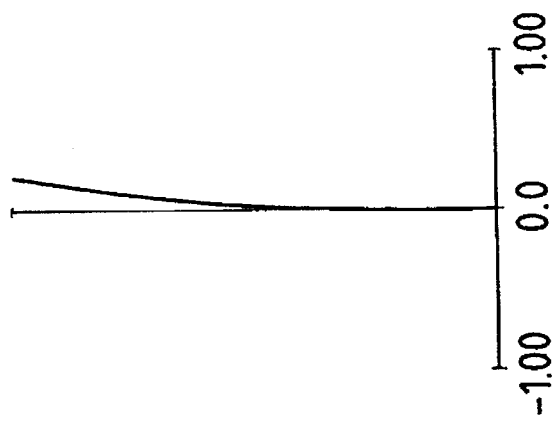

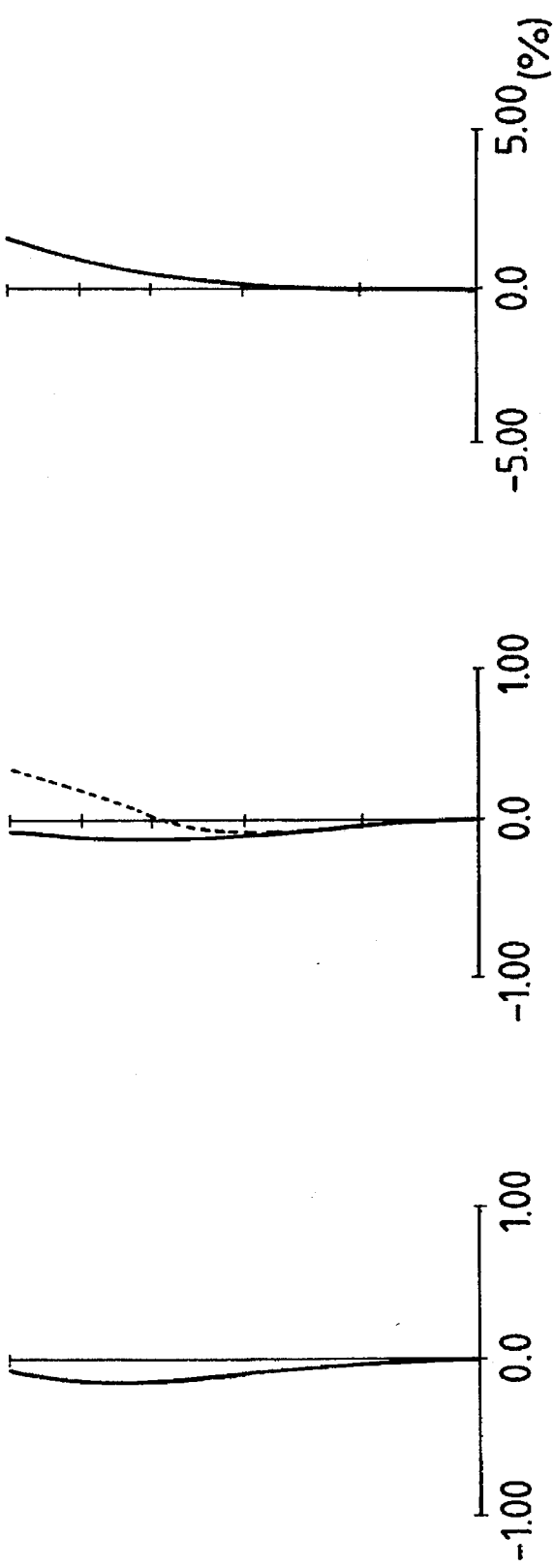

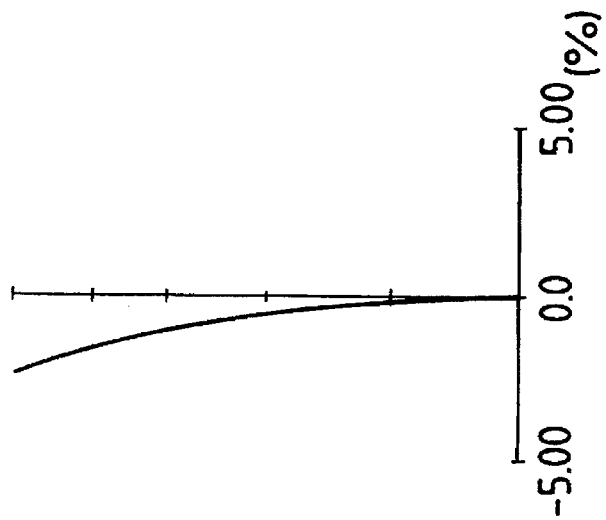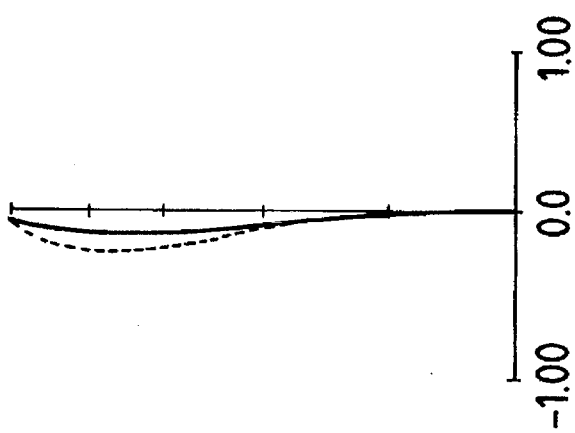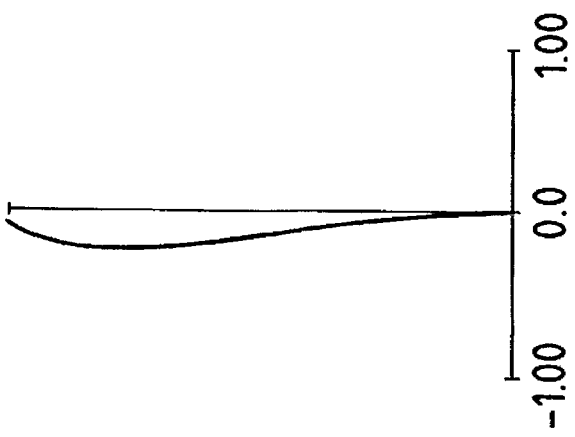

R=∞

SPHERICAL
ABERRATION
H=3.5

ASTIGMATISM
Y = 21.6

DISTORTION
Y = 21.6

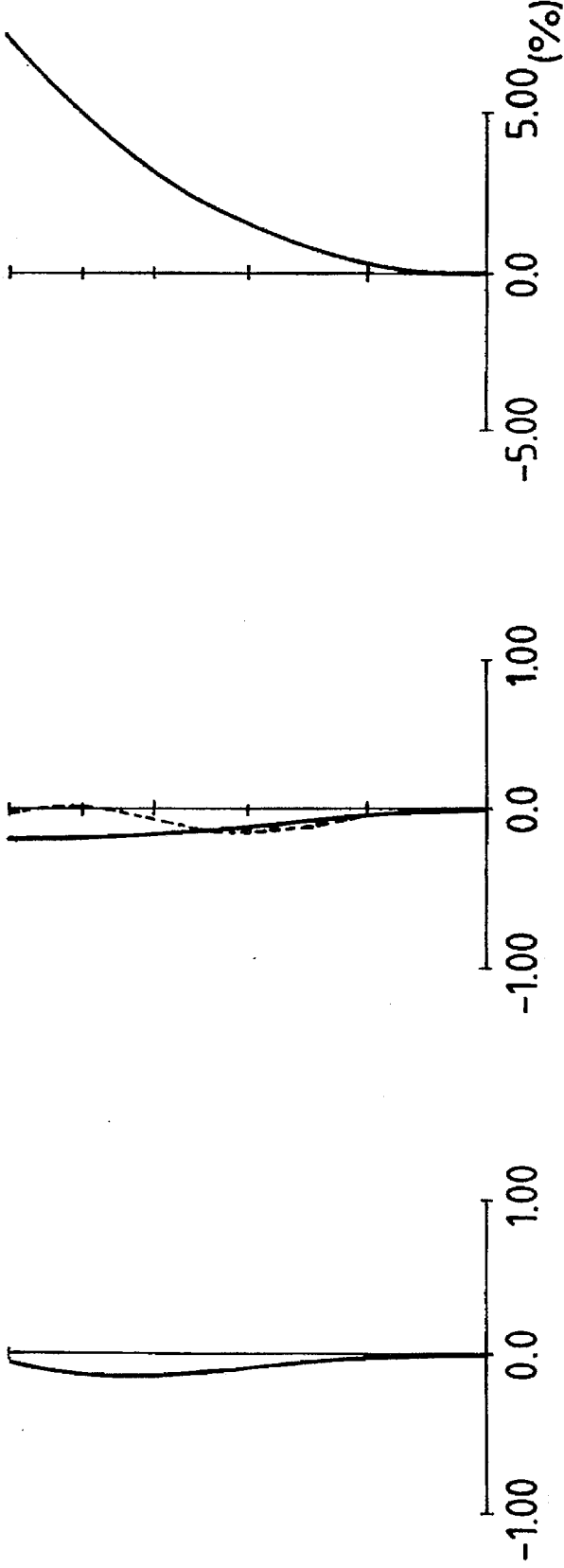

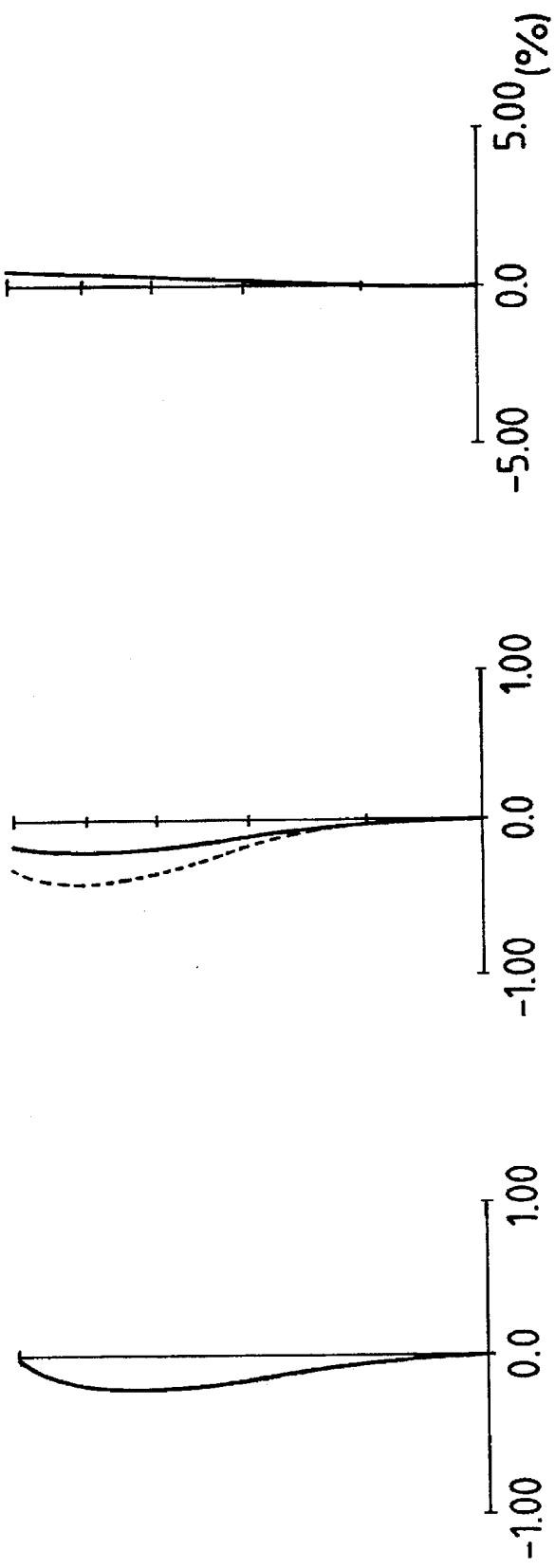

R = 1500
SPHERICAL ABERRATION
H = 3.6

ASTIGMATISM
Y = 21.6

DISTORTION
Y = 21.6

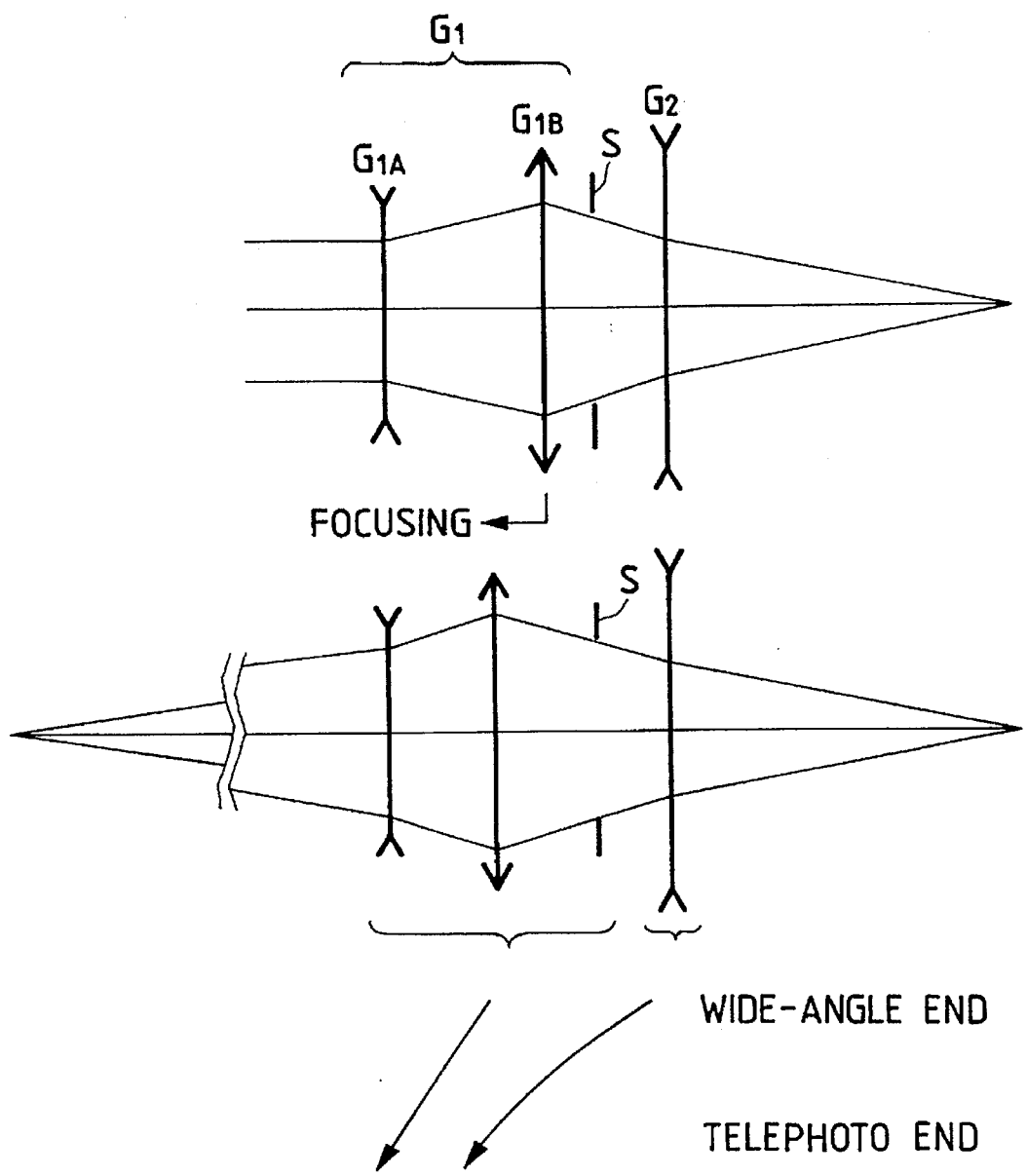

ZOOM LENS

BACKGROUND OF THE INVENTION

1. Field of the Invention

The present invention relates to a compact zoom lens suitable for a lens shutter type compact camera and, more particularly, to a wide-angle zoom lens including a wide field angle of about 70° or more.

The present invention also relates to a focusing method of a zoom lens suitable for a photographing lens integrated type auto-focus camera and a video camera.

2. Related Background Art

In recent years, even compact cameras generally have zoom lenses, and many zoom lenses constituted by two, i.e., positive and negative, groups have been proposed in, e.g., Japanese Laid-Open Patent Application No. 2-73322 (a counterpart application of U.S. Pat. No. 4,929,069).

A zoom lens proposed in Japanese Laid-Open Patent Application No. 2-73322 has a field angle of about 60° at the wide-angle end. However, even a zoom lens for a compact camera is required to have a wider field angle. In order to meet such a requirement, zoom lenses including a wide-angle region of 70° or more have been proposed in Japanese Laid-Open Patent Application No. 3-240013 (a counterpart application of U.S. Pat. No. 5,126,884), Japanese Laid-Open Patent Application Nos. 5-19166 and 5-232383, and the like.

However, in the respective embodiments of Japanese Laid-Open Patent Application No. 3-240013, since a zoom lens is constituted by many lenses, i.e., 11 lenses, it is difficult to achieve a low-cost, compact zoom lens. In the respective embodiments of Japanese Laid-Open Patent Application Nos. 5-19166 and 5-232383, the total lens length at the wide-angle end (the distance from a lens surface closest to the object side to an image plane) is as large as 1.9 times or more the focal length at the wide-angle end, and the zoom lens cannot be made sufficiently compact.

In the respective embodiments of Japanese Laid-Open Patent Application Nos. 5-19166 and 5-232383, the number of groups (a single lens and a cemented lens are respectively counted as one groups) constituting a first lens group is four or more, and assembling and adjustment are not easy.

In the arrangement described in each of the first to seventh embodiments of Japanese Laid-Open Patent Application No. 2-73322 mentioned above, a positive first lens group, which is arranged at the object side of a stop, is moved as a whole in the object direction to achieve a focusing operation to a near distance. In the arrangement described in the eighth embodiment of this reference, the first lens group is constituted by a positive front group and a positive rear group to sandwich a stop therebetween, and the positive front group on the object side of the stop is moved to achieve a focusing operation to a near distance. However, when a zoom lens in which a lens group closest to the object side is moved upon focusing, like a zoom lens proposed in, e.g., Japanese Laid-Open Patent Application No. 2-73322, is mounted on a camera, sufficient mechanical strength must be provided to a focusing mechanism, so that focusing precision is not influenced by an external force, and the focusing mechanism does not fail. As a result, cost increases. As a method of preventing an external force from acting on the focusing mechanism, a filter glass may be fixed in front of a focusing lens group.

However, with this method, an increase in cost due to addition of a filter glass member is inevitable.

On the other hand, in the case of a so-called inner focus, rear focus type lens, which performs a focusing operation using a lens group behind a lens group closest to the object side, since the focusing moving amount changes depending on the zoom position, complicated calculation formulas and many numerical value tables must be stored to calculate the focusing moving amount, and cost increases due to an increase in ROM capacity.

SUMMARY OF THE INVENTION

It is an object of the present invention to provide a zoom lens which has a field angle of 70° or more at the wide-angle end, has a compact shape, i.e., a total lens length at the wide-angle end which is 1.8 times or less the focal length at the wide-angle end, is constituted by as small as about seven lenses to advantageously achieve low cost, and has good imaging performance.

It is another object of the present invention to provide a zoom lens which has a field angle of 70° or more at the wide-angle end, is constituted by a small number of lenses to advantageously achieve low cost, uses three or less lens groups to constitute a first lens group so as to facilitate assembling and adjustment, and has good imaging performance.

It is still another object of the present invention to provide a novel focusing method which can prevent a focusing mechanism from being influenced by an external force while maintaining the advantage that the lens moving amount for focusing does not change even when the zoom position changes, like in a method of performing focusing by moving a first lens group. The present invention provides a zoom lens suitable for a photographing lens integrated type auto-focus camera or a video camera, which adopts this focusing method.

A zoom lens of the present invention comprises, in the following order from the object side, a first lens group having a positive refractive power and a second lens group having a negative refractive power, and effects zooming from the wide-angle end to the telephoto end by reducing an air gap between the first and second lens groups. The first lens group is constituted by, in the following order from the object side, a front lens subgroup having at least one negative lens, and a rear lens subgroup having one or more positive lenses and at least one negative lens. The zoom lens satisfies at least one of the following conditions:

$$0.09 \leq D2/fW \leq 0.4$$

$$-0.6 \leq Q1 \leq 0.5$$

where fW is the focal length of the entire zoom lens system at the wide-angle end, D2 is the air gap between the front and rear lens subgroups, and Q1 is the shape factor of the negative lens in the front lens subgroup. Note that the shape factor Q1 is given by:

$$Q1=(R2+R1)/(R2-R1)$$

where R1 is the radius of curvature of a lens surface, at the object side, of the negative lens in the front lens subgroup, and R2 is the radius of curvature of a lens surface, at the image side, of the negative lens.

The rear lens subgroup has a positive refractive power, and has, in the following order from the object side, a positive lens, a negative lens, and two positive lenses. The rear lens subgroup preferably comprises, in the following order from the object side, a biconvex positive lens, a biconcave negative lens, and two biconvex positive lenses. Furthermore, the rear lens subgroup preferably includes at least one cemented lens, and more preferably, the biconcave negative lens and the biconvex positive lens are cemented together.

The second lens group preferably comprises, in the following order from the object side, a positive meniscus lens having a concave surface facing the object side, and a negative meniscus lens having a concave surface facing the object side, and more preferably, at least one aspherical surface is arranged in the second lens group. In this case, the aspherical surface in the second lens group is preferably formed on the object side of the positive meniscus lens, and preferably has a shape in which the negative refractive power decreases from the central portion toward the peripheral portion.

Also, at least one aspherical surface is arranged in the first lens group. In this case, the aspherical surface is preferably formed on one or both of the image and object sides of the negative lens in the front lens subgroup. Alternatively, the aspherical surface is preferably formed on the object side of the biconvex positive lens arranged at a position closest to the object side in the rear lens subgroup.

Furthermore, the zoom lens preferably satisfies the following conditional formula:

$$-2.8 \leq f1A/f1 \leq -1.0$$

where f1 is the focal length of the first lens group, and f1A is the focal length of the front lens subgroup.

The zoom lens preferably satisfies the following conditional formula:

$$0.60 \leq f1B/f1 \leq 0.95$$

where f1 is the focal length of the first lens group, and f1B is the focal length of the rear lens subgroup.

The zoom lens preferably satisfies the following conditional formulas:

$$N1 \geq 1.60$$

$$v1 \geq 40$$

where N1 and v1 are respectively the refractive index and Abbe's number of the negative lens constituting the front lens subgroup.

Also, the zoom lens preferably satisfies the following conditional formulas:

$$1.55 \leq N2 \leq 1.75$$

$$30 \leq v2 \leq 45$$

where N2 and v2 are respectively the refractive index and Abbe's number of the positive lens closest to the object side in the rear lens subgroup.

In the zoom lens constituted by the positive first lens group and the negative second lens group, the negative second lens group is always used at a positive imaging magnification larger than 1. For this reason, if the focal length of the entire lens system is represented by f, the focal length of the first lens group is represented by f1, and the imaging magnification of the second lens group is represented by β2, a relation f=f1·β2 is established. As can be understood from this relation, the focal length f1 of the first lens group is shorter than the focal length fW of the entire lens system at the wide-angle end.

For this reason, when the focal length fW at the wide-angle end is shortened to obtain a wide field angle, the focal length f1 of the first lens group must be shorter than that in a conventional lens system. As a result, aberration correction undesirably becomes difficult to achieve.

When the zoom lens is used in a lens shutter camera in which limitations as to the back focus are less strict, if the back focus is extremely shortened, the effective diameter of the final lens surface of the second lens group becomes large, and it becomes difficult to make the entire camera compact. Therefore, a certain back focus must be assured even at the wide-angle end. For example, in a 35-mm size camera (frame size=24×36 mm), it is preferable to assure a back focus of at least about 6 mm.

However, in the conventional zoom lens constituted by two, i.e., positive and negative, lens groups like that in Japanese Laid-Open Patent Application No. 2-73322 (U.S. Pat. No. 4,929,069), when a field angle as wide as about 70° is to be obtained, it is difficult to simultaneously satisfy requirements as to the back focus at the wide-angle end and the air gap between the first and second lens groups at the telephoto end. When the focal length f1 of the first lens group is shortened to obtain a wide field angle, since various aberrations are worsened, the first lens group must have a complicated arrangement using a large number of lenses to achieve aberration correction.

As described above, in the conventional zoom lens constituted by two, i.e., positive and negative, lens groups, it is difficult to obtain a wide field angle with a simple arrangement while achieving a compact lens system.

For this reason, in the present invention, the first lens group is a retrofocus type lens group constituted by a negative front lens subgroup and a positive rear lens subgroup. With this arrangement, requirements with respect to the back focus at the wide-angle end and the air gap between the first and second lens groups at the telephoto end can be satisfied at the same time.

Since the front lens subgroup having a negative refractive power is arranged at a position closest to the object side, off-axis aberrations such as the curvature of field, astigmatism, distortion, chromatic aberration of magnification, and the like can be easily corrected. Thus, the first lens group can have a simple arrangement, and the entire lens system can be made compact.

The present invention provides the following conditional formulas (1) and (2) to reliably achieve the above-mentioned effects.

$$0.09 \leq D2/fW \leq 0.4 \quad (1)$$

$$-0.6 \leq Q1 \leq 0.5 \quad (2)$$

where

D2: the air gap between the front and rear lens subgroups in the first lens group fW: the focal length of the entire zoom lens system at the wide-angle end Q1: the shape factor of the negative lens in the front lens subgroup Note that the shape factor Q1 is given by:

$$Q1=(R2+R1)/(R2-R1)$$

where R1 is the radius of curvature of a lens surface, at the object side, of the negative lens in the front lens subgroup, and R2 is the radius of curvature of a lens surface, at the image side, of the negative lens.

Conditional formula (1) defines an optimal range of the air gap between the front and rear lens subgroups. When the air gap is smaller than the lower limit of conditional formula (1), the back focus by the first lens group is shortened, and it becomes difficult to simultaneously assure a desired back focus at the wide-angle end and a desired air gap between the first and second lens groups at the telephoto end. On the other hand, when the air gap exceeds the upper limit of conditional formula (1), the first lens group becomes large in size, and inhibits the construction of a compact zoom lens.

In order to still reliably achieve the above effects, the lower limit value of conditional formula (1) is preferably set to be 0.10. In order to make the zoom lens more compact, the upper limit value of conditional formula (1) is preferably set to be 0.25.

Conditional formula (2) is a condition for defining the shape of the negative lens constituting the front lens subgroup. Since the negative lens has a shape with a concave surface facing the object side, off-axis aberrations such as the curvature of field, distortion, and the like, which tend to be generated in the second lens group, can be easily corrected. Since the negative lens has a biconcave shape, generation of a spherical aberration in the negative lens is minimized, deterioration of performance upon focusing is suppressed, and the tolerances of the interval and decentering between the front and rear lens subgroups can be rendered less strict. When the shape factor is smaller than the lower limit of conditional formula (2), the curvature of the object-side surface of the negative lens becomes weaker than that of the image-side surface, and the correction effect of off-axis aberrations such as the curvature of field, distortion, and the like of the object-side surface of the negative lens is weakened. As a result, various aberrations are worsened, and the tolerances of the interval and decentering between the front and rear lens subgroups tend to become stricter. On the other hand, when the shape factor exceeds the upper limit of conditional formula (2), the curvature of the object-side surface of the negative lens becomes stronger than that of the image-side surface, and the refraction effect for off-axis rays increases. For this reason, coma and astigmatism increase undesirably.

Note that it is more preferable to set the upper limit value of conditional formula (2) to be 0 since a change in curvature of field upon focusing can then be minimized.

The following conditional formula (3) defines a range of the focal length of the front lens subgroup, which is preferable to constitute the first lens group as a simple retrofocus type lens group.

$$-2.8 \leq f1A/f1 \leq 1.0 \quad (3)$$

When the focal length is smaller than the lower limit of conditional formula (3), the back focus by the first lens group is shortened, and it becomes difficult to simultaneously assure a desired back focus at the wide-angle end and a desired air gap between the first and second lens groups at the telephoto end. On the other hand, when the focal length exceeds the upper limit of conditional formula (3), the refractive power of the front lens subgroup becomes excessive, and it becomes difficult to form the front lens subgroup with only the negative lens, resulting in a complicated lens arrangement.

In order to constitute the first lens group as a simpler retrofocus type lens group, the lower limit value of conditional formula (3) is preferably set to be −2.2, and its upper limit value is preferably set to be −1.2.

The following conditional formula (4) defines a range of the focal length of the rear lens subgroup, which is preferable to make the first lens group compact with a simple arrangement.

$$0.60 \leq f1B/f1 \leq 0.95 \quad (4)$$

When the focal length is set to be smaller than the lower limit of conditional formula (4), the refractive power of the rear lens subgroup becomes excessive, and it becomes difficult to satisfactorily correct the spherical aberration, resulting in an increase in the number of lenses. On the other hand, when the focal length exceeds the upper limit of conditional formula (4), a large principal point interval between the front and rear lens subgroups must be assured to constitute the first lens group as a retrofocus type arrangement. As a result, the on-axis lens thickness of the entire first lens group increases, thus inhibiting the construction of a compact zoom lens.

In order to make the first lens group more compact with a simpler arrangement, the lower limit value of conditional formula (4) is preferably set to be 0.70, and its upper limit value is preferably set to be 0.90.

Furthermore, the zoom lens preferably satisfies at least one of the following conditional formulas (5) to (8):

$$N1 \geq 1.60 \quad (5)$$

$$v1 \geq 40 \quad (6)$$

$$1.55 \leq N2 \leq 1.75 \quad (7)$$

$$30 \leq v2 \leq 45 \quad (8)$$

where N1 and v1 are respectively the refractive index and Abbe's number for the d-line (wavelength $\lambda=587.6$ nm) of the negative lens constituting the front lens subgroup in the first lens group, and N2 and v2 are respectively the refractive index and Abbe's number for the d-line of the positive lens closest to the object side in the rear lens subgroup.

Conditional formula (5) is associated with correction of the curvature of field. When the refractive index is smaller than the lower limit of conditional formula (5), the Petzval sum becomes excessive in the negative direction, and a positive curvature of field is generated and cannot be corrected.

In order to more satisfactorily correct the curvature of field, the lower limit value of conditional formula (5) is preferably set to be 1.70.

Conditional formula (6) is associated with correction of the chromatic aberration of magnification. When the Abbe's number is smaller than the lower limit value of conditional formula (6), the chromatic aberration of magnification generated in the negative lens constituting the front lens subgroup in the first lens group becomes excessive and cannot be corrected.

In order to more satisfactorily correct the chromatic aberration of magnification from the wide-angle end to the telephoto end, the lower limit value of conditional formula (6) is preferably set to be 45.

Conditional formula (7) is a condition associated with correction of the curvature of field and correction of the spherical aberration. When the refractive index is smaller than the lower limit of conditional formula (7), it becomes difficult to correct the spherical aberration in the rear lens subgroup.

In order to more satisfactorily correct the curvature of field and spherical aberration, the lower limit value of conditional formula (7) is preferably set to be 1.60.

When the refractive index exceeds the upper limit of conditional formula (7), the Petzval sum becomes excessive in the negative direction, and a positive curvature of field is generated and cannot be corrected.

In order to more satisfactorily correct the curvature of field and spherical aberration, the upper limit value of conditional formula (7) is preferably set to be 1.70.

Conditional formula (8) is a condition for simultaneously correcting the chromatic aberration of magnification and the on-axis chromatic aberration. When the Abbe's number exceeds the upper limit of conditional formula (8), a chromatic aberration of magnification generated in the negative lens constituting the front lens subgroup in the first lens group cannot be canceled.

On the other hand, when the Abbe's number is smaller than the lower limit of conditional formula (8), it becomes difficult to satisfactorily correct the on-axis chromatic aberration in the first lens group.

In order to efficiently correct the spherical aberration and distortion in the second lens group, an aspherical surface is preferably arranged in the second lens group. In this case, it is more preferable to form the object-side surface of the positive meniscus lens in the second lens group as an aspherical surface having a shape in which the negative refractive power decreases from the central portion toward the peripheral portion.

In order to make the first lens group compact, an aspherical surface is preferably arranged in the first lens group. In this case, the aspherical surface is preferably formed on one or both of the object and image sides of the negative lens constituting the front lens subgroup.

Alternatively, the aspherical surface is preferably formed on the object side of the biconvex positive lens closest to the object side in the rear lens subgroup in the first lens group.

Note that the front and rear lens subgroups of the zoom lens according to the present invention are separated by the largest air gap in the first lens group.

A wide-angle zoom lens according to another mode of the present invention comprises, in the following order from the object side, a first lens group having a positive refractive power and a second lens group having a negative refractive power, and effects zooming from the wide-angle end to the telephoto end by reducing the air gap between the first and second lens groups. The first lens group comprises, in the following order from the object side, a first lens component having a negative refractive power, a second lens component having a positive refractive power, a third lens component having a positive or negative refractive power, and a fourth lens component having a positive refractive power. The zoom lens satisfies the following conditions:

$0 < f1/fL2 < 2.5$ $0.5 < f1/fL4 < 2.0$ $D/f1 < 0.84$ where f1 is the focal length of the first lens group, fL2 is the focal length of the second lens component, fL4 is the focal length of the fourth lens component, and D is the on-axis distance from a lens surface closest to the object side to a lens surface closest to the image side in the first lens group.

Furthermore, the zoom lens preferably satisfies the following conditional formula:

$-1.5 < f1/fL3 < 1.0$ where fL3 is the focal length of the third lens component.

The zoom lens preferably satisfies the following conditional formula:

$-2.0 < f1/fL1 < -0.4$ where fL1 is the focal length of the first lens component.

Furthermore, the zoom lens preferably satisfies the following conditional formula:

$0.085 < DL3/fW < 0.400$ where fW is the focal length of the wide-angle zoom lens at the wide-angle end, and DL3 is the on-axis lens thickness of the third lens component.

The third lens component is preferably a cemented lens of negative and positive lenses.

Furthermore, in this case, the zoom lens preferably satisfies the following conditional formulas:

$N3n - N3p > 0.2$ $v3p - v3n > 4$ where N3n and N3p are respectively the refractive indices of the negative and positive lenses constituting the third lens component, and v3n and v3p are respectively the Abbe's numbers of the negative and positive lenses constituting the third lens component.

An aspherical surface may be formed on the object side of the second lens component. The second lens component preferably has a meniscus shape having a convex surface facing the object side.

Alternatively, an aspherical surface may be formed on the image side of the first lens component.

Alternatively, an aspherical surface may be formed on the object side of the first lens component.

Alternatively, an aspherical surface may be formed on the object side of the fourth lens component.

In the zoom lens constituted by the positive first lens group and the negative second lens group, the negative second lens group is always used at a positive imaging magnification larger than 1.

For this reason, if the focal length of the entire lens system is represented by f, the focal length of the first lens group is represented by f1, and the imaging magnification of the second lens group is represented by 2, since a relation f=f1·β2 is established, the focal length f1 of the first lens group is shorter than the focal length fW of the entire lens system at the wide-angle end. As a result, when the focal length fW at the wide-angle end is shortened to obtain a wide field angle, the focal length f1 of the first lens group must be shorter than that in a conventional lens system, and aberration correction tends to become difficult to achieve.

When the zoom lens is used in a lens shutter camera in which limitations as to the back focus are less strict, if the back focus is extremely shortened, the effective diameter of the final lens surface of the second lens group becomes large, and it becomes difficult to make the entire camera compact. Therefore, a certain back focus must be assured even at the wide-angle end. For example, in a 35-mm size camera (frame size=24×36 mm), it is preferable to assure a back focus of at least about 6 mm.

However, in the conventional zoom lens constituted by two, i.e., positive and negative lens groups like that in Japanese Laid-Open Patent Application No. 2-73322 (U.S. Pat. No. 4,929,069), when a field angle as wide as about 70° is to be obtained, it is difficult to simultaneously satisfy both requirements as to the back focus at the wide-angle end and the air gap between the first and second lens groups at the telephoto end. When the focal length f1 of the first lens group is shortened to obtain a wide field angle, since various aberrations are worsened, the first lens group must have a complicated arrangement using a large number of lenses so as to achieve aberration correction.

As described earlier, in the conventional zoom lens constituted by two, i.e., positive and negative, lens groups, it is difficult to obtain a wide field angle with a simple arrangement while achieving a compact lens system.

For this reason, in the present invention, a first lens component L1 having a negative refractive power is arranged at a position closest to the object side in a first lens group G1, so that the first lens group becomes a retrofocus type lens group. With this arrangement, a desired back focus at the wide-angle end and a desired air gap between the first lens group G1 and a second lens group G2 at the telephoto end can be assured at the same time.

Since the first lens component L1 having a negative refractive power is arranged at a position closest to the object side, off-axis aberrations such as the curvature of field, astigmatism, distortion, chromatic aberration of magnification, and the like can be easily corrected. Thus, the first lens group G1 can have a simple arrangement, and the lens system can be rendered compact.

The arrangement of the wide-angle zoom lens according to the present invention will be described in more detail below.

The first lens group G1 is constituted by the first lens group L1 having a negative refractive power, a second lens component L2 having a positive refractive power, a third lens component L3 having a positive or negative refractive power, and a fourth lens group L4 having a positive refractive power, and the third lens component L3 is a cemented lens of a negative lens L3n and a positive lens L3p. On the other hand, the negative second lens group G2 is constituted by a positive meniscus lens having a concave surface facing the object side, and a negative meniscus lens having a concave surface facing the object side.

In order to reliably achieve the above-mentioned effects, the present invention provides the following conditions (9) to (11):

$$0 < f1/fL2 < 2.5 \tag{9}$$

$$0.5 < f1/fL4 < 2.0 \tag{10}$$

$$D/f1 < 0.84 \tag{11}$$

where f1: the focal length of the first lens group G1 fL2: the focal length of the second lens component L2 fL4: the focal length of the fourth lens component L4

D: the on-axis distance from a lens surface closest to the object side to a lens surface closest to the image side in the first lens group G1

Conditional formula (9) defines an optimal range of the focal length of the second lens component L2. Since the second lens component L2 has a positive refractive power, various aberrations generated in the negative first lens component L1 and the positive second lens component L2 can cancel each other, and aberrations can be satisfactorily corrected.

When the focal length is smaller than the lower limit of conditional formula (9), the second lens component L2 has a negative refractive power, it becomes impossible to cancel various aberrations generated in the first and second lens components L1 and L2, and aberration correction becomes difficult to achieve. When the focal length exceeds the upper limit of conditional formula (9), the refractive power of the second lens component L2 increases, and the negative spherical aberration generated in the second lens component L2 becomes excessive and cannot be corrected.

Conditional formula (10) is a condition for defining an optimal range of the focal length of the fourth lens component L4.

When the focal length is smaller than the lower limit of conditional formula (10), the positive refractive power of the fourth lens component L4 is weakened, and the back focus by the first lens group G1 is shortened. For this reason, it becomes difficult to simultaneously assure a desired back focus at the wide-angle end and a desired air gap between the first and second lens groups G1 and G2 at the telephoto end. When the focal length exceeds the upper limit of conditional formula (10), the refractive power of the fourth lens component L4 becomes large, and the negative spherical aberration generated in the fourth lens component L4 becomes excessive and cannot be corrected.

Conditional formula (11) is a condition for defining the on-axis lens thickness of the first lens group G1.

When the on-axis lens thickness exceeds the upper limit of conditional formula (11), the first lens group G1 becomes large in size, and the total lens length undesirably increases.

As more preferable conditions, the present invention defines the following conditions (12) to (14):

$$-1.5 < f1/fL3 < 1.0 \tag{12}$$

$$-2.0 < f1/fL1 < -0.4 \tag{13}$$

$$0.085 < DL3/fW < 0.400 \tag{14}$$

where fL3: the focal length of the third lens component L3 fL1: the focal length of the first lens component L1

DL3: the on-axis lens thickness of the third lens component L3 fW: the focal length of the wide-angle zoom lens at the wide-angle end

Conditional formula (12) is a condition for defining an appropriate focal length range of the third lens component L3. When the focal length exceeds either the upper or lower limit of conditional formula (12), the refractive power of the third lens component L3 becomes large, and the decentering tolerance of the respective components in the first lens group G1 undesirably becomes strict.

Conditional formula (13) defines an appropriate focal length range of the first lens component L1.

When the focal length is smaller than the lower limit of conditional formula (13), the coma, chromatic aberration of magnification, and the like generated in the first lens component L1 become excessive. When the focal length exceeds the upper limit of conditional formula (13), the negative refractive power of the first lens component L1 becomes small, and the back focus of the first lens group G1 is shortened. For this reason, it becomes difficult to simultaneously assure a desired back focus at the wide-angle end and a desired air gap between the first and second lens groups G1 and G2 at the telephoto end.

Conditional formula (14) defines the on-axis lens thickness of the third lens component L3. When the on-axis lens thickness is smaller than the lower limit of conditional formula (14), the on-axis lens thickness of the third lens component L3 becomes small and it becomes difficult to appropriately correct the curvature of field and distortion. On the other hand, when the on-axis lens thickness exceeds the upper limit of conditional formula (14), the on-axis lens thickness of the third lens component L3 becomes large, and the first lens group G1 undesirably becomes large in size.

In order to more satisfactorily correct the spherical aberration and chromatic aberration, the third lens component L3 preferably comprises a cemented lens of the negative lens L3n and the positive lens L3p. At this time, the zoom lens preferably satisfies the following conditional formulas (15) and (16):

$$\mid N3n - N3p \mid > 0.2 \tag{15}$$

$$v3p - v3n > 4 \tag{16}$$

where

N3n: the refractive index of the negative lens L3n constituting the third lens component L3

N3p: the refractive index of the positive lens L3p constituting the third lens component L3

ν3n: the Abbe's number of the negative lens L3n constituting the third lens component L3

ν3p: the Abbe's number of the positive lens L3p constituting the third lens component L3

When the difference between the refractive indices is smaller than the lower limit of conditional formula (15), it becomes difficult to correct the negative spherical aberration which tends to be generated in the first lens group G1.

When the difference between the Abbe's numbers is smaller than the lower limit of conditional formula (16), it becomes difficult to correct both the on-axis chromatic aberration and chromatic aberration of magnification from the wide-angle end to the telephoto end of the wide-angle zoom lens.

In order to make the first lens group G1 compact in association with realization of a compact wide-angle zoom lens, an aspherical surface is preferably arranged in the first lens group G1. In this case, the aspherical surface is preferably formed on the object side of the second lens component L2, the image or object side of the first lens component L1, or the object side of the fourth lens component L4.

When the aspherical surface is formed on the object side of the second lens component L2, the second lens component L2 preferably has a meniscus shape with a convex surface facing the object side in order to achieve effective aberration correction. On the other hand, when the aspherical surface is formed on the object side of the fourth lens component L4, the fourth lens component L4 preferably has a meniscus shape with a concave surface facing the object side in order to achieve effective aberration correction.

A zoom lens according to still another mode of the present invention comprises, in the following order from the object side, a first lens group having a positive refractive power and a second lens group having a negative refractive power, and effects zooming from the wide-angle end to the telephoto end by reducing the air gap between the first and second lens groups. The first lens group has a three-element cemented lens (i.e., a cemented lens consisting of three lens elements).

The zoom lens preferably satisfies the following conditional formulas:

$$0.50 \leq f1/fW \leq 0.95$$

$$-1.5 \leq f2/fW \leq -0.4$$

where fW is the focal length of the zoom lens at the wide-angle end, f1 is the focal length of the first lens group, and f2 is the focal length of the second lens group.

The first lens group preferably comprises at least one negative lens at the object side of the three-element cemented lens.

Furthermore, the three-element cemented lens preferably consists of, in the following order from the object side, a positive lens L21, a negative lens L22, and a positive lens L23 and preferably has a positive refractive power as a whole.

The zoom lens preferably satisfies the following condition:

$$N22-N23>0.2$$

where N22 and N23 are respectively the refractive indices of the negative and positive lenses L22 and L23 constituting the three-element cemented lens.

Also, the zoom lens preferably satisfies the following conditions:

$$\nu22-\nu21>0$$

$$\nu23-\nu22>20$$

where ν21, ν22, and ν23 are respectively the Abbe's numbers of the positive, negative, and positive lenses L21, L22, and L23 constituting the three-element cemented lens.

The first lens group preferably comprises, in the following order from the object side, a negative lens L1, a three-element cemented lens L2, and a positive lens L3.

Furthermore, the zoom lens preferably satisfies at least one of the following conditions:

$$-0.5 \leq fL1/f1 \leq -0.5$$

$$0.5 \leq fL2/f1 \leq 5.0$$

$$0.5 fL3/f1 \leq 2.0$$

where fL1, fL2, and fL3 are respectively the focal lengths of the negative lens L1, the three-element cemented lens L2, and the positive lens L3 in the first lens group.

In the zoom lens constituted by the positive first lens group and the negative second lens group, the negative second lens group is always used at a positive imaging magnification larger than 1.

For this reason, if the focal length of the entire lens system is represented by f, the focal length of the first lens group is represented by f1, and the imaging magnification of the second lens group is represented by β2, since a relation f=f1·β2 is established, the focal length f1 of the first lens group is shorter than the focal length fW of the entire lens system at the wide-angle end. As a result, when the focal length fW at the wide-angle end is shortened to obtain a wide field angle, the focal length f1 of the first lens group must be shorter than that in a conventional lens system, and aberration correction tends to become difficult to achieve.

For this reason, in the zoom lenses proposed in Japanese Laid-Open Patent Application No. 3-240013 (U.S. Pat. No. 5,126,884) and Japanese Laid-Open Patent Application Nos. 5-19166 and 5-232383 mentioned above, the first lens group is constituted by five or more lenses, and is constituted by four or more groups to obtain a good aberration correction effect in the first lens group, resulting in a complicated arrangement. As a result, due to a large number of groups, assembling and adjustment of the zoom lens are difficult.

In the present invention, by arranging a three-element cemented lens in a first lens group G1, the number of lens groups constituting the first lens group G1 is reduced while assuring a high degree of freedom in design.

When the first lens group G1 is designed to have, in the following order from the object side, a negative lens L1, a three-element cemented lens L2, and a positive lens L3, the first lens group G1 can have a retrofocus type lens group arrangement, and this arrangement is advantageous in assuring a desired back focus at the wide-angle end and a desired air gap between the first lens group G1 and a second lens group G2 at the telephoto end.

When the three-element cemented lens L2 consists of, in the following order from the object side, a positive lens L21, a negative lens L22, and a positive lens L23 and has a positive refractive power as a whole, the spherical aberration, coma, on-axis chromatic aberration, chromatic aberration of magnification, and the like of the lens can be effectively corrected.

Furthermore, the present invention defines the following conditions to reliably achieve the above-mentioned effects:

$$0.50 \leq f1/fW \leq 0.95 \quad (17)$$

$$-1.5 \leq f2/fW \leq -0.4 \quad (18)$$

where f1: the focal length of the first lens group G1 f2: the focal length of the second lens group G2 fW: the focal length of the entire zoom lens system at the wide-angle end

Conditional formula (17) defines an optimal focal length range of the first lens group G1. When the focal length is smaller than the lower limit of conditional formula (17), the refractive power of the first lens group G1 becomes too large, and it becomes difficult to constitute the first lens group G1 with a small number of lenses.

On the other hand, when the focal length exceeds the upper limit of conditional formula (17), the back focus at the wide-angle end becomes extremely short, and the effective diameter of the final lens surface of the second lens group G2 becomes large, thus inhibiting the construction of a compact zoom lens.

In order to more satisfactorily achieve aberration correction with a smaller number of lenses, the lower limit value of conditional formula (17) is preferably set to be 0.60. In order to make the zoom lens more compact, the upper limit value of conditional formula (17) is preferably set to be 0.85.

Conditional formula (18) defines an optimal focal length range of the second lens group G2. When the focal length is smaller than the lower limit of conditional formula (18), the refractive power of the second lens group G2 becomes small, and it becomes difficult to obtain a sufficient zoom ratio.

When the focal length exceeds the upper limit of conditional formula (18), the refractive power of the second lens group G2 becomes large, and it becomes difficult to correct various aberrations such as the spherical aberration, distortion, and the like.

In order to obtain a zoom ratio of about ×1.9 or more, the lower limit value of conditional formula (18) is preferably set to be −1.0. When the second lens group G2 is to be constituted by, e.g., two lenses, the upper limit value of conditional formula (18) is preferably set to be −0.6.

In order to satisfactorily correct the spherical aberration in the first lens group G1, the zoom lens preferably satisfies conditional formula (19):

$$N22-N23>0.2 \quad (19)$$

where

N22: the refractive index of the negative lens L22 constituting the three-element cemented lens L2

N23: the refractive index of the positive lens L22 constituting the three-element cemented lens L2

When the difference between the refractive indices is smaller than the lower limit of conditional formula (19), the positive spherical aberration generated in the first lens group G1 cannot be corrected completely. In order to more satisfactorily correct the spherical aberration, the lower limit value of conditional formula (19) is preferably set to be 0.25.

In order to further improve the lens performance, the zoom lens preferably satisfies the following conditions:

$$v22-v21>0 \quad (20)$$

$$v23-v22>20 \quad (21)$$

where v21: the Abbe's number of the positive lens L21 constituting the three-element cemented lens L2 v22: the Abbe's number of the negative lens L22 constituting the three-element cemented lens L2 v23: the Abbe's number of the positive lens L23 constituting the three-element cemented lens L2

Conditional formula (20) is a condition for satisfactorily correcting the chromatic aberration of magnification in the first lens group G1. Of the lenses constituting the three-element cemented lens L2 in the first lens group G1, the Abbe's number of the negative lens L22 is set to be larger than that of the positive lens L21 at the object side, thereby generating a positive chromatic aberration of magnification at the cemented surface between the positive lens L21 and the negative lens L22. This aberration can cancel the negative chromatic aberration of magnification generated in the negative lens L1 located at the object side of the three-element cemented lens L2. Therefore, when the difference between the Abbe's numbers is smaller than the lower limit of conditional formula (20), the above-mentioned effect cannot be obtained, and it becomes difficult to correct the chromatic aberration of magnification.

Conditional formula (21) is a condition for satisfactorily correcting the on-axis chromatic aberration in the first lens group G1. Of the lenses constituting the three-element cemented lens L2 in the first lens group G1, the Abbe's number of the positive lens L23 at the image side is set to be larger than that of the negative lens L22, thereby correcting a negative on-axis chromatic aberration which tends to be generated in the first lens group G1. Therefore, when the difference between the Abbe's numbers is set to be smaller than the lower limit of conditional formula (21), the negative on-axis chromatic aberration cannot be sufficiently corrected in the first lens group G1, and it becomes difficult to correct the on-axis chromatic aberration in the entire zoom region.

In order to further improve the lens performance, the zoom lens preferably satisfies at least one of the following conditions:

$$-5.0 \leq fL1/f1 \leq -0.5 \quad (22)$$

$$0.5 \leq fL2/f1 \leq 5.0 \quad (23)$$

$$0.5 \leq fL3/f1 \leq 2.0 \quad (24)$$

where fL1: the focal length of the negative lens L1 in the first lens group G1 fL2: the focal length of the three-element cemented lens L2 in the first lens group G1 fL3: the focal length of the positive lens L3 in the first lens group G1

Conditional formula (22) defines an appropriate focal length range of the negative lens L1 in the first lens group G1.

When the focal length is smaller than the lower limit of conditional formula (22), the effect obtained by constituting the first lens group G1 as a retrofocus type is weakened, and it becomes difficult to simultaneously assure a desired back focus at the wide-angle end and a desired air gap between the first and second lens groups G1 and G2 at the telephoto end. On the other hand, when the focal length exceeds the upper limit of conditional formula (22), the refractive power of the negative lens L1 becomes large, and the spherical aberration, coma, and distortion generated in the negative lens 11 increase. For this reason, it becomes difficult to correct various aberrations in the first lens group G1.

Note that it is more preferable to set the lower limit value of conditional formula (22) to be −3.0, and to set the upper limit value of conditional formula (22) to be −0.7.

Conditional formula (23) defines an appropriate focal length range of the three-element cemented lens L2 in the first lens group G1.

When the focal length is smaller than the lower limit of conditional formula (23), the refractive power of the three-element cemented lens becomes too large, and the back focus of the first lens group G1 is shortened. For this reason, it becomes difficult to simultaneously assure a desired back focus at the wide-angle end and a desired air gap between the first and second lens groups G1 and G2 at the telephoto end. When the focal length exceeds the upper limit of conditional formula (23), the refractive power of the three-element cemented lens L2 becomes small, and the refractive power of the positive lens L3 becomes excessive accordingly. For this reason, considerable spherical aberration and coma are generated in the positive lens L3 and cannot be corrected.

Note that it is more preferable to set the lower limit value of conditional formula (23) to be 1.0.

Conditional formula (24) defines an appropriate focal length range of the positive lens L3 in the first lens group G1.

When the focal length is smaller than the lower limit of conditional formula (24), the refractive power of the positive lens L3 becomes excessive, and hence, considerable spherical aberration and coma are generated in the positive lens L3 and cannot be corrected. On the other hand, when the focal length exceeds the upper limit of conditional formula (24), the refractive power of the positive lens L3 becomes weak, and the effect obtained by constituting the first lens group G1 as a retrofocus type is weakened. As a result, it becomes difficult to simultaneously assure a desired back focus at the wide-angle end and a desired air gap between the first and second lens groups G1 and G2 at the telephoto end.

A zoom lens according to still another mode of the present invention comprises, in the following order from the object side, a first lens group having a positive refractive power and a second lens group having a negative refractive power, and effects zooming from the wide-angle end to the telephoto end by reducing the air gap between the first and second lens groups. The first lens group consists of, in the following order from the object side, a front lens subgroup of a negative refractive power, which has at least one negative lens, and a rear lens subgroup of a positive refractive power, which has one or more positive lenses. Upon focusing from a far distance to a near distance, only the rear lens subgroup is moved along the optical axis in the object direction.

In the above arrangement, the zoom lens preferably satisfies the following conditions:

$$0.30 \leq f1/fW \leq 0.95$$

$$-0.9 \leq \beta1B \leq -0.1$$

where fW is the focal length of the entire zoom lens system at the wide-angle end, f1 is the focal length of the first lens group, and β1B is the imaging magnification of the rear lens subgroup in an infinity in-focus state.

The rear lens subgroup preferably consists of two or more positive lenses and at least one negative lens.

Furthermore, the zoom lens preferably satisfies the following condition:

$$0.1 \leq D2/f1 \leq 0.6$$

where D2 is the air gap between the front and rear lens subgroups.

A stop is preferably arranged between the first and second lens groups, so that the stop moves together with the first lens group upon zooming, and stands still together with the front lens subgroup upon focusing.

FIG. 94 is a schematic view of a zoom lens to which the focusing method of the present invention is applied. In FIG. 94, ↑ indicates a positive lens group, and ↓ indicates a negative lens group. As shown in FIG. 94, in a zoom lens constituted by a positive first lens group G1 and a negative second lens group G2, the first lens group G1 is constituted by, in the following order from the object side, a front lens subgroup G1A having a negative refractive power, and a rear lens subgroup G1B having a positive refractive power, and the first lens group G1 has a so-called retrofocus type arrangement.

For this reason, the above arrangement is advantageous to assure a desired air gap between the first and second lens groups G1 and G2 at the telephoto end. Upon focusing by moving only the rear lens subgroup G1B with this arrangement in the object direction, the moving amount of the rear lens subgroup G1B required for focusing remains almost the same even when the focal length is changed. Therefore, auto-focus control can be facilitated. Since the front lens subgroup G1A, which stands still upon focusing, is arranged at the object side of the rear lens subgroup G1B, no external force acts on a focusing mechanism.

Furthermore, the present invention defines the following conditional formulas (25) and (26) to further improve the performance of the zoom lens with the above arrangement:

$$0.30 \leq f1/fW \leq 0.95 \tag{25}$$

$$-0.9 \leq \beta1B \leq -0.1 \tag{26}$$

where F1:
    the focal length of the first lens group
    fW: the focal length of the entire zoom lens system at the wide-angle end
    β1B: the imaging magnification of the rear lens subgroup G1B in an infinity in-focus state Conditional formula (25) is a condition for defining an optimal range of the focal length of the first lens group G1 when the focusing method of the present invention is adopted.

When the focal length exceeds the upper limit of conditional formula (25), the back focus at the wide-angle end becomes extremely short, and the effective diameter of the final lens surface of the second lens group G2 becomes large, resulting in an increase in size of the entire camera.

On the other hand, when the focal length is smaller than the lower limit of conditional formula (25), the focal length of the first lens group G1 becomes extremely short, and it becomes difficult to correct various aberrations.

Conditional formula (26) is a condition for defining an optimal range of the imaging magnification of the rear lens subgroup G1B when the focusing method of the present invention is adopted.

When the imaging magnification is smaller than the lower limit of conditional formula (26), since the moving amount of the rear lens subgroup G1B required for focusing increases, a large air gap must be assured between the front and rear lens subgroups G1A and G1B. As a result, the lens system becomes large in size, and various aberrations are considerably worsened upon focusing.

The focal length of the front lens subgroup G1A is given by f1A=f1/β1B. For this reason, when the imaging magnification β1B of the rear lens subgroup exceeds the upper limit of conditional formula (26), the focal length f1A of the front lens subgroup G1A increases, and the back focus of the first lens group is shortened. As a result, it becomes difficult to assure a desired air gap between the first and second lens groups G1 and G2 at the telephoto end, and it also becomes difficult to increase the zoom ratio.

In order to minimize variations of various aberrations upon focusing, the rear lens subgroup G1B is preferably constituted by two or more positive lenses and at least one negative lens.

The air gap D2 between the front and rear lens subgroups G1A and G1B is preferably set to fall within the range defined by the following conditional formula (27):

$$0.1 \leq D2/f1 \leq 0.6 \tag{27}$$

When the air gap is smaller than the lower limit of conditional formula (27), the movable range of the rear lens subgroup is narrowed, and not only the closest photographing distance increases but also the back focus of the first lens group G1 is shortened. As a result, it becomes difficult to assure a desired air gap between the first and second lens groups G1 and G2 at the telephoto end.

When the air gap exceeds the upper limit of conditional formula (27), the first lens group G1 becomes large in size, and hence, the entire camera size undesirably increases.

BRIEF DESCRIPTION OF THE DRAWINGS

FIGS. 10A to 10D are graphs showing various aberrations at the wide-angle end in the first embodiment of the present invention;

FIGS. 11A to 11D are graphs showing various aberrations in a middle focal length state in the first embodiment of the present invention;

FIGS. 12A to 12D are graphs showing various aberrations at the telephoto end in the first embodiment of the present invention;

FIGS. 13A to 13D are graphs showing various aberrations at the wide-angle end in the second embodiment of the present invention;

FIGS. 14A to 14D are graphs showing various aberrations in a middle focal length state in the second embodiment of the present invention;

FIGS. 15A to 15D are graphs showing various aberrations at the telephoto end in the second embodiment of the present invention;

FIGS. 16A to 16D are graphs showing various aberrations at the wide-angle end in the third embodiment of the present invention;

FIGS. 17A to 17D are graphs showing various aberrations in a middle focal length state in the third embodiment of the present invention;

FIGS. 18A to 18D are graphs showing various aberrations at the telephoto end in the third embodiment of the present invention;

FIGS. 19A to 19D are graphs showing various aberrations at the wide-angle end in the fourth embodiment of the present invention;

FIGS. 20A to 20D are graphs showing various aberrations in a middle focal length state in the fourth embodiment of the present invention;

FIGS. 21A to 21D are graphs showing various aberrations at the telephoto end in the fourth embodiment of the present invention;

FIGS. 22A to 22D are graphs showing various aberrations at the wide-angle end in the fifth embodiment of the present invention;

FIGS. 23A to 23D are graphs showing various aberrations in a middle focal length state in the fifth embodiment of the present invention;

FIGS. 24A to 24D are graphs showing various aberrations at the telephoto end in the fifth embodiment of the present invention;

FIGS. 26A to 26D are graphs showing various aberrations in a middle focal length state in the sixth embodiment of the present invention;

FIGS. 27A to 27D are graphs showing various aberrations at the telephoto end in the sixth embodiment of the present invention;

FIGS. 28A to 28D are graphs showing various aberrations at the wide-angle end in the seventh embodiment of the present invention;

FIGS. 29A to 29D are graphs showing various aberrations in a middle focal length state in the seventh embodiment of the present invention;

FIGS. 30A to 30D are graphs showing various aberrations at the telephoto end in the seventh embodiment of the present invention;

FIGS. 31A to 31D are graphs showing various aberrations at the wide-angle end in the eighth embodiment of the present invention;

FIGS. 32A to 32D are graphs showing various aberrations in a middle focal length state in the eighth embodiment of the present invention;

FIGS. 33A to 33D are graphs showing various aberrations at the telephoto end in the eighth embodiment of the present invention;

FIGS. 34A to 34D are graphs showing various aberrations at the wide-angle end in the ninth embodiment of the present invention;

FIGS. 35A to 35D are graphs showing various aberrations in a middle focal length state in the ninth embodiment of the present invention;

FIGS. 36A to 36D are graphs showing various aberrations at the telephoto end in the ninth embodiment of the present invention;

FIGS. 45A to 45D are graphs showing various aberrations at the wide-angle end in the 10th embodiment of the present invention;

FIGS. 46A to 46D are graphs showing various aberrations in a middle focal length state in the 10th embodiment of the present invention;

FIGS. 47A to 47D are graphs showing various aberrations at the telephoto end in the 10th embodiment of the present invention;

FIGS. 48A to 48D are graphs showing various aberrations at the wide-angle end in the 11th embodiment of the present invention;

FIGS. 49A to 49D are graphs showing various aberrations in a middle focal length state in the 11th embodiment of the present invention;

FIGS. 50A to 50D are graphs showing various aberrations at the telephoto end in the 11th embodiment of the present invention;

FIGS. 51A to 51D are graphs showing various aberrations at the wide-angle end in the 12th embodiment of the present invention;

FIGS. 52A to 52D are graphs showing various aberrations in a middle focal length state in the 12th embodiment of the present invention;

FIGS. 54A to 54D are graphs showing various aberrations at the wide-angle end in the 13th embodiment of the present invention;

FIGS. 55A to 55D are graphs showing various aberrations in a middle focal length state in the 13th embodiment of the present invention;

Figures 57A, 57B, 57C, 57D:
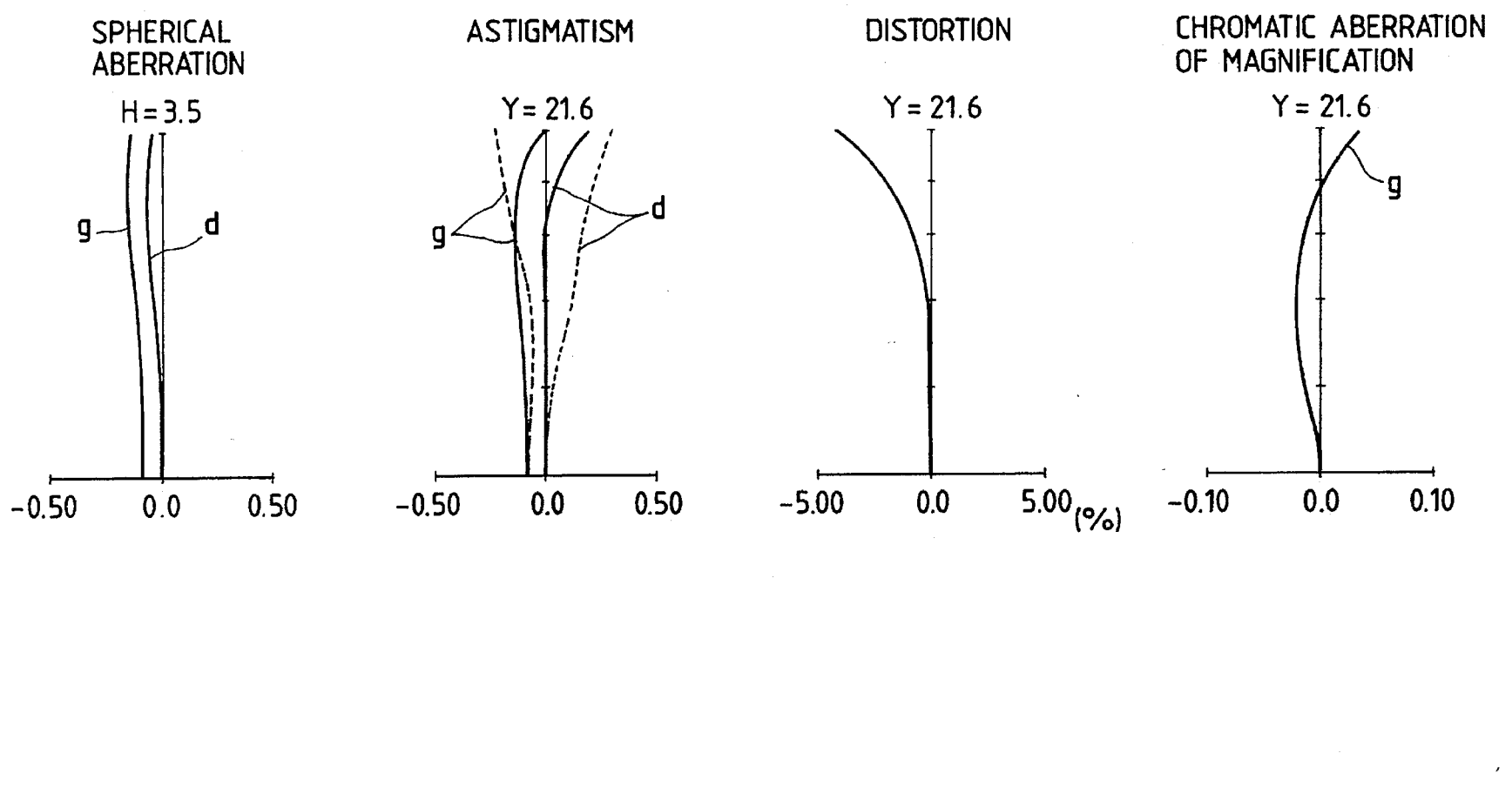

FIGS. 57A to 57D are graphs showing various aberrations at the wide-angle end in the 14th embodiment of the present invention;

FIGS. 58A to 58D are graphs showing various aberrations in a middle focal length state in the 14th embodiment of the present invention;

FIGS. 59A to 59D are graphs showing various aberrations at the telephoto end in the 14th embodiment of the present invention;

FIGS. 61A to 61D are graphs showing various aberrations in a middle focal length state in the 15th embodiment of the present invention;

FIGS. 62A to 62D are graphs showing various aberrations at the telephoto end in the 15th embodiment of the present invention;

FIGS. 63A to 63D are graphs showing various aberrations at the wide-angle end in the 16th embodiment of the present invention;

FIGS. 64A to 64D are graphs showing various aberrations in a middle focal length state in the 16th embodiment of the present invention;

FIGS. 66A to 66D are graphs showing various aberrations at the wide-angle end in the 17th embodiment of the present invention;

FIGS. 68A to 68D are graphs showing various aberrations at the telephoto end in the 17th embodiment of the present invention;

FIGS. 71A to 71D are graphs showing various aberrations in a middle focal length state in the 18th embodiment of the present invention;

FIGS. 72A to 72D are graphs showing various aberrations at the telephoto end in the 18th embodiment of the present invention;

FIGS. 80A to 80C are graphs showing various aberrations in a near distance in-focus state in a middle focal length state in the 19th embodiment of the present invention;

FIGS. 83A to 83C are graphs showing various aberrations in an infinity in-focus state in a middle focal length state in the 20th embodiment of the present invention;

FIGS. 84A to 84C are graphs showing various aberrations in an infinity in-focus state at the telephoto end in the 20th embodiment of the present invention;

FIGS. 85A to 85C are graphs showing various aberrations in a near distance in-focus state at the wide-angle end in the 20th embodiment of the present invention;

FIGS. 86A to 86C are graphs showing various aberrations in a near distance in-focus state in a middle focal length state in the 20th embodiment of the present invention;

FIGS. 88A to 88C are graphs showing various aberrations in an infinity in-focus state at the wide-angle end in the 21st embodiment of the present invention;

FIGS. 89A to 89C are graphs showing various aberrations in an infinity in-focus state in a middle focal length state in the 21st embodiment of the present invention;

FIGS. 91A to 91C are graphs showing various aberrations in a near distance in-focus state at the wide-angle end in the 21st embodiment of the present invention;

FIGS. 92A to 92C are graphs showing various aberrations in a near distance in-focus state in a middle focal length state in the 21st embodiment of the present invention;

FIG. 94 is a schematic view of a zoom lens to which a focusing method of the present invention is applied.

DETAILED DESCRIPTION OF THE PREFERRED EMBODIMENTS

[First to Ninth Embodiments]

FIGS. 1 to 9 are views showing the arrangements of zoom lenses according to the first to ninth embodiments of the present invention, respectively. The preferred embodiments of the present invention will be described in detail hereinafter with reference to the accompanying drawings.

Figure 1:
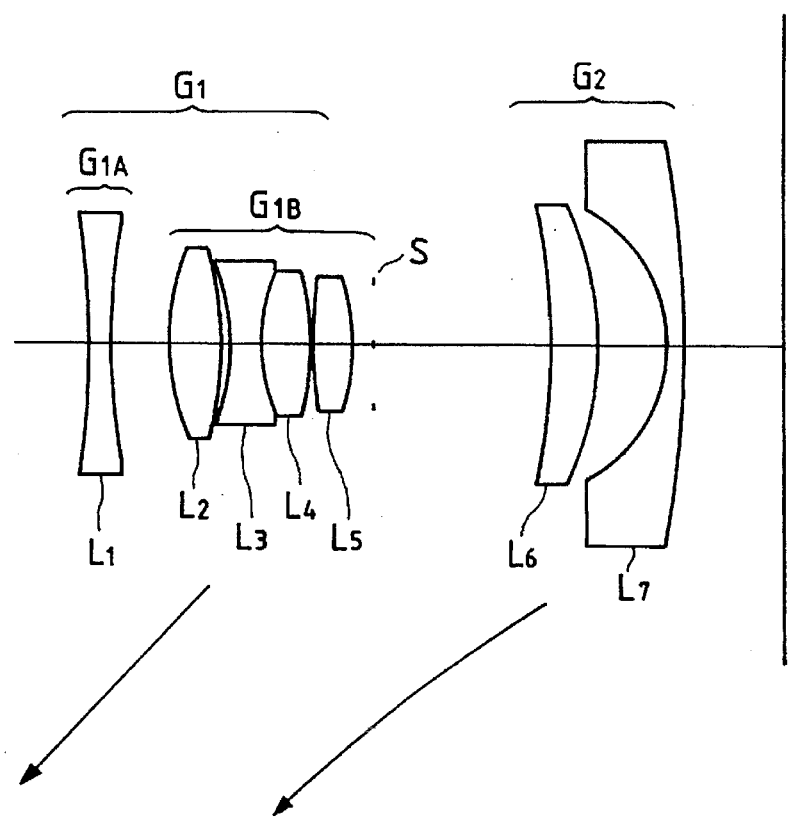
FIG. 1 is a view showing the arrangement of a zoom lens according to a first embodiment of the present invention.
Figure 2:
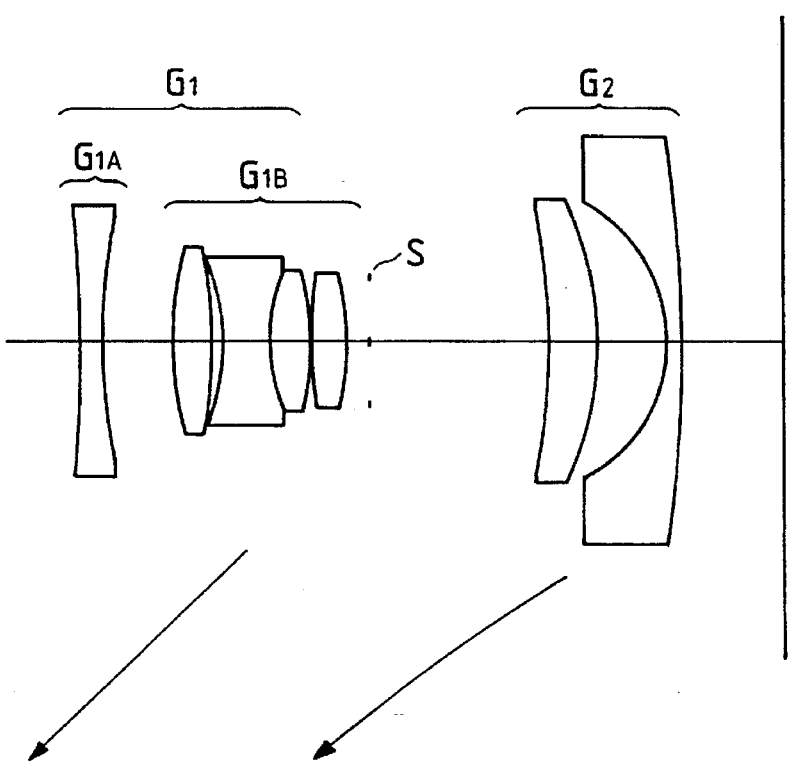
FIG. 2 is a view showing the arrangement of a zoom lens according to a second embodiment of the present invention.
Figure 3:
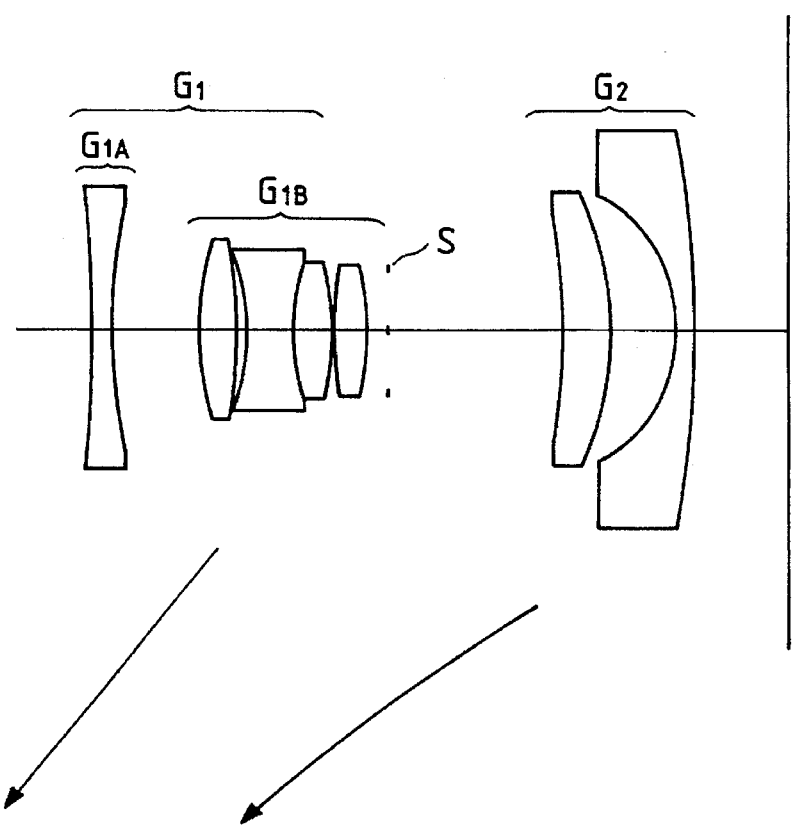
FIG. 3 is a view showing the arrangement of a zoom lens according to a third embodiment of the present invention.
Figure 4:
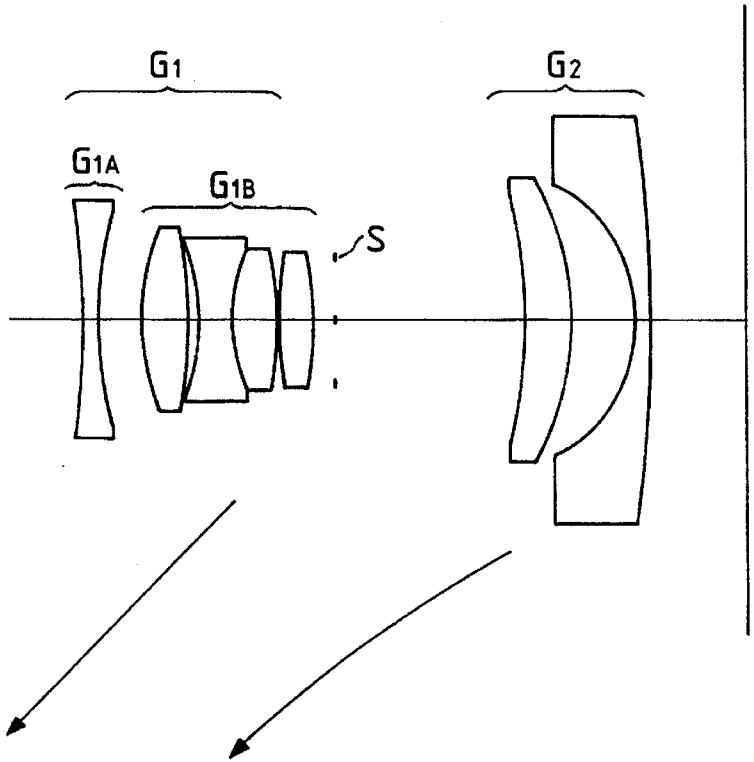
FIG. 4 is a view showing the arrangement of a zoom lens according to a fourth embodiment of the present invention.
Figure 5:
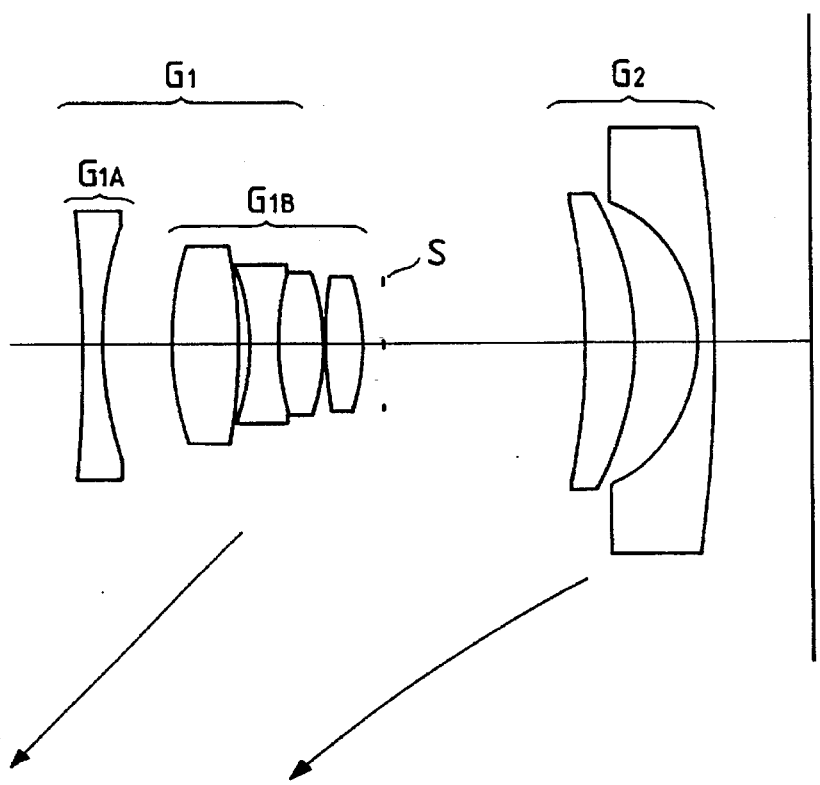
FIG. 5 is a view showing the arrangement of a zoom lens according to a fifth embodiment of the present invention.
Figure 6:
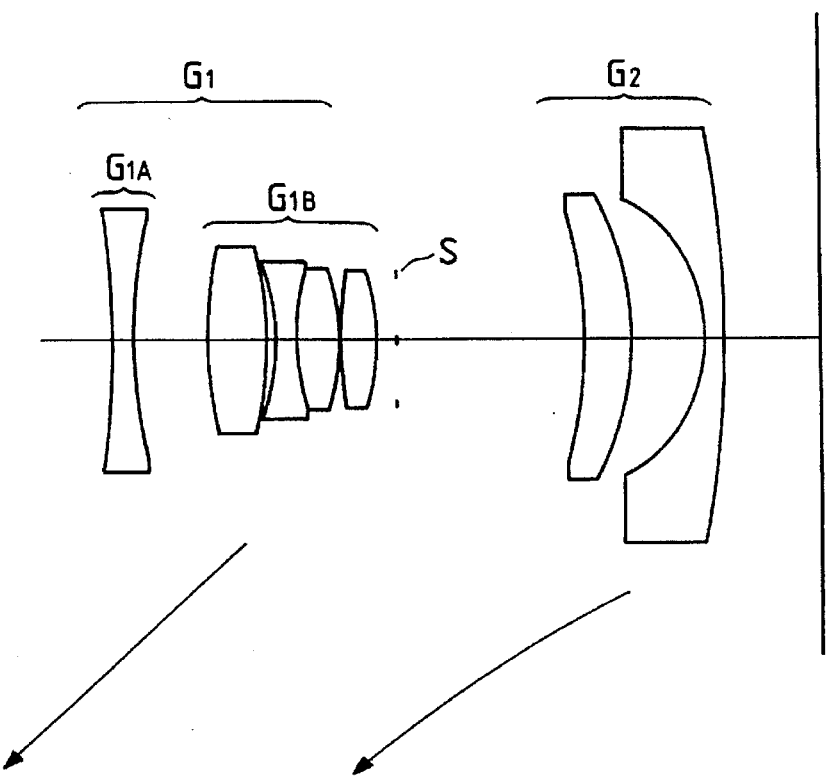
FIG. 6 is a view showing the arrangement of a zoom lens according to a sixth embodiment of the present invention.

The zoom lenses of the first to sixth embodiments shown in FIGS. 1 to 6 have substantially the same lens arrangements. The lens arrangements of respective lens groups will be described in detail below with reference to FIG. 1 showing the first embodiment as a representative.

As shown in FIG. 1, a first lens group G1 of a positive refractive power consists of, in the following order from the object side, a front lens subgroup G1A of a negative refractive power and a rear lens subgroup G1B of a positive refractive power, and adopts a retrofocus type arrangement. The front lens subgroup G1A consists of a biconcave negative lens L1, and the image-side surface of the biconcave negative lens L1 is an aspherical surface. The rear lens subgroup G1B consists of, in the following order from the object side, a biconvex positive lens L2, a biconcave negative lens L3, a biconvex positive lens L4, and a biconvex positive lens L5, and the biconcave negative lens L3 and the biconvex positive lens L4 are cemented together.

Note that the front and rear lens subgroups G1A and G1B are separated by the largest air gap in the first lens group G1.

The second lens group of a negative refractive power consists of, in the following order from the object side, a positive meniscus lens L6 with a concave surface facing the object side, and a negative meniscus lens L7 with a concave surface facing the object side, and the object-side surface of the positive meniscus lens L6 is an aspherical surface.

A stop S is located at a position between the first and second lens groups G1 and G2, and moves together with the first lens group G1 upon zooming.

Figure 7:
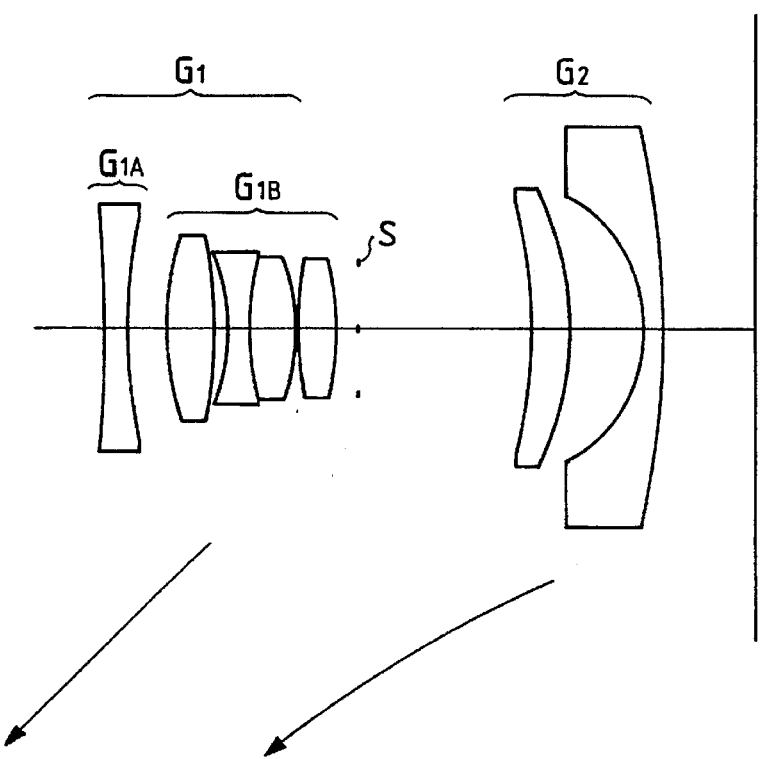
FIG. 7 is a view showing the arrangement of a zoom lens according to a seventh embodiment of the present invention.
Figure 8:
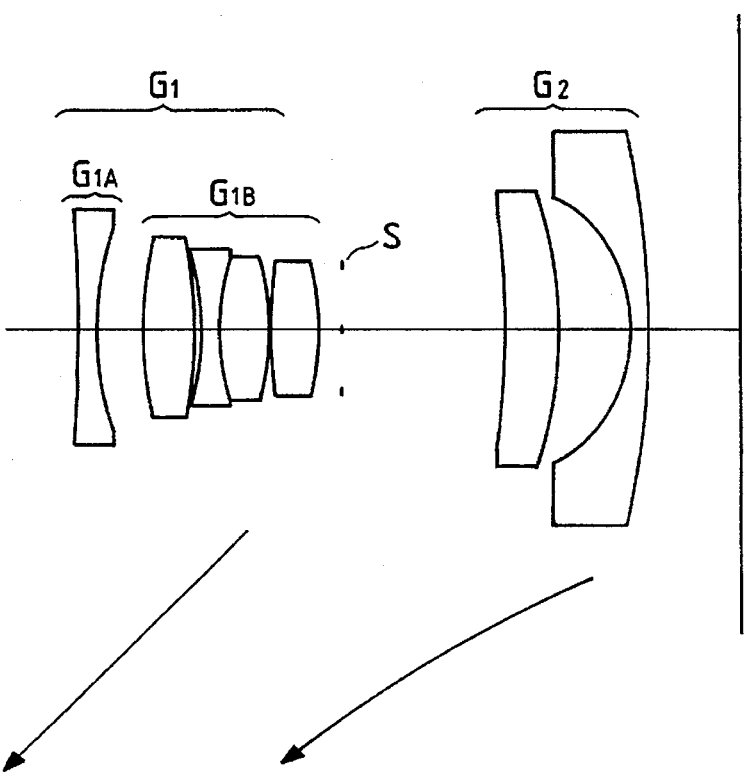
FIG. 8 is a view showing the arrangement of a zoom lens according to an eighth embodiment of the present invention.

The zoom lenses of the seventh and eighth embodiments shown in FIGS. 7 and 8 have substantially the same lens arrangement, and the lens arrangements of respective lens groups will be described in detail below with reference to FIG. 7 showing the seventh embodiment as a representative.

As shown in FIG. 7, a first lens group G1 of a positive refractive power consists of, in the following order from the object side, a front lens subgroup G1A of a negative refractive power and a rear lens subgroup G1B of a positive refractive power, and adopts a retrofocus type arrangement. The front lens subgroup G1A consists of a biconcave negative lens L1, and both the image- and object-side surfaces of the biconcave negative lens L1 are aspherical surfaces. The rear lens subgroup G1B consists of, in the following order from the object side, a biconvex positive lens L2, a biconcave negative lens L3, a biconvex positive lens L4, and a biconvex positive lens L5, and the biconcave negative lens L3 and the biconvex positive lens L4 are cemented together.

Note that the front and rear lens subgroups G1A and G1B are separated by the largest air gap in the first lens group G1.

The second lens group of a negative refractive power consists of, in the following order from the object side, a positive meniscus lens L6 with a concave surface facing the object side, and a negative meniscus lens L7 with a concave surface facing the object side, and the object-side surface of the positive meniscus lens L6 is an aspherical surface.

A stop S is located at a position between the first and second lens groups G1 and G2, and moves together with the first lens group G1 upon zooming.

The lens arrangements of respective lens groups of the ninth embodiment shown in FIG. 9 will be described in detail below.

Figure 9:
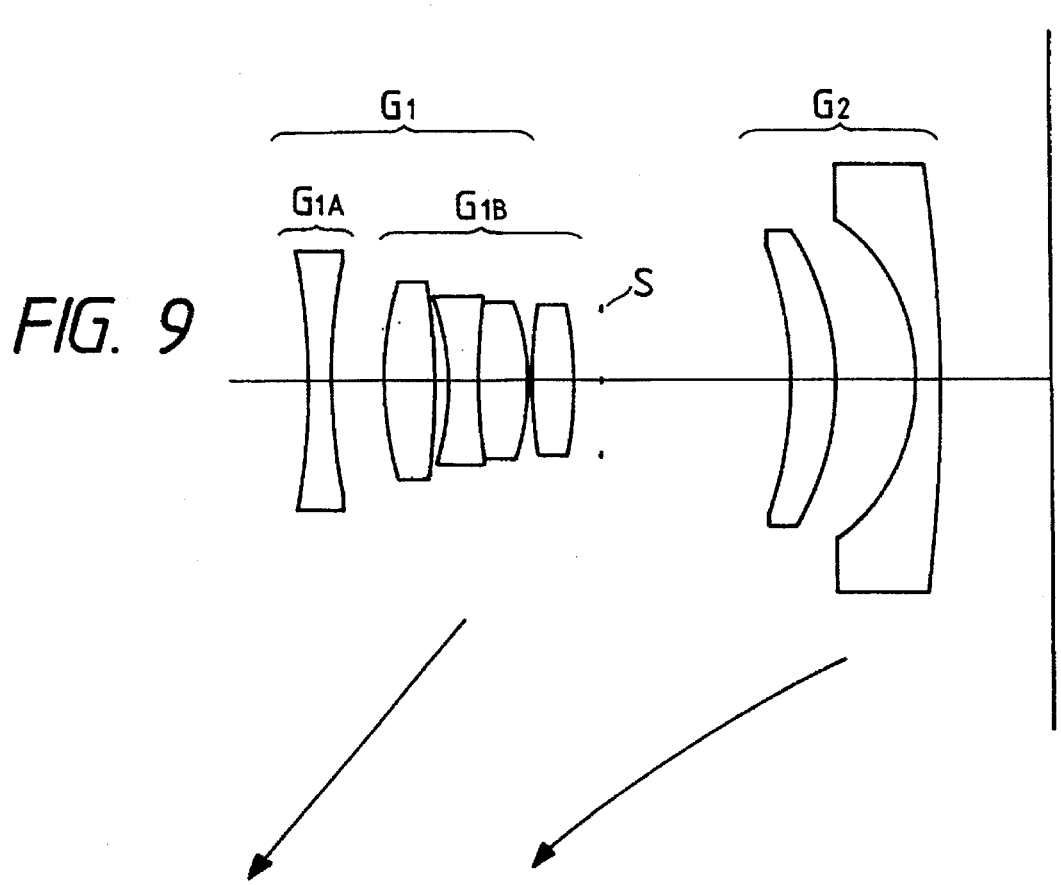
FIG. 9 is a view showing the arrangement of a zoom lens according to a ninth embodiment of the present invention.
Figure 25D:
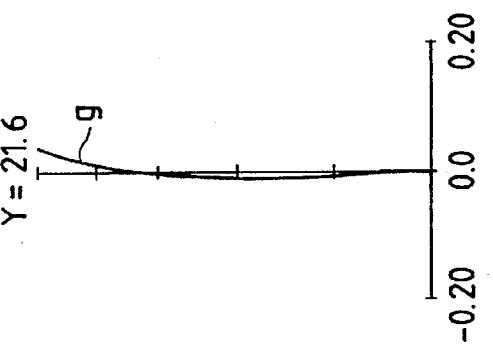
FIGS. 25A to 25D are graphs showing various aberrations at the wide-angle end in the sixth embodiment of the present invention.
Figure 25C:
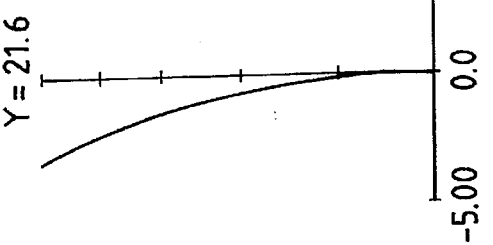
Figure 25B:
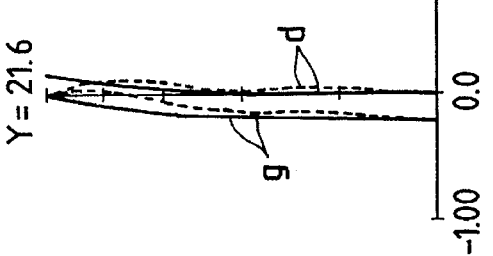
Figure 25A:
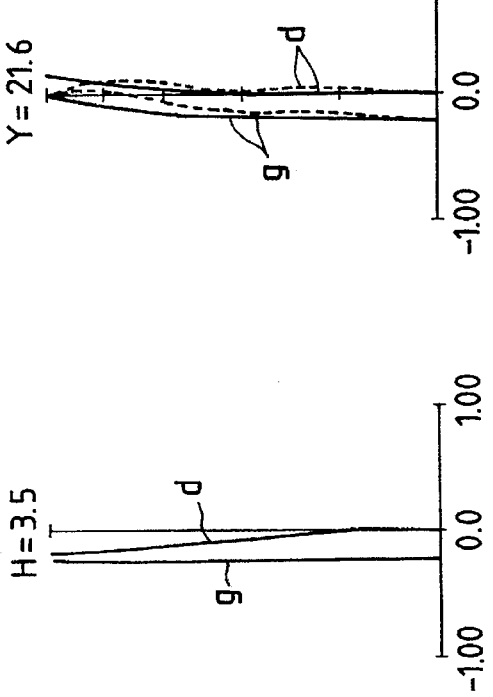

As shown in FIG. 9, a first lens group G1 of a positive refractive power consists of, in the following order from the object side, a front lens subgroup G1A of a negative refractive power and a rear lens subgroup G1B of a positive refractive power, and adopts a retrofocus type arrangement. The front lens subgroup G1A consists of a biconcave negative lens L1. The rear lens subgroup G1B consists of, in the following order from the object side, a biconvex positive lens L2, a biconcave negative lens L3, a biconvex positive lens L4, and a biconvex positive lens L5, and the biconcave negative lens L3 and the biconvex positive lens L4 are cemented together. The object-side surface of the biconvex positive lens L2 is an aspherical surface.

Note that the front and rear lens subgroups G1A and G1B are separated by the largest air gap in the first lens group G1.

The second lens group of a negative refractive power consists of, in the following order from the object side, a positive meniscus lens L6 with a concave surface facing the object side, and a negative meniscus lens L7 with a concave surface facing the object side, and the object-side surface of the positive meniscus lens L6 is an aspherical surface.

A stop S is located at a position between the first and second lens groups G1 and G2, and moves together with the first lens group G1 upon zooming.

Tables below summarize data values and condition corresponding values of the respective embodiments of the present invention.

In the tables, f is the focal length, F is the f-number, and $2\omega$ is the field angle. Furthermore, numerals in the leftmost column represent the order of lens surfaces, r is the radius of curvature of each lens surface, d is the lens surface interval, n and ν are respectively the refractive index and Abbe's number for the d-line ($\lambda$=587.6 nm). In addition, a surface with a mark * attached to the corresponding numeral in the leftmost column is an aspherical surface. The aspherical surface shape is expressed by:

$$X(h) = (h^2/r)/[1+(1-kh^2/r^2)^{1/2}]+C4h^4+C6h^6+C8h^8+C10h^{10}$$

where X(h) is the distance, along the optical axis direction, of the vertex of the aspherical surface from a tangential plane at a height h in a direction perpendicular to the optical axis, r is the paraxial radius of curvature, k is a coefficient of cone, and Cn is an n-th order aspherical surface coefficient.

TABLE 1

Data Values of First Embodiment f = 28.4 to 54.9
F = 4.1 to 8.0
2ω = 76.1 to 44.0°

|   | r | d | v | n |
|---|---|---|---|---|
| 1  | −56.7375 | 1.5070 | 49.3 | 1.74330 |
| 2* | 46.9891  | 4.2069 |      |         |
| 3  | 21.5348  | 3.3907 | 35.7 | 1.62588 |
| 4  | −27.3792 | 0.6907 |      |         |
| 5  | −14.7520 | 2.0721 | 37.9 | 1.72342 |
| 6  | 11.5089  | 3.3907 | 56.1 | 1.56883 |
| 7  | −21.2932 | 0.1256 |      |         |
| 8  | 35.8644  | 2.7628 | 70.4 | 1.48749 |
| 9  | −16.1165 | 1.5070 |      |         |
| 10 | (stop)   | (d10)  |      |         |
| 11*| −31.3517 | 3.3907 | 49.3 | 1.74330 |
| 12 | −20.9159 | 4.6465 |      |         |
| 13 | −10.3190 | 1.2558 | 58.5 | 1.65160 |
| 14 | −76.0103 | (B.f)  |      |         |

Aspherical Surface Coefficients of Second Surface k = −0.1230 × 10      C4 = 0.4272 × 10⁻⁴
C6 = −0.1438 × 10⁻⁶   C8 = 0.3567 × 10⁻⁸
C10 = −0.3526 × 10⁻¹⁰

Aspherical Surface Coefficients of 11th Surface k = 0.1630 × 10       C4 = 0.3601 × 10⁻⁴
C6 = 0.2905 × 10⁻⁶    C8 = −0.2725 × 10⁻⁸
C10 = 0.4734 × 10⁻¹⁰

Changes in interval upon zooming are summarized below:

| f   | 28.3813 | 40.1841 | 54.8801 |
|-----|---------|---------|---------|
| d10 | 12.3785 | 6.7141  | 3.0667  |
| B.f | 7.0048  | 20.5571 | 37.4314 |

Condition corresponding values are summarized below:

(1) D2/fW = 0.148
(2) Q1 = −0.094
(3) f1A/f1 = −1.574
(4) f1B/f1 = 0.811
(5) N1 = 1.74330
(6) v1 = 49.3
(7) N2 = 1.62588
(8) v2 = 35.7

TABLE 2

Data Values of Second Embodiment f = 28.1 to 52.6
F = 4.0 to 7.6
2ω = 76.5 to 45.8°

|   | r | d | v | n |
|---|---|---|---|---|
| 1  | −65.8049 | 1.5070 | 49.4 | 1.74240 |
| 2* | 50.0399  | 4.7720 |      |         |
| 3  | 21.5032  | 2.6372 | 35.7 | 1.62588 |
| 4  | −31.7347 | 0.7535 |      |         |
| 5  | −14.5895 | 3.2023 | 37.9 | 1.72342 |
| 6  | 12.3597  | 2.7628 | 56.1 | 1.56883 |
| 7  | −20.3652 | 0.1256 |      |         |
| 8  | 35.6224  | 2.3860 | 70.5 | 1.48749 |
| 9  | −16.7245 | 1.4711 |      |         |
| 10 | (stop)   | (d10)  |      |         |
| 11*| −30.6156 | 3.3907 | 49.4 | 1.74240 |
| 12 | −20.5974 | 4.6465 |      |         |
| 13 | −10.4052 | 1.2558 | 58.5 | 1.65160 |
| 14 | −76.0143 | (B.f)  |      |         |

Aspherical Surface Coefficients of Second Surface k = −0.1230 × 10      C4 = 0.3604 × 10⁻⁴
C6 = −0.1794 × 10⁻⁶   C8 = 0.3413 × 10⁻⁸
C10 = −0.3461 × 10⁻¹⁰

Aspherical Surface Coefficients of 11th Surface k = 0.1630 × 10       C4 = 0.3473 × 10⁻⁴
C6 = 0.2788 × 10⁻⁶    C8 = −0.2603 × 10⁻⁸
C10 = 0.4453 × 10⁻¹⁰

Changes in interval upon zooming are summarized below:

| f   | 28.1417 | 39.3072 | 52.6176 |
|-----|---------|---------|---------|
| d10 | 12.5211 | 6.9297  | 3.3648  |
| B.f | 6.8072  | 32.7727 | 63.7258 |

Condition corresponding values are summarized below:

(1) D2/fW = 0.170
(2) Q1 = −0.133
(3) f1A/f1 = −1.744
(4) f1B/f1 = 0.830
(5) N1 = 1.74240
(6) v1 = 49.4
(7) N2 = 1.62588
(8) v2 = 35.7

TABLE 3

Data Values of Third Embodiment f = 28.4 to 54.9
F = 4.1 to 7.9
2ω = 76.0 to 44.0°

|   | r | d | v | n |
|---|---|---|---|---|
| 1  | −87.7100 | 1.5070 | 49.3 | 1.74330 |
| 2* | 54.2410  | 6.0278 |      |         |
| 3  | 22.1377  | 2.6372 | 35.7 | 1.62588 |
| 4  | −37.7897 | 0.7535 |      |         |
| 5  | −15.4057 | 3.2023 | 37.9 | 1.72342 |
| 6  | 13.9738  | 2.7628 | 56.4 | 1.50137 |
| 7  | −18.9375 | 0.1256 |      |         |
| 8  | 29.4218  | 2.3860 | 70.4 | 1.48749 |
| 9  | −17.0143 | 1.5070 |      |         |
| 10 | (stop)   | (d10)  |      |         |
| 11*| −31.1612 | 3.3907 | 49.3 | 1.74330 |
| 12 | −21.0138 | 4.6465 |      |         |
| 13 | −10.2781 | 1.2558 | 58.5 | 1.65160 |
| 14 | −76.0150 | (B.f)  |      |         |

Aspherical Surface Coefficients of Second Surface k = −0.1230 × 10      C4 = 0.3267 × 10⁻⁴
C6 = −0.1395 × 10⁻⁶   C8 = 0.2415 × 10⁻⁸
C10 = −0.1632 × 10⁻¹⁰

Aspherical Surface Coefficients of 11th Surface k = 0.1630 × 10       C4 = 0.3820 × 10⁻⁴
C6 = 0.2280 × 10⁻⁶    C8 = −0.1741 × 10⁻⁸
C10 = 0.4222 × 10⁻¹⁰

TABLE 3-continued

Data Values of Third Embodiment

Changes in interval upon zooming are summarized below:

| f | 28.4013 | 40.2782 | 54.9201 |
|---|---|---|---|
| d10 | 12.5469 | 6.9554 | 3.3906 |
| B.f | 6.8643 | 20.2858 | 36.8322 |

Condition corresponding values are summarized below:

(1) D2/fW = 0.212
(2) Q1 = −0.236
(3) f1A/f1 = −2.056
(4) f1B/f1 = 0.870
(5) N1 = 1.74330
(6) ν1 = 49.3
(7) N2 = 1.62588
(8) ν2 = 35.7

TABLE 4

Data Values of Fourth Embodiment $f = 28.4$ to $54.9$
$F = 4.1$ to $8.0$
$2\omega = 75.7$ to $44.1°$

|  | r | d | ν | n |
|---|---|---|---|---|
| 1 | −56.0299 | 1.2558 | 49.4 | 1.74240 |
| 2* | 33.1394 | 3.0767 | | |
| 3 | 18.7164 | 3.2651 | 37.0 | 1.61293 |
| 4 | −27.0709 | 0.6907 | | |
| 5 | −14.7089 | 2.3860 | 37.9 | 1.72342 |
| 6 | 13.1072 | 3.1395 | 59.0 | 1.51823 |
| 7 | −18.8904 | 0.1256 | | |
| 8 | 33.7094 | 2.5116 | 64.1 | 1.51680 |
| 9 | −16.6435 | 1.5070 | | |
| 10 | (stop) | (d10) | | |
| 11* | −28.9901 | 3.3907 | 49.4 | 1.74240 |
| 12 | −19.7606 | 4.5837 | | |
| 13 | −10.4588 | 1.2558 | 57.0 | 1.62280 |
| 14 | −86.9874 | (B.f) | | |

Aspherical Surface Coefficients of Second Surface $k = 0.6262 \times 10$         $C4 = 0.3574 \times 10^{-4}$
$C6 = -0.3046 \times 10^{-6}$  $C8 = 0.8006 \times 10^{-8}$
$C10 = -0.7801 \times 10^{-10}$

Aspherical Surface Coefficients of 11th Surface $k = 0.1998 \times 10$          $C4 = 0.3507 \times 10^{-4}$
$C6 = 0.2243 \times 10^{-6}$    $C8 = -0.2217 \times 10^{-8}$
$C10 = 0.4325 \times 10^{-10}$ Changes in interval upon zooming are summarized below:

| f | 28.3824 | 40.1879 | 54.8818 |
|---|---|---|---|
| d10 | 13.4545 | 7.3318 | 3.3907 |
| B.f | 6.7829 | 20.9022 | 38.4761 |

Condition corresponding values are summarized below:

(1) D2/fW = 0.108
(2) Q1 = −0.257
(3) f1A/f1 = −1.254
(4) f1B/f1 = 0.751
(5) N1 = 1.74240
(6) ν1 = 49.4
(7) N2 = 1.61293
(8) ν2 = 37.0

TABLE 5

Data Values of Fifth Embodiment $f = 28.4$ to $54.9$
$F = 4.1$ to $8.0$
$2\omega = 76.5$ to $44.3°$

|  | r | d | ν | n |
|---|---|---|---|---|
| 1 | −74.8662 | 1.5070 | 49.4 | 1.74240 |
| 2* | 35.7972 | 4.5209 | | |
| 3 | 22.5756 | 4.6465 | 32.2 | 1.67270 |
| 4 | −40.4158 | 0.8163 | | |
| 5 | −15.4795 | 1.7581 | 37.9 | 1.72342 |
| 6 | 14.2133 | 3.2651 | 64.1 | 1.51680 |
| 7 | −17.7787 | 0.1256 | | |
| 8 | 31.1862 | 2.6372 | 70.5 | 1.48749 |
| 9 | −17.2774 | 1.5069 | | |
| 10 | (stop) | (d10) | | |
| 11* | −29.4068 | 3.3907 | 49.4 | 1.74240 |
| 12 | −19.0991 | 4.2697 | | |
| 13 | −10.8762 | 1.2558 | 60.1 | 1.62041 |
| 14 | −113.4903 | (B.f) | | |

Aspherical Surface Coefficients of Second Surface $k = 0.6554 \times 10$          $C4 = 0.2429 \times 10^{-4}$
$C6 = -0.1231 \times 10^{-6}$   $C8 = 0.2400 \times 10^{-8}$
$C10 = -0.1356 \times 10^{-10}$

Aspherical Surface Coefficients of 11th Surface $k = 0.2522 \times 10$          $C4 = 0.3224 \times 10^{-4}$
$C6 = 0.1738 \times 10^{-6}$    $C8 = -0.1907 \times 10^{-8}$
$C10 = 0.3314 \times 10^{-10}$ Changes in interval upon zooming are summarized below:

| f | 28.3819 | 40.1869 | 54.8805 |
|---|---|---|---|
| d10 | 14.4189 | 7.7096 | 3.3908 |
| B.f | 6.7848 | 21.6655 | 40.1874 |

Condition corresponding values are summarized below:

(1) D2/fW = 0.159
(2) Q1 = −0.353
(3) f1A/f1 = −1.430
(4) f1B/f1 = 0.804
(5) N1 = 1.74240
(6) ν1 = 49.4
(7) N2 = 1.67270
(8) ν2 = 32.2

TABLE 6

Data Values of Sixth Embodiment $f = 28.4$ to $54.9$
$F = 4.1$ to $8.0$
$2\omega = 76.5$ to $44.2°$

|  | r | d | ν | n |
|---|---|---|---|---|
| 1 | −60.0630 | 1.5070 | 49.4 | 1.74240 |
| 2* | 42.7585 | 5.0232 | | |
| 3 | 25.0281 | 4.1441 | 32.2 | 1.67270 |
| 4 | −29.8529 | 0.7535 | | |
| 5 | −13.9840 | 1.2558 | 37.9 | 1.72342 |
| 6 | 14.3810 | 3.0139 | 64.1 | 1.51680 |
| 7 | −17.4678 | 0.1256 | | |
| 8 | 35.7700 | 2.5116 | 70.5 | 1.48749 |
| 9 | −15.5560 | 1.5069 | | |
| 10 | (stop) | (d10) | | |
| 11* | −27.7559 | 3.3907 | 49.4 | 1.74240 |
| 12 | −20.4938 | 5.2744 | | |
| 13 | −10.6266 | 1.2558 | 60.1 | 1.62041 |
| 14 | −74.4547 | (B.f) | | |

TABLE 6-continued

Data Values of Sixth Embodiment

Aspherical Surface Coefficients of Second Surface $k = 0.7544 \times 10$      $C4 = 0.3391 \times 10^{-4}$
$C6 = -0.1540 \times 10^{-6}$      $C8 = 0.3361 \times 10^{-8}$
$C10 = -0.2976 \times 10^{-10}$

Aspherical Surface Coefficients of 11th Surface $k = 0.2274 \times 10$      $C4 = 0.3779 \times 10^{-4}$
$C6 = 0.1243 \times 10^{-6}$      $C8 = -0.7186 \times 10^{-9}$
$C10 = 0.2901 \times 10^{-10}$ Changes in interval upon zooming are summarized below:

| f | 28.3819 | 40.1872 | 54.8814 |
|---|---|---|---|
| d10 | 13.2903 | 7.2675 | 3.3906 |
| B.f | 6.7290 | 20.7850 | 38.2808 |

Condition corresponding values are summarized below:

(1) D2/fW = 0.177
(2) Q1 = −0.168
(3) f1A/f1 = −1.512
(4) f1B/f1 = 0.815
(5) N1 = 1.74240
(6) v1 = 49.4
(7) N2 = 1.67270
(8) v2 = 32.2

TABLE 7

Data Values of Seventh Embodiment $f = 28.4$ to $54.9$
$F = 4.0$ to $7.7$
$2\omega = 76.4$ to $44.1°$

| | r | d | v | n |
|---|---|---|---|---|
| 1* | −76.5278 | 1.5070 | 49.4 | 1.74240 |
| 2* | 40.2179 | 3.0139 | | |
| 3 | 25.7127 | 3.3907 | 42.0 | 1.66755 |
| 4 | −29.2007 | 1.0046 | | |
| 5 | −12.1866 | 1.5070 | 33.9 | 1.80384 |
| 6 | 18.2780 | 3.3907 | 41.4 | 1.57501 |
| 7 | −14.0414 | 0.2512 | | |
| 8 | 42.8368 | 2.7628 | 69.9 | 1.51860 |
| 9 | −16.1793 | 1.5463 | | |
| 10 | (stop) | (d10) | | |
| 11* | −27.9881 | 3.0139 | 49.4 | 1.74240 |
| 12 | −20.3641 | 5.2744 | | |
| 13 | −10.6593 | 1.5070 | 47.1 | 1.67003 |
| 14 | −60.2907 | (B.f) | | |

Aspherical Surface Coefficients of First Surface $k = 0.1000 \times 10$      $C4 = 0.3602 \times 10^{-6}$
$C6 = 0.2475 \times 10^{-7}$      $C8 = 0.1399 \times 10^{-9}$
$C10 = 0.9289 \times 10^{-13}$

Aspherical Surface Coefficients of Second Surface $k = 0.8823 \times 10$      $C4 = 0.2947 \times 10^{-4}$
$C6 = -0.7058 \times 10^{-7}$      $C8 = 0.3026 \times 10^{-8}$
$C10 = -0.6801 \times 10^{-10}$

Aspherical Surface Coefficients of 11th Surface $k = 0.5274$      $C4 = 0.2817 \times 10^{-4}$
$C6 = 0.3224 \times 10^{-6}$      $C8 = -0.4034 \times 10^{-8}$
$C10 = 0.4582 \times 10^{-10}$ Changes in interval upon zooming are summarized below:

| f | 28.3883 | 40.1897 | 54.8760 |
|---|---|---|---|
| d10 | 12.6392 | 6.7872 | 3.0198 |
| B.f | 6.7368 | 20.5611 | 37.7647 |

TABLE 7-continued

Data Values of Seventh Embodiment

Condition corresponding values are summarized below:

(1) D2/fW = 0.106
(2) Q1 = −0.311
(3) f1A/f1 = −1.607
(4) f1B/f1 = 0.802
(5) N1 = 1.74240
(6) v1 = 49.4
(7) N2 = 1.66755
(8) v2 = 42.0

TABLE 8

Data Values of Eighth Embodiment $f = 28.4$ to $54.9$
$F = 4.0$ to $7.8$
$2\omega = 76.9$ to $44.0°$

| | r | d | v | n |
|---|---|---|---|---|
| 1* | −118.1150 | 1.3764 | 49.4 | 1.74240 |
| 2* | 31.1598 | 3.2239 | | |
| 3 | 27.2609 | 3.8163 | 42.0 | 1.66755 |
| 4 | −27.0308 | 0.4001 | | |
| 5 | −16.0676 | 1.2558 | 33.9 | 1.80384 |
| 6 | 15.7992 | 3.6623 | 41.4 | 1.57501 |
| 7 | −18.1716 | 0.1256 | | |
| 8 | 49.2616 | 3.6163 | 70.1 | 1.51860 |
| 9 | −15.3497 | 1.5463 | | |
| 10 | (stop) | (d10) | | |
| 11* | −41.2061 | 4.0025 | 49.4 | 1.74240 |
| 12 | −27.4875 | 5.2595 | | |
| 13 | −10.4981 | 1.2558 | 47.1 | 1.67003 |
| 14 | −60.5192 | (B.f) | | |

Aspherical Surface Coefficients of First Surface $k = 0.4457 \times 10$      $C4 = -0.1710 \times 10^{-6}$
$C6 = 0.4114 \times 10^{-7}$      $C8 = 0.2723 \times 10^{-9}$
$C10 = -0.1362 \times 10^{-10}$

Aspherical Surface Coefficients of Second Surface $k = 0.1047 \times 10^2$      $C4 = 0.3709 \times 10^{-4}$
$C6 = 0.7716 \times 10^{-7}$      $C8 = 0.3758 \times 10^{-8}$
$C10 = -0.3620 \times 10^{-10}$

Aspherical Surface Coefficients of 11th Surface $k = -0.1863 \times 10$      $C4 = 0.3606 \times 10^{-4}$
$C6 = 0.1461 \times 10^{-6}$      $C8 = 0.6054 \times 10^{-9}$
$C10 = 0.1994 \times 10^{-10}$ Changes in interval upon zooming are summarized below:

| f | 28.3799 | 40.1781 | 54.8657 |
|---|---|---|---|
| d10 | 11.9008 | 6.4986 | 3.0199 |
| B.f | 6.7157 | 19.7860 | 36.0574 |

Condition corresponding values are summarized below:

(1) D2/fW = 0.114
(2) Q1 = −0.583
(3) f1A/f1 = −1.524
(4) f1B/f1 = 0.794
(5) N1 = 1.74240
(6) v1 = 49.4
(7) N2 = 1.66755
(8) v2 = 42.0

TABLE 9

Data Values of Ninth Embodiment f = 28.4 to 54.9
F = 4.0 to 7.9
2ω = 73.6 to 43.9°

| | r | d | v | n |
|---|---|---|---|---|
| 1 | −44.4733 | 1.5070 | 49.4 | 1.77279 |
| 2 | 39.5118 | 3.1395 | | |
| 3* | 17.6256 | 3.3907 | 33.8 | 1.64831 |
| 4 | −45.7168 | 1.0046 | | |
| 5 | −13.8657 | 1.5070 | 33.9 | 1.80384 |
| 6 | 23.9837 | 3.3907 | 59.0 | 1.51823 |
| 7 | −12.3057 | 0.2512 | | |
| 8 | 28.7016 | 2.7628 | 69.9 | 1.51860 |
| 9 | −24.1907 | 1.7171 | | |
| 10 | (stop) | (d10) | | |
| 11* | −23.2902 | 3.0139 | 49.4 | 1.74240 |
| 12 | −16.5211 | 5.2744 | | |
| 13 | −11.6765 | 1.5070 | 52.3 | 1.74810 |
| 14 | −95.1569 | (B.f) | | |

Aspherical Surface Coefficients of Third Surface k = 0.1000 × 10          C4 = −0.4989 × 10$^{-4}$
C6 = −0.1043 × 10$^{-8}$   C8 = −0.1190 × 10$^{-7}$
C10 = 0.1632 × 10$^{-9}$ Aspherical Surface Coefficients of 11th Surface k = 0.1000 × 10          C4 = 0.6652 × 10$^{-5}$
C6 = −0.9996 × 10$^{-7}$   C8 = −0.8917 × 10$^{-9}$
C10 = 0.2542 × 10$^{-10}$ Changes in interval upon zooming are summarized below:

| f | 28.3882 | 40.1893 | 54.8751 |
|---|---|---|---|
| d10 | 12.2468 | 6.3948 | 2.6274 |
| B.f | 7.1622 | 20.9862 | 28.1895 |

Condition corresponding values are summarized below:

(1) D2/fW = 0.111
(2) Q1 = −0.059
(3) f1A/f1 = −1.222
(4) f1B/f1 = 0.754
(5) N1 = 1.77279
(6) v1 = 49.4
(7) N2 = 1.64831
(8) v2 = 33.8

FIGS. 10A to 10D, FIGS. 13A to 13D, FIGS. 16A to 16D, FIGS. 19A to 19D, FIGS. 22A to 22D, FIGS. 25A to 25D, FIGS. 28A to 28D, FIGS. 31A to 31D, and FIGS. 34A to 34D are graphs showing various aberrations at the wide-angle end in the first to ninth embodiments, respectively, FIGS. 11A to 11D, FIGS. 14A to 14D, FIGS. 17A to 17D, FIGS. 20A to 20D, FIGS. 23A to 23D, FIGS. 26A to 26D, FIGS. 29A to 29D, FIGS. 32A to 32D, and FIGS. 35A to 35D are graphs showing various aberrations in a middle focal length state in the first to ninth embodiments, respectively, and FIGS. 12A to 12D, FIGS. 15A to 15D, FIGS. 18A to 18D, FIGS. 21A to 21D, FIGS. 24A to 24D, FIGS. 27A to 27D, FIGS. 30A to 30D, FIGS. 33A to 33D, and FIGS. 36A to 36D are graphs showing various aberrations at the telephoto end in the first to ninth embodiments, respectively.

In each graph, H is the height of incident rays, Y is the image height, d is the d-line (λ=587.6 nm), and g is the g-line (λ=435.8 nm). In each graph showing an astigmatism, a dotted curve represents the meridional image plane, and a solid curve represents the sagittal image plane.

As can be seen from these graphs, various aberrations are satisfactorily corrected, and the respective embodiments have good imaging performance.

[10th Embodiment]

Figure 37:
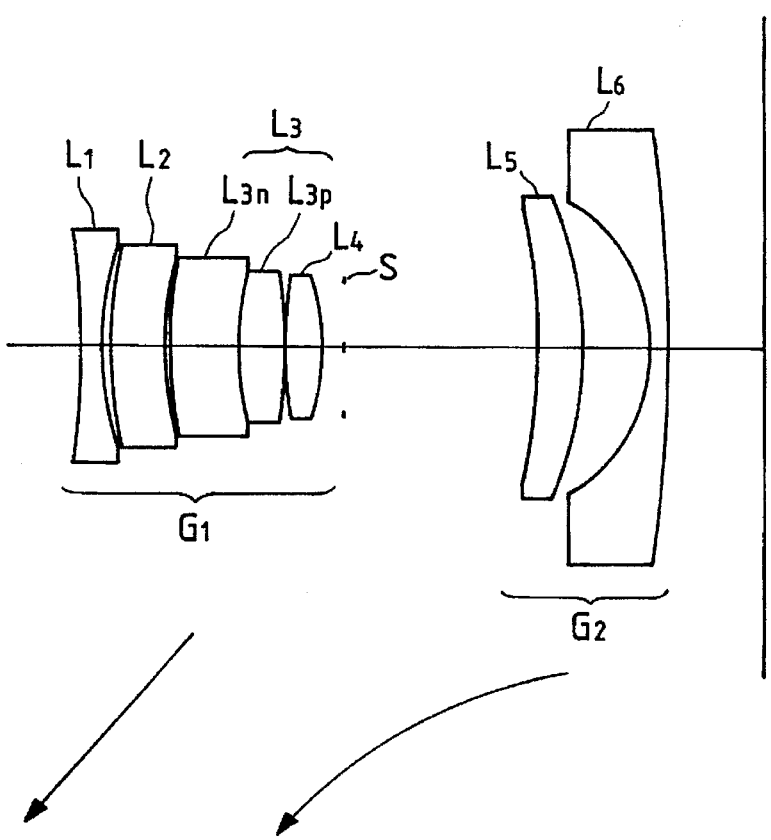
FIG. 37 is a view showing the arrangement of a zoom lens according to a 10th embodiment of the present invention.

FIG. 37 shows the detailed lens arrangements of the respective lens groups of the 10th embodiment.

As shown in FIG. 37, a first lens group G1 of a positive refractive power consists of, in the following order from the object side, a biconcave first lens component L1 having a negative refractive power, a meniscus-shaped second lens component L2 which has a positive refractive power and has a convex surface facing the object side, a biconvex third lens component L3 having a positive refractive power, and a biconvex fourth lens component L4 having a positive refractive power, and an air gap is present between each two adjacent ones of the first to fourth lens components. The object-side surface of the second lens component L2 is an aspherical surface, and the third lens component L3 is a cemented lens consisting of, in the following order from the object side, a negative meniscus lens L3n with a convex surface facing the object side, and a biconvex positive lens L3p.

A second lens group G2 of a negative refractive power consists of, in the following order from the object side, a meniscus-shaped fifth lens component L5 which has a positive refractive power and has a concave surface facing the object side, and a meniscus-shaped sixth lens component L6 which has a negative refractive power and has a concave surface facing the object side, and the object-side surface of the fifth lens component L5 is an aspherical surface. A stop S is located at a position between the first and second lens groups G1 and G2, and moves together with the first lens group G1 upon zooming.

Table 10 below summarizes data values and condition corresponding values according to the 10th embodiment of the present invention.

In Table 10, f is the focal length, F is the f-number, and 2ω is the field angle. Furthermore, numerals in the leftmost column represent the order of lens surfaces, r is the radius of curvature of each lens surface, d is the lens surface interval, n and v are respectively the refractive index and Abbe's number for the d-line (λ=587.6 nm). In addition, a surface with a mark * attached to the corresponding numeral in the leftmost column is an aspherical surface. The aspherical surface shape is expressed by:

$$X(h)=(h^2/r)/[1+(1-kh^2/r^2)^{1/2}]+C4h^4+C6h^6+C8h^8+C10h^{10}$$

where X(h) is the distance, along the optical axis direction, of the vertex of the aspherical surface from a tangential plane at a height h in a direction perpendicular to the optical axis, r is the paraxial radius of curvature, k is a coefficient of cone, and Cn is an n-th order aspherical surface coefficient.

TABLE 10

Data Values of 10th Embodiment f = 28.4 to 54.9, F = 4.1 to 7.9, 2ω = 76.6 to 44.0°

| | r | d | v | n |
|---|---|---|---|---|
| 1 | −43.6157 | 1.2558 | 50.8 | 1.65844 |
| 2 | 19.3378 | 0.6279 | | |
| 3* | 20.0046 | 3.7674 | 40.5 | 1.73077 |
| 4 | 22.2298 | 0.3139 | | |
| 5 | 29.6533 | 4.6465 | 38.0 | 1.72342 |
| 6 | 15.9814 | 3.2651 | 70.2 | 1.48749 |
| 7 | −34.9077 | 0.1256 | | |
| 8 | 35.1275 | 2.6372 | 70.2 | 1.48749 |
| 9 | −12.4333 | 1.5069 | | |

TABLE 10-continued

Data Values of 10th Embodiment

| 10 | (stop) | (d10) | | |
|---|---|---|---|---|
| 11* | −31.9573 | 3.3907 | 49.4 | 1.74240 |
| 12 | −21.7329 | 4.8348 | | |
| 13 | −10.4768 | 1.2558 | 60.3 | 1.62041 |
| 14 | −85.4225 | (B.f) | | |

(Aspherical Surface Coefficients of Third Surface)

k = −0.1345 × 10        C4 = −0.8849 × 10$^{-4}$
C6 = −0.8754 × 10$^{-6}$     C8 = −0.5813 × 10$^{-8}$
C10 = −0.1178 × 10$^{-9}$ (Aspherical Surface Coefficients of 11th Surface)

k = 0.1967 × 10        C4 = 0.3937 × 10$^{-4}$
C6 = 0.1769 × 10$^{-6}$     C8 = −0.5888 × 10$^{-9}$
C10 = 0.2974 × 10$^{-10}$

Changes in interval upon zooming are summarized below:

| f | 28.3789 | 40.2433 | 54.8684 |
|---|---|---|---|
| d10 | 13.2148 | 7.2156 | 3.3907 |
| B.f | 6.7130 | 20.6181 | 37.7588 |

Condition corresponding values are summarized below:

(1) f1/fL2 = 0.139
(2) f1/fL4 = 1.16
(3) D/f1 = 0.750
(4) f1/fL3 = 0.518
(5) f1/fL1 = −1.10
(6) DL3/fW = 0.279
(7) N3n - N3p = 0.23593
(8) v3p - v3n = 32.2

[11th Embodiment]

Figure 38:
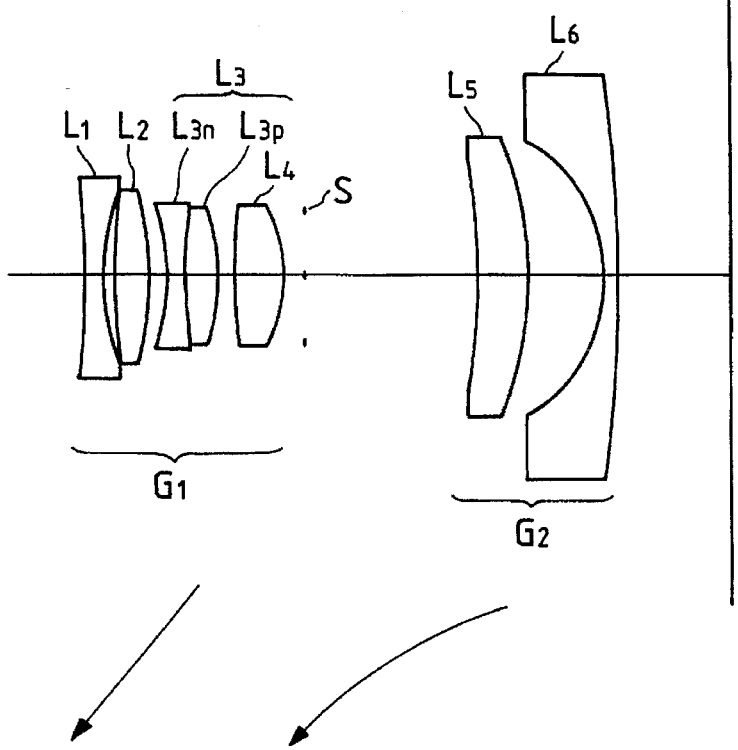
FIG. 38 is a view showing the arrangement of a zoom lens according to a 11th embodiment of the present invention.

FIG. 38 shows the detailed lens arrangements of the respective lens groups of the 11th embodiment.

As shown in FIG. 38, a first lens group G1 of a positive refractive power consists of, in the following order from the object side, a biconcave first lens component L1 having a negative refractive power, a biconvex second lens component L2 having a positive refractive power, a meniscus-shaped third lens component L3 which has a negative refractive power and has a concave surface facing the object side, and a biconvex fourth lens component L4 having a positive refractive power, and an air gap is present between each two adjacent ones of the first to fourth lens components. The image-side surface of the first lens component L1 is an aspherical surface, and the third lens component L3 is a cemented lens consisting of, in the following order from the object side, a biconcave negative lens L3n, and a biconvex positive lens L3p.

A second lens group G2 of a negative refractive power consists of, in the following order from the object side, a meniscus-shaped fifth lens component L5 which has a positive refractive power and has a concave surface facing the object side, and a meniscus-shaped sixth lens component L6 which has a negative refractive power and has a concave surface facing the object side, and the object-side surface of the fifth lens component L5 is an aspherical surface. A stop S is located at a position between the first and second lens groups G1 and G2, and moves together with the first lens group G1 upon zooming.

Table 11 below summarizes data values and condition corresponding values according to the 11th embodiment of the present invention.

In Table 11, f is the focal length, F is the f-number, and 2ω is the field angle. Furthermore, numerals in the leftmost column represent the order of lens surfaces, r is the radius of curvature of each lens surface, d is the lens surface interval, n and ν are respectively the refractive index and Abbe's number for the d-line (λ=587.6 nm). In addition, a surface with a mark * attached to the corresponding numeral in the leftmost column is an aspherical surface. The aspherical surface shape is expressed by:

$$X(h)=(h^2/r)/[1+(1-kh^2/r^2)^{1/2}]+C4h^4+C6h^6+C8h^8+C10h^{10}$$

where X(h) is the distance, along the optical axis direction, of the vertex of the aspherical surface from a tangential plane at a height h in a direction perpendicular to the optical axis, r is the paraxial radius of curvature, k is a coefficient of cone, and Cn is an n-th order aspherical surface coefficient.

TABLE 11

Data Values of 11th Embodiment f = 28.4 to 54.9, F = 4.0 to 7.8, 2ω = 76.9 to 44.0°

| | r | d | ν | n |
|---|---|---|---|---|
| 1 | −82.1543 | 1.2558 | 49.4 | 1.74240 |
| 2* | 21.9911 | 0.7535 | | |
| 3 | 51.5656 | 2.3860 | 30.1 | 1.69895 |
| 4 | −22.7131 | 1.1302 | | |
| 5 | −17.6285 | 1.2558 | 33.9 | 1.80384 |
| 6 | 28.0328 | 2.3860 | 70.2 | 1.48749 |
| 7 | −16.0714 | 1.1302 | | |
| 8 | 58.7935 | 3.3907 | 70.1 | 1.51860 |
| 9 | −11.3829 | 1.5070 | | |
| 10 | (stop) | (d10) | | |
| 11* | −34.6664 | 3.3907 | 49.4 | 1.74240 |
| 12 | −24.2026 | 5.2744 | | |
| 13 | −10.4645 | 1.2558 | 60.1 | 1.62041 |
| 14 | −73.3546 | (B.f) | | |

(Aspherical Surface Coefficients of Second Surface)

k = 0.9573 × 10        C4 = 0.8933 × 10$^{-4}$
C6 = 0.2611 × 10$^{-6}$     C8 = 0.4354 × 10$^{-8}$
C10 = 0.8326 × 10$^{-11}$ (Aspherical Surface Coefficients of 11th Surface)

k = 0.2633 × 10        C4 = 0.4186 × 10$^{-4}$
C6 = 0.1830 × 10$^{-6}$     C8 = 0.3808 × 10$^{-10}$
C10 = 0.2219 × 10$^{-10}$

Changes in interval upon zooming are summarized below:

| f | 28.3808 | 40.1850 | 54.8774 |
|---|---|---|---|
| d10 | 11.8149 | 6.1549 | 2.5115 |
| B.f | 7.5957 | 21.5919 | 39.0127 |

Condition corresponding values are summarized below:

(1) f1/fL2 = 0.940
(2) f1/fL4 = 1.15
(3) D/f1 = 0.637
(4) f1/fL3 = −0.498
(5) f1/fL1 = −0.924
(6) DL3/fW = 0.128
(7) N3n - N3p = 0.31635
(8) v3p - v3n = 36.3

[12th Embodiment]

Figure 39:
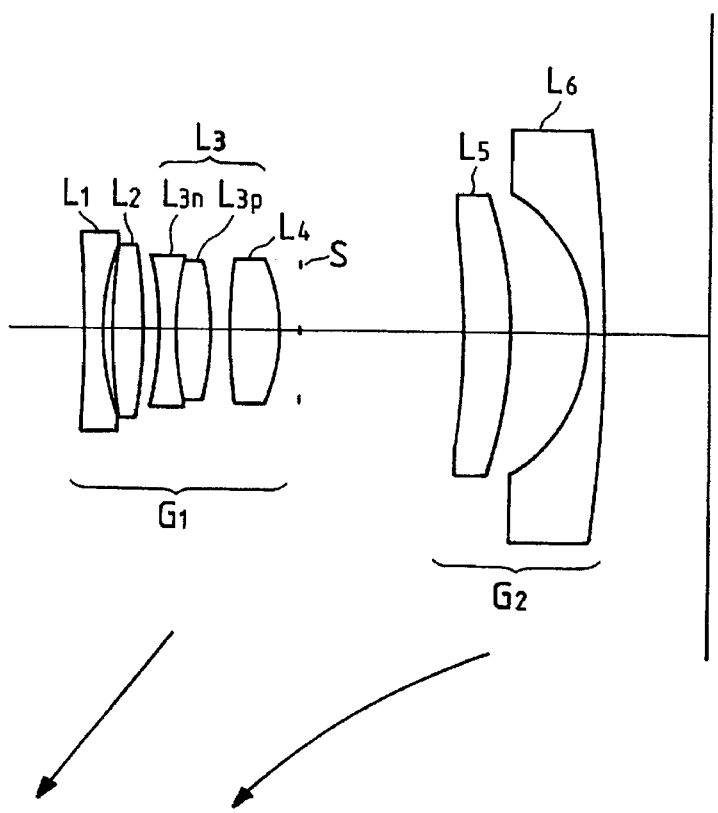
FIG. 39 is a view showing the arrangement of a zoom lens according to a 12th embodiment of the present invention.

FIG. 39 shows the detailed lens arrangements of respective lens groups of the 12th embodiment.

As shown in FIG. 39, a first lens group G1 of a positive refractive power consists of, in the following order from the object side, a biconcave first lens component L1 having a negative refractive power, a biconvex second lens component L2 having a positive refractive power, a meniscus-shaped third lens component L3 which has a negative refractive power and has a concave surface facing the object side, and a biconvex fourth lens component L4 having a positive refractive power, and an air gap is present between each two adjacent ones of the first to fourth lens components. The image-side surface of the first lens component L1 is an aspherical surface, and the third lens component L3 is a cemented lens consisting of, in the following order from the object side, a biconcave negative lens L3n, and a biconvex positive lens L3p.

A second lens group G2 of a negative refractive power consists of, in the following order from the object side, a meniscus-shaped fifth lens component L5 which has a positive refractive power and has a concave surface facing the object side, and a meniscus-shaped sixth lens component L6 which has a negative refractive power and has a concave surface facing the object side, and the object-side surface of the fifth lens component L5 is an aspherical surface. A stop S is located at a position between the first and second lens groups G1 and G2, and moves together with the first lens group G1 upon zooming.

Table 12 below summarizes data values and condition corresponding values according to the 12th embodiment of the present invention.

In Table 12, f is the focal length, F is the f-number, and 2ω is the field angle. Furthermore, numerals in the leftmost column represent the order of lens surfaces, r is the radius of curvature of each lens surface, d is the lens surface interval, n and ν are respectively the refractive index and Abbe's number for the d-line (λ=587.6 nm). In addition, a surface with a mark * attached to the corresponding numeral in the leftmost column is an aspherical surface. The aspherical surface shape is expressed by:

$$X(h)=(h^2/r)/[1+(1-kh^2/r^2)^{1/2}]+C4h^4+C6h^6+C8h^8+C10h^{10}$$

where X(h) is the distance, along the optical axis direction, of the vertex of the aspherical surface from a tangential plane at a height h in a direction perpendicular to the optical axis, r is the paraxial radius of curvature, k is a coefficient of cone, and Cn is an n-th order aspherical surface coefficient.

TABLE 12

Data Values of 12th Embodiment f = 28.4 to 54.9, F = 4.0 to 7.8, 2ω = 76.9 to 43.9°

| | r | d | ν | n |
|---|---|---|---|---|
| 1 | −62.7900 | 1.2558 | 49.4 | 1.74240 |
| 2* | 24.5871 | 0.6279 | | |
| 3 | 43.4158 | 2.2604 | 27.6 | 1.75520 |
| 4 | −29.5004 | 0.9418 | | |
| 5 | −21.8611 | 1.2558 | 33.9 | 1.80384 |
| 6 | 18.2856 | 2.5116 | 70.2 | 1.48749 |
| 7 | −18.2311 | 1.3814 | | |
| 8 | 48.1822 | 3.3907 | 70.1 | 1.51860 |
| 9 | −11.3293 | 1.5070 | | |
| 10 | (stop) | (d10) | | |
| 11* | −36.2278 | 3.3907 | 49.4 | 1.74240 |
| 12 | −25.7556 | 5.5255 | | |
| 13 | −10.4351 | 1.2558 | 61.2 | 1.58913 |
| 14 | −94.1914 | (B.f) | | |

(Aspherical Surface Coefficients of Second Surface)

k = 0.1185 × 10²       C4 = 0.8629 × 10⁻⁴
C6 = 0.5315 × 10⁻⁶     C8 = −0.6674 × 10⁻⁸
C10 = 0.2603 × 10⁻⁹

(Aspherical Surface Coefficients of 11th Surface)

k = 0.2729 × 10        C4 = 0.4247 × 10⁻⁴
C6 = 0.8959 × 10⁻⁷     C8 = 0.1758 × 10⁻⁸
C10 = 0.1048 × 10⁻¹⁰

Changes in interval upon zooming are summarized below:

| f | 28.3813 | 40.1860 | 54.8791 |
|---|---|---|---|
| d10 | 11.7219 | 6.1185 | 2.5116 |
| B.f | 7.3009 | 21.0225 | 38.1014 |

TABLE 12-continued

Data Values of 12th Embodiment

Condition corresponding values are summarized below:

(1) f1/fL2 = 0.916
(2) f1/fL4 = 1.20
(3) D/f1 = 0.631
(4) f1/fL3 = −0.531
(5) f1/fL1 = −0.912
(6) DL3/fW = 0.133
(7) N3n - N3p = 0.31635
(8) ν3p - ν3n = 36.3

[13th Embodiment]

Figure 40:
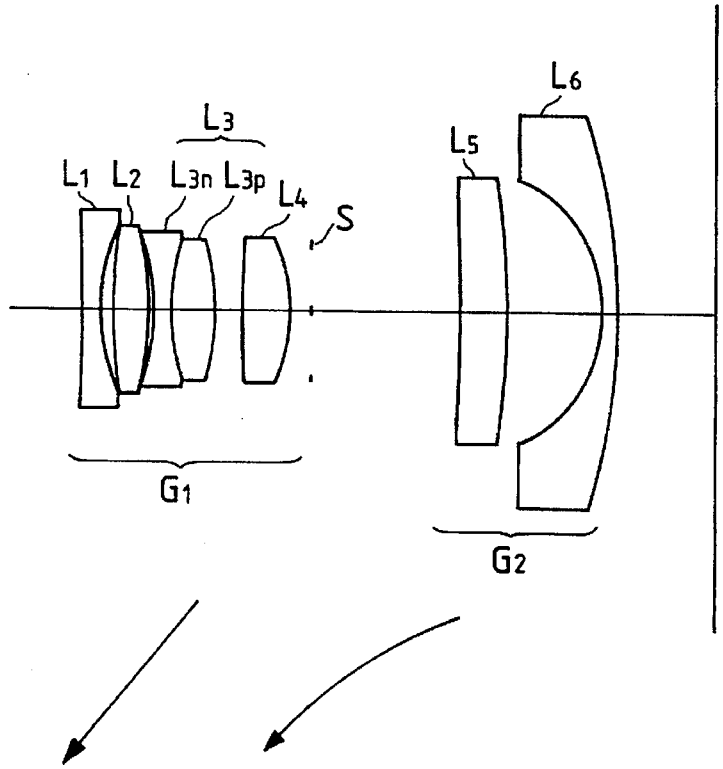
FIG. 40 is a view showing the arrangement of a zoom lens according to a 13th embodiment of the present invention.

FIG. 40 shows the detailed lens arrangements of respective lens groups of the 13th embodiment.

As shown in FIG. 40, a first lens group G1 of a positive refractive power consists of, in the following order from the object side, a first lens component L1 which has a negative refractive power and has a biconcave shape at least near the optical axis, a biconvex second lens component L2 having a positive refractive power, a meniscus-shaped third lens component L3 which has a negative refractive power and has a concave surface facing the object side, and a biconvex fourth lens component L4 having a positive refractive power, and an air gap is present between each two adjacent ones of the first to fourth lens components. Both the object- and image-side surfaces of the first lens component L1 are aspherical surfaces, and the third lens component L3 is a cemented lens consisting of, in the following order from the object side, a biconcave negative lens L3n, and a biconvex positive lens L3p.

A second lens group G2 of a negative refractive power consists of, in the following order from the object side, a meniscus-shaped fifth lens component L5 which has a positive refractive power and has a concave surface facing the object side, and a meniscus-shaped sixth lens component L6 which has a negative refractive power and has a concave surface facing the object side, and the object-side surface of the fifth lens component L5 is an aspherical surface. A stop S is located at a position between the first and second lens groups G1 and G2, and moves together with the first lens group G1 upon zooming.

Table 13 below summarizes data values and condition corresponding values according to the 13th embodiment of the present invention.

In Table 13, f is the focal length, F is the f-number, and 2ω is the field angle. Furthermore, numerals in the leftmost column represent the order of lens surfaces, r is the radius of curvature of each lens surface, d is the lens surface interval, n and ν are respectively the refractive index and Abbe's number for the d-line (λ=587.6 nm). In addition, a surface with a mark * attached to the corresponding numeral in the leftmost column is an aspherical surface. The aspherical surface shape is expressed by:

$$X(h)=(h^2/r)/[1+(1-kh^2/r^2)^{1/2}]+C4h^4+C6h^6+C8h^8+C10h^{10}$$

where X(h) is the distance, along the optical axis direction, of the vertex of the aspherical surface from a tangential plane at a height h in a direction perpendicular to the optical axis, r is the paraxial radius of curvature, k is a coefficient of cone, and Cn is an n-th order aspherical surface coefficient.

TABLE 13

Data Values of 13th Embodiment f = 28.4 to 54.9, F = 4.0 to 7.8, 2ω = 76.5 to 43.8°

|  | r | d | ν | n |
|---|---|---|---|---|
| 1* | −375.6894 | 1.3814 | 49.4 | 1.74240 |
| 2* | 20.6770 | 0.7535 | | |
| 3 | 41.0394 | 2.5116 | 27.6 | 1.75520 |
| 4 | −20.6383 | 0.3139 | | |
| 5 | −15.6404 | 1.2558 | 33.9 | 1.80384 |
| 6 | 16.1584 | 3.1395 | 70.2 | 1.48749 |
| 7 | −15.6051 | 1.8837 | | |
| 8 | 99.9455 | 3.3907 | 70.1 | 1.51860 |
| 9 | −10.8218 | 1.5070 | | |
| 10 | (stop) | (d10) | | |
| 11* | −64.1056 | 3.3907 | 49.4 | 1.74240 |
| 12 | −56.8272 | 6.6557 | | |
| 13 | −9.7163 | 1.2558 | 60.3 | 1.62041 |
| 14 | −38.7667 | (B.f) | | |

(Aspherical Surface Coefficients of First Surface)

k = −0.9900 × 10²  C4 = 0.7634 × 10⁻⁴
C6 = −0.5937 × 10⁻⁶  C8 = −0.7162 × 10⁻⁸
C10 = 0.1393 × 10⁻⁹

(Aspherical Surface Coefficients of Second Surface)

k = 0.9927 × 10  C4 = 0.1441 × 10⁻³
C6 = −0.1408 × 10⁻⁷  C8 = −0.2213 × 10⁻⁷
C10 = −0.1571 × 10⁻⁹

(Aspherical Surface Coefficients of 11th Surface)

k = −0.5380 × 10  C4 = 0.4378 × 10⁻⁴
C6 = 0.2181 × 10⁻⁶  C8 = 0.7409 × 10⁻⁹
C10 = 0.2559 × 10⁻¹⁰

Changes in interval upon zooming are summarized below:

| f | 28.3809 | 40.1857 | 54.8780 |
|---|---|---|---|
| d10 | 10.7184 | 6.0346 | 3.0198 |
| B.f | 6.7654 | 19.1990 | 34.6740 |

Condition corresponding values are summarized below:

(1) f1/fL2 = 1.12
(2) f1/fL4 = 1.09
(3) D/f1 = 0.706
(4) f1/fL3 = −0.717
(5) f1/fL1 = −0.786
(6) DL3/fW = 0.155
(7) N3n − N3p = 0.31635
(8) ν3p − ν3n = 36.3

[14th Embodiment]

Figure 41:
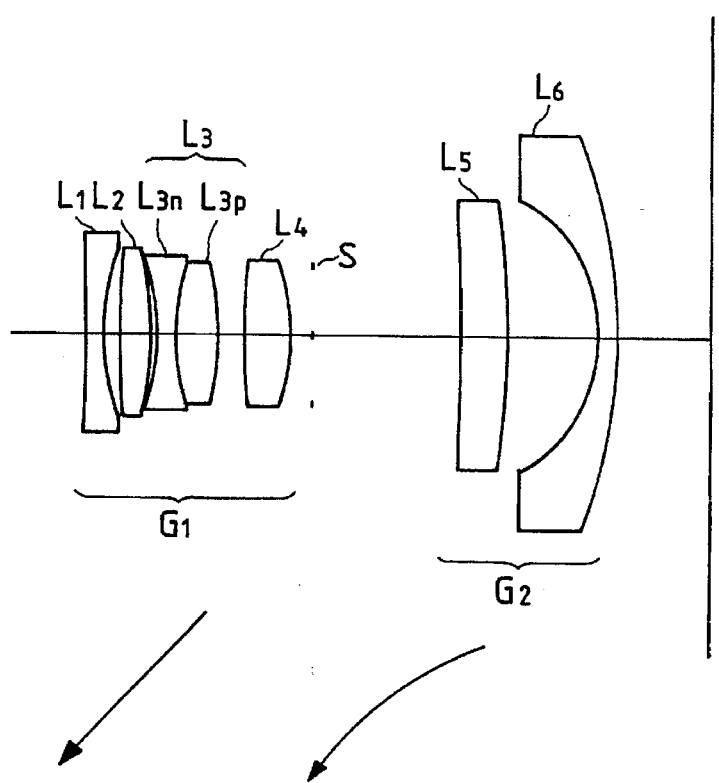
FIG. 41 is a view showing the arrangement of a zoom lens according to a 14th embodiment of the present invention.

FIG. 41 shows the detailed lens arrangements of respective lens groups of the 14th embodiment.

As shown in FIG. 41, a first lens group G1 of a positive refractive power consists of, in the following order from the object side, a first lens component L1 which has a negative refractive power and has a biconcave shape at least near the optical axis, a biconvex second lens component L2 having a positive refractive power, a meniscus-shaped third lens component L3 which has a negative refractive power and has a concave surface facing the object side, and a biconvex fourth lens component L4 having a positive refractive power, and an air gap is present between each two adjacent ones of the first to fourth lens components. Both the object- and image-side surfaces of the first lens component L1 are aspherical surfaces, and the third lens component L3 is a cemented lens consisting of, in the following order from the object side, a biconcave negative lens L3n, and a biconvex positive lens L3p.

A second lens group G2 of a negative refractive power consists of, in the following order from the object side, a meniscus-shaped fifth lens component L5 which has a positive refractive power and has a concave surface facing the object side, and a meniscus-shaped sixth lens component L6 which has a negative refractive power and has a concave surface facing the object side, and the object-side surface of the fifth lens component L5 is an aspherical surface. A stop S is located at a position between the first and second lens groups G1 and G2, and moves together with the first lens group G1 upon zooming.

Table 14 below summarizes data values and condition corresponding values according to the 14th embodiment of the present invention.

In Table 14, f is the focal length, F is the f-number, and 2ω is the field angle. Furthermore, numerals in the leftmost column represent the order of lens surfaces, r is the radius of curvature of each lens surface, d is the lens surface interval, n and ν are respectively the refractive index and Abbe's number for the d-line (λ=587.6 nm). In addition, a surface with a mark * attached to the corresponding numeral in the leftmost column is an aspherical surface. The aspherical surface shape is expressed by:

$$X(h)=(h^2/r)/[1+(1-kh^2/r^2)^{1/2}]+C4h^4+C6h^6+C8h^8+C10h^{10}$$

where X(h) is the distance, along the optical axis direction, of the vertex of the aspherical surface from a tangential plane at a height h in a direction perpendicular to the optical axis, r is the paraxial radius of curvature, k is a coefficient of cone, and Cn is an n-th order aspherical surface coefficient.

TABLE 14

Data Values of 14th Embodiment f = 28.4 to 54.9, F = 4.0 to 7.8, 2ω = 77.0 to 43.9°

|  | r | d | ν | n |
|---|---|---|---|---|
| 1* | −253.4924 | 1.3814 | 49.4 | 1.74240 |
| 2* | 23.6918 | 0.8791 | | |
| 3 | 50.2199 | 2.5116 | 42.0 | 1.66755 |
| 4 | −18.4561 | 0.3139 | | |
| 5 | −14.2511 | 1.2558 | 33.9 | 1.80384 |
| 6 | 15.5302 | 3.1395 | 41.6 | 1.57501 |
| 7 | −16.1968 | 1.8837 | | |
| 8 | 82.7337 | 3.3907 | 70.1 | 1.51860 |
| 9 | −11.6146 | 1.5070 | | |
| 10 | (stop) | (d10) | | |
| 11* | −64.1220 | 3.3907 | 49.4 | 1.74240 |
| 12 | −56.3781 | 6.6557 | | |
| 13 | −9.7690 | 1.2558 | 47.1 | 1.67003 |
| 14 | −33.3507 | (B.f) | | |

(Aspherical Surface Coefficients of First Surface)

k = −0.8987 × 10³  C4 = 0.1354 × 10⁻⁴
C6 = 0.2047 × 10⁻⁶  C8 = −0.7638 × 10⁻⁸
C10 = 0.7882 × 10⁻¹⁰

(Aspherical Surface Coefficients of Second Surface)

k = 0.1213 × 10²  C4 = 0.8422 × 10⁻⁴
C6 = 0.5091 × 10⁻⁶  C8 = −0.1451 × 10⁻⁷
C10 = 0.1213 × 10⁻⁹

(Aspherical Surface Coefficients of 11th Surface)

k = −0.6527 × 10  C4 = 0.4368 × 10⁻⁴
C6 = 0.2725 × 10⁻⁶  C8 = 0.7977 × 10⁻¹⁰
C10 = 0.2741 × 10⁻¹⁰

Changes in interval upon zooming are summarized below:

| f | 28.3818 | 40.1871 | 54.8810 |
|---|---|---|---|
| d10 | 10.6697 | 6.0156 | 3.0198 |
| B.f | 6.7117 | 19.0783 | 34.4708 |

TABLE 14-continued

Data Values of 14th Embodiment

Condition corresponding values are summarized below:

(1) f1/fL2 = 1.01
(2) f1/fL4 = 1.04
(3) D/f1 = 0.712
(4) f1/fL3 = −0.617
(5) f1/fL1 = −0.712
(6) DL3/fW = 0.155
(7) N3n - N3p = 0.22883
(8) ν3p - ν3n = 7.7

[15th Embodiment]

Figure 42:
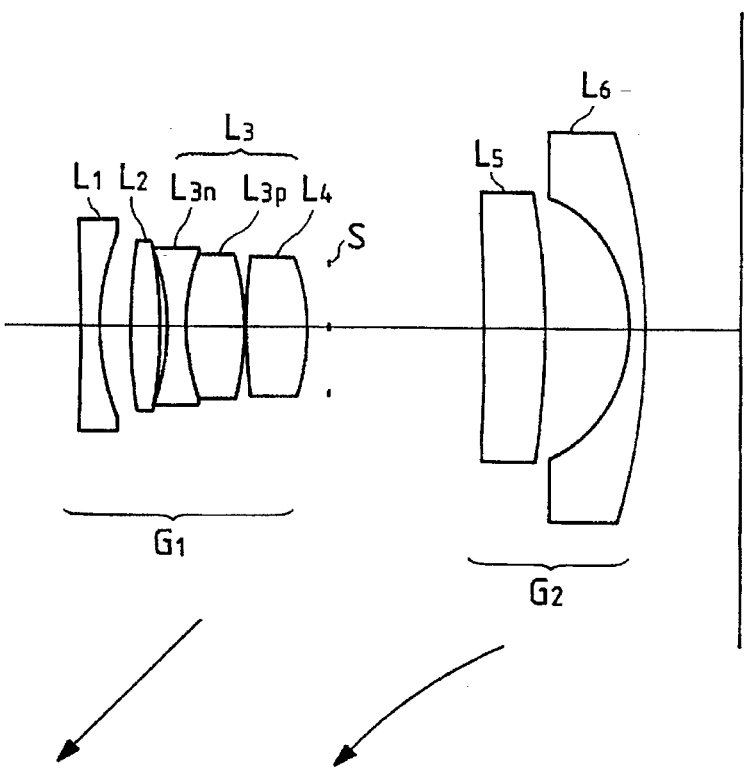
FIG. 42 is a view showing the arrangement of a zoom lens according to a 15th embodiment of the present invention.

FIG. 42 shows the detailed lens arrangements of respective lens groups of the 15th embodiment.

As shown in FIG. 42, a first lens group G1 of a positive refractive power consists of, in the following order from the object side, a first lens component L1 which has a negative refractive power and has a biconcave shape at least near the optical axis, a biconvex second lens component L2 having a positive refractive power, a meniscus-shaped third lens component L3 which has a negative refractive power and has a concave surface facing the object side, and a biconvex fourth lens component L4 having a positive refractive power, and an air gap is present between each two adjacent ones of the first to fourth lens components. Both the object- and image-side surfaces of the first lens component L1 are aspherical surfaces, and the third lens component L3 is a cemented lens consisting of, in the following order from the object side, a biconcave negative lens L3n, and a biconvex positive lens L3p.

A second lens group G2 of a negative refractive power consists of, in the following order from the object side, a meniscus-shaped fifth lens component L5 which has a positive refractive power and has a concave surface facing the object side, and a meniscus-shaped sixth lens component L6 which has a negative refractive power and has a concave surface facing the object side, and the object-side surface of the fifth lens component L5 is an aspherical surface. A stop S is located at a position between the first and second lens groups G1 and G2, and moves together with the first lens group G1 upon zooming.

Table 15 below summarizes data values and condition corresponding values according to the 15th embodiment of the present invention.

In Table 15, f is the focal length, F is the f-number, and 2ω is the field angle. Furthermore, numerals in the leftmost column represent the order of lens surfaces, r is the radius of curvature of each lens surface, d is the lens surface interval, n and ν are respectively the refractive index and Abbe's number for the d-line (λ=587.6 nm). In addition, a surface with a mark * attached to the corresponding numeral in the leftmost column is an aspherical surface. The aspherical surface shape is expressed by:

$$X(h) = (h^2/r)/[1+(1-kh^2/r^2)^{1/2}] + C_4 h^4 + C_6 h^6 + C_8 h^8 + C_{10} h^{10}$$

where X(h) is the distance, along the optical axis direction, of the vertex of the aspherical surface from a tangential plane at a height h in a direction perpendicular to the optical axis, r is the paraxial radius of curvature, k is a coefficient of cone, and Cn is an n-th order aspherical surface coefficient.

TABLE 15

Data Values of 15th Embodiment f = 28.4 to 54.9, F = 4.0 to 7.8, 2ω = 77.0 to 43.9°

| | r | d | ν | n |
|---|---|---|---|---|
| 1* | −200.3930 | 1.5070 | 49.4 | 1.74240 |
| 2* | 25.2981 | 1.8837 | | |
| 3 | 32.5403 | 2.3860 | 42.0 | 1.66755 |
| 4 | −21.6035 | 0.3767 | | |
| 5 | −15.1449 | 1.2558 | 33.9 | 1.80384 |
| 6 | 14.7519 | 4.1441 | 41.6 | 1.57501 |
| 7 | −17.8386 | 0.1256 | | |
| 8 | 62.5300 | 4.3953 | 70.1 | 1.51860 |
| 9 | −12.9460 | 1.5070 | | |
| 10 | (stop) | (d10) | | |
| 11* | −59.0741 | 4.3953 | 49.4 | 1.74240 |
| 12 | −45.8430 | 5.9023 | | |
| 13 | −9.9459 | 1.2558 | 47.1 | 1.67003 |
| 14 | −38.1003 | (B.f) | | |

(Aspherical Surface Coefficients of First Surface)

k = −0.4009 × 10³   C4 = 0.6736 × 10⁻⁵
C6 = 0.5173 × 10⁻⁷   C8 = −0.8493 × 10⁻⁹
C10 = 0.1111 × 10⁻¹⁰

(Aspherical Surface Coefficients of Second Surface)

k = 0.1164 × 10²   C4 = 0.5483 × 10⁻⁴
C6 = 0.1729 × 10⁻⁶   C8 = −0.4906 × 10⁻⁸
C10 = 0.8360 × 10⁻¹⁰

(Aspherical Surface Coefficients of 11th Surface)

k = −0.6775 × 10   C4 = 0.4204 × 10⁻⁴
C6 = 0.2786 × 10⁻⁶   C8 = −0.2928 × 10⁻⁹
C10 = 0.3002 × 10⁻¹⁰

Changes in interval upon zooming are summarized below:

| f | 28.3812 | 40.1844 | 54.8748 |
|---|---|---|---|
| d10 | 10.8869 | 6.1007 | 3.0198 |
| B.f | 6.7264 | 19.2410 | 34.8167 |

Condition corresponding values are summarized below:

(1) f1/fL2 = 1.43
(2) f1/fL4 = 1.34
(3) D/f1 = 0.770
(4) f1/fL3 = −0.847
(5) f1/fL1 = −0.692
(6) DL3/fW = 0.190
(7) N3n - N3p = 0.22883
(8) ν3p - ν3n = 7.7

[16th Embodiment]

Figure 43:
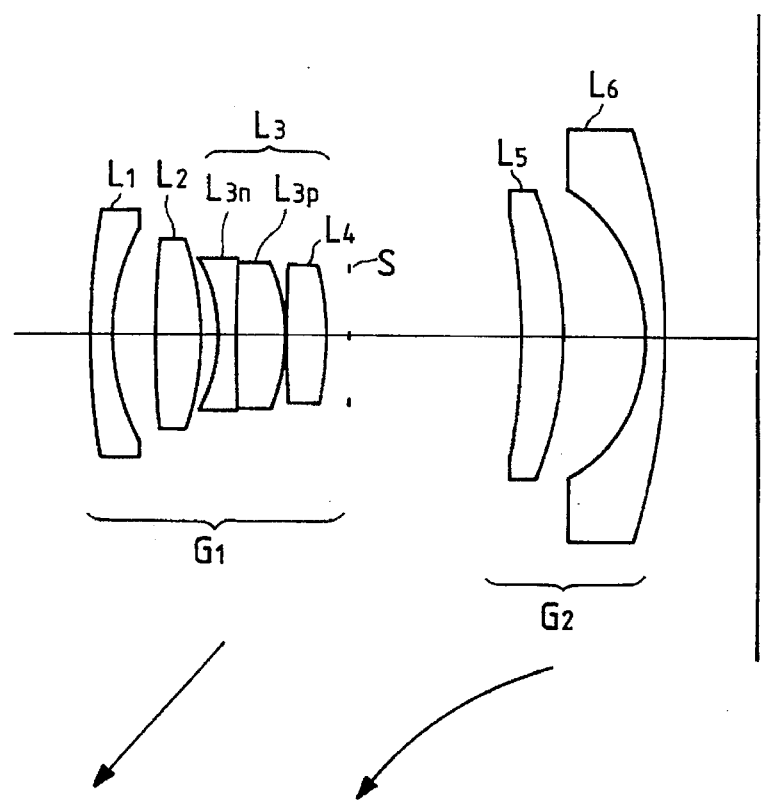
FIG. 43 is a view showing the arrangement of a zoom lens according to a 16th embodiment of the present invention.

FIG. 43 shows the detailed lens arrangements of respective lens groups of the 16th embodiment.

As shown in FIG. 43, a first lens group G1 of a positive refractive power consists of, in the following order from the object side, a meniscus-shaped first lens component L1 which has a negative refractive power and has a convex surface facing the object side, a biconvex second lens component L2 having a positive refractive power, a meniscus-shaped third lens component L3 which has a negative refractive power and has a concave surface facing the object side, and a biconvex fourth lens component L4 having a positive refractive power, and an air gap is present between each two adjacent ones of the first to fourth lens components. The image-side surface of the first lens component L1 is an aspherical surface, and the third lens component L3 is a cemented lens consisting of, in the following order from the object side, a biconcave negative lens L3n, and a biconvex positive lens L3p.

A second lens group G2 of a negative refractive power consists of, in the following order from the object side, a meniscus-shaped fifth lens component L5 which has a positive refractive power and has a concave surface facing the object side, and a meniscus-shaped sixth lens component L6 which has a negative refractive power and has a concave surface facing the object side, and the object-side surface of the fifth lens component L5 is an aspherical surface. A stop S is located at a position between the first and second lens groups G1 and G2, and moves together with the first lens group G1 upon zooming.

Table 16 below summarizes data values and condition corresponding values according to the 16th embodiment of the present invention.

In Table 16, f is the focal length, F is the f-number, and 2ω is the field angle. Furthermore, numerals in the leftmost column represent the order of lens surfaces, r is the radius of curvature of each lens surface, d is the lens surface interval, n and ν are respectively the refractive index and Abbe's number for the d-line (Xλ=587.6 nm). In addition, a surface with a mark * attached to the corresponding numeral in the leftmost column is an aspherical surface. The aspherical surface shape is expressed by:

$$X(h)=(h^2/r)/[1+(1-kh^2/r^2)^{1/2}]+C4h^4+C6h^6+C8h^8+C10h^{10}h$$

where X(h) is the distance, along the optical axis direction, of the vertex of the aspherical surface from a tangential plane at a height h in a direction perpendicular to the optical axis, r is the paraxial radius of curvature, k is a coefficient of cone, and Cn is an n-th order aspherical surface coefficient.

TABLE 16

Data Values of 16th Embodiment f = 28.4 to 54.9, F = 4.0 to 7.7, 2ω = 76.3 to 44.9°

|  | r | d | ν | n |
|---|---|---|---|---|
| 1 | 45.9137 | 1.5070 | 49.4 | 1.74240 |
| 2* | 17.0879 | 3.1395 | | |
| 3 | 50.0880 | 3.3907 | 35.7 | 1.62588 |
| 4 | −17.9024 | 0.9795 | | |
| 5 | −11.1030 | 1.5070 | 33.9 | 1.80384 |
| 6 | 106.4617 | 3.3907 | 60.7 | 1.56384 |
| 7 | −11.5964 | 0.2512 | | |
| 8 | 5111.9225 | 2.7628 | 69.9 | 1.51860 |
| 9 | −15.7397 | 1.5729 | | |
| 10 | (stop) | (d10) | | |
| 11* | −32.5949 | 3.0139 | 49.4 | 1.74240 |
| 12 | −24.8415 | 6.0278 | | |
| 13 | −10.9165 | 1.5070 | 52.3 | 1.74810 |
| 14 | −37.6591 | (B.f) | | |

(Aspherical Surface Coefficients of Second Surface)

k = 0.2990 × 10     C4 = 0.5275 × 10⁻⁴
C6 = 0.6119 × 10⁻⁶   C8 = 0.2883 × 10⁻⁸
C10 = 0.9026 × 10⁻¹⁰

(Aspherical Surface Coefficients of 11th Surface)

k = −0.9183     C4 = 0.3001 × 10⁻⁴
C6 = 0.3118 × 10⁻⁶   C8 = −0.1809 × 10⁻⁸
C10 = 0.2062 × 10⁻¹⁰

Changes in interval upon zooming are summarized below:

| f | 28.3883 | 40.1899 | 54.8767 |
|---|---|---|---|
| d10 | 12.1985 | 6.3465 | 2.5791 |
| B.f | 6.4615 | 20.2858 | 37.4898 |

Condition corresponding values are summarized below:

(1) f1/fL2 = 1.02
(2) f1/fL4 = 0.726
(3) D/f1 = 0.770
(4) f1/fL3 = −0.337
(5) f1/fL1 = −0.586
(6) DL3/fW = 0.173
(7) N3n − N3p = 0.24000
(8) ν3p − ν3n = 26.8

[17th Embodiment]

Figure 44:
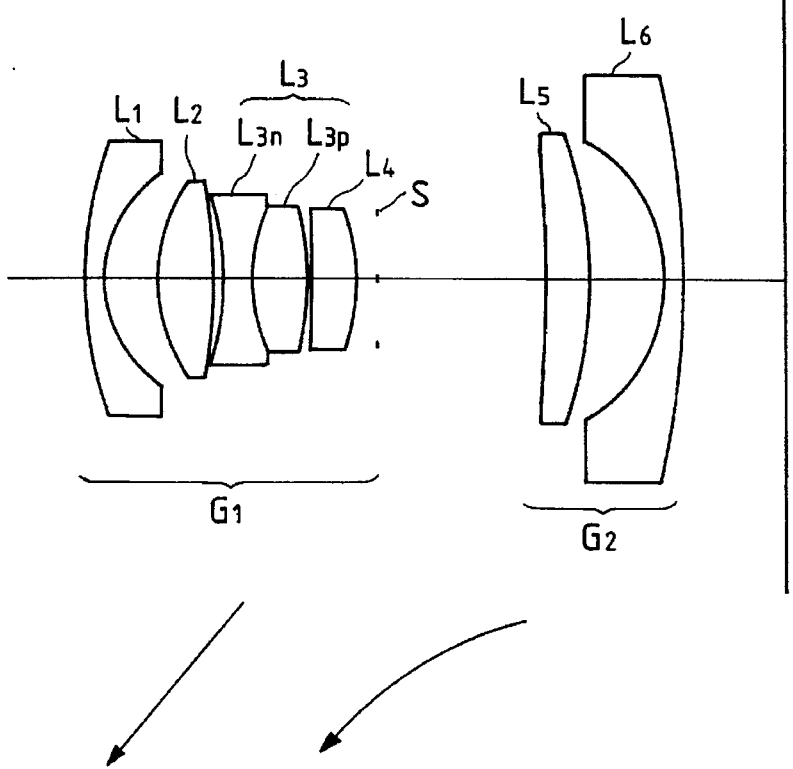
FIG. 44 is a view showing the arrangement of a zoom lens according to a 17th embodiment of the present invention.
Figure 53A:
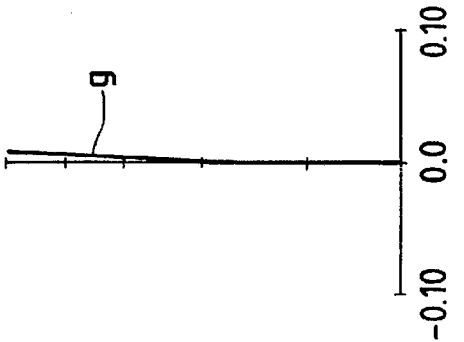
FIGS. 53A to 53D are graphs showing various aberrations at the telephoto end in the 12th embodiment of the present invention.
Figure 53B:
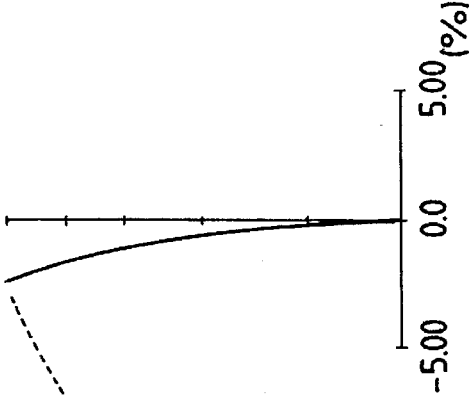
Figure 53C:
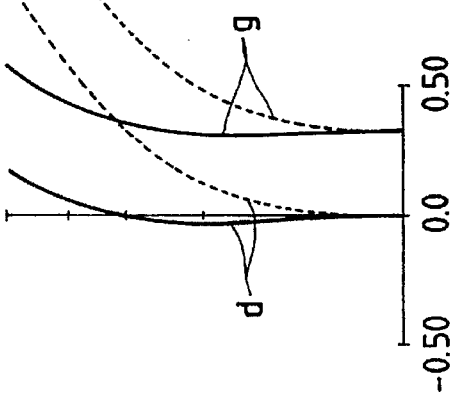
Figure 53D:
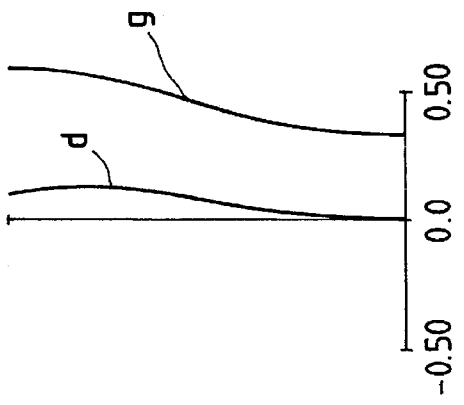
Figure 56A:
FIGS. 56A to 56D are graphs showing various aberrations at the telephoto end in the 13th embodiment of the present invention.
Figure 56B:
Figure 56C:
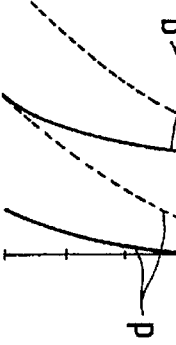
Figure 56D:
Figure 60A:
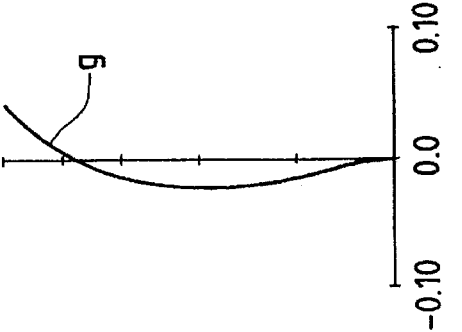
FIGS. 60A to 60D are graphs showing various aberrations at the wide-angle end in the 15th embodiment of the present invention.
Figure 60B:
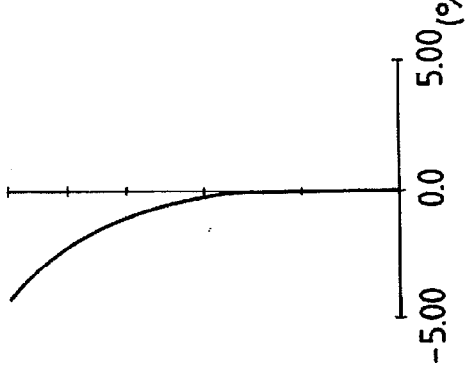
Figure 60C:
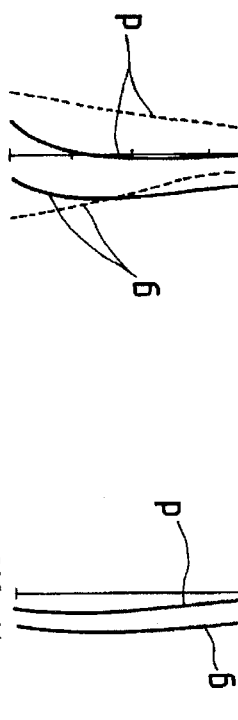
Figure 60D:
Figure 65A:
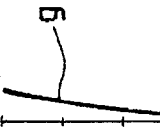
FIGS. 65A to 65D are graphs showing various aberrations at the telephoto end in the 16th embodiment of the present invention.
Figure 65B:
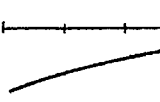
Figure 65C:
Figure 65D:
Figure 67A:
FIGS. 67A to 67D are graphs showing various aberrations in a middle focal length state in the 17th embodiment of the present invention.
Figure 67B:
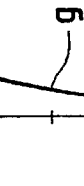
Figure 67C:
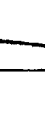
Figure 67D:
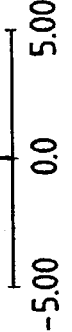

FIG. 44 shows the detailed lens arrangements of respective lens groups of the 17th embodiment.

As shown in FIG. 44, a first lens group G1 of a positive refractive power consists of, in the following order from the object side, a meniscus-shaped first lens component L1 which has a negative refractive power and has a convex surface facing the object side, a biconvex second lens component L2 having a positive refractive power, a meniscus-shaped third lens component L3 which has a negative refractive power and has a concave surface facing the object side, and a meniscus-shaped fourth lens component L4 which has a positive refractive power and has a concave surface facing the object side, and an air gap is present between each two adjacent ones of the first to fourth lens components. The object-side surface of the fourth lens component L4 is an aspherical surface, and the third lens component L3 is a cemented lens consisting of, in the following order from the object side, a biconcave negative lens L3n, and a biconvex positive lens L3p. A second lens group G2 of a negative refractive power consists of, in the following order from the object side, a meniscus-shaped fifth lens component L5 which has a positive refractive power and has a concave surface facing the object side, and a meniscus-shaped sixth lens component L6 which has a negative refractive power and has a concave surface facing the object side, and the object-side surface of the fifth lens component L5 is an aspherical surface. A stop S is located at a position between the first and second lens groups G1 and G2, and moves together with the first lens group G1 upon zooming.

Table 17 below summarizes data values and condition corresponding values according to the 17th embodiment of the present invention.

In Table 17, f is the focal length, F is the f-number, and 2ω is the field angle. Furthermore, numerals in the leftmost column represent the order of lens surfaces, r is the radius of curvature of each lens surface, d is the lens surface interval, n and ν are respectively the refractive index and Abbe's number for the d-line (λ=587.6 nm). In addition, a surface with a mark * attached to the corresponding numeral in the leftmost column is an aspherical surface. The aspherical surface shape is expressed by:

$$X(h)=(h^2/r)/[1+(1-kh^2/r^2)^{1/2}]+C4h^4+C6h^6+C8h^8+C10h^{10}$$

where X(h) is the distance, along the optical axis direction, of the vertex of the aspherical surface from a tangential plane at a height h in a direction perpendicular to the optical axis, r is the paraxial radius of curvature, k is a coefficient of cone, and Cn is an n-th order aspherical surface coefficient.

TABLE 17

Data Values of 17th Embodiment f = 28.4 to 54.9, F = 3.9 to 7.6, 2ω = 73.4 to 42.9°

|  | r | d | ν | n |
|---|---|---|---|---|
| 1 | 22.0356 | 1.5070 | 60.0 | 1.64000 |
| 2 | 8.5229 | 3.7674 | | |
| 3 | 10.7075 | 4.1441 | 40.3 | 1.60717 |
| 4 | −37.7683 | 0.7535 | | |
| 5 | −15.5873 | 1.8837 | 33.9 | 1.80384 |
| 6 | 11.6772 | 4.1441 | 54.6 | 1.51454 |
| 7 | −17.5812 | 0.2512 | | |
| 8* | −143.1975 | 3.1395 | 61.1 | 1.58913 |

TABLE 17-continued

Data Values of 17th Embodiment

| 9   | −12.2630 | 1.4652 |      |         |
|-----|----------|--------|------|---------|
| 10  | (stop)   | (d10)  |      |         |
| 11* | −43.4284 | 3.0139 | 49.4 | 1.74240 |
| 12  | −27.6061 | 5.2744 |      |         |
| 13  | −10.9566 | 1.5070 | 55.6 | 1.69680 |
| 14  | −56.8827 | (B.f)  |      |         |

(Aspherical Surface Coefficients of Eighth Surface)

$k = 0.1000 \times 10$       $C4 = -0.5080 \times 10^{-4}$
$C6 = -0.1729 \times 10^{-6}$  $C8 = 0$
$C10 = 0$ (Aspherical Surface Coefficients of 11th Surface)

$k = 0.1000 \times 10$        $C4 = 0.3664 \times 10^{-4}$
$C6 = 0.3448 \times 10^{-6}$   $C8 = -0.1171 \times 10^{-8}$
$C10 = 0.1821 \times 10^{-10}$ Changes in interval upon zooming are summarized below:

| f    | 28.3882 | 40.1894 | 54.8754 |
|------|---------|---------|---------|
| d10  | 12.2037 | 6.3517  | 2.5843  |
| B.f  | 7.0143  | 20.8384 | 38.0417 |

Condition corresponding values are summarized below:

(1) f1/fL2 = 1.55
(2) f1/fL4 = 0.974
(3) D/f1 = 0.651
(4) f1/fL3 = −0.893
(5) f1/fL1 = −0.968
(6) DL3/fW = 0.212
(7) N3n − N3p = 0.28930
(8) ν3p − ν3n = 20.7

FIGS. 45A to 45D, FIGS. 48A to 48D, FIGS. 51A to 51D, FIGS. 54A to 54D, FIGS. 57A to 57D, FIGS. 60A to 60D, FIGS. 63A to 63D, and FIGS. 66A to 66D are graphs showing various aberrations at the wide-angle end in the 10th to 17th embodiments, respectively, FIGS. 46A to 46D, FIGS. 49A to 49D, FIGS. 52A to 52D, FIGS. 55A to 55D, FIGS. 58A to 58D, FIGS. 61A to 61D, FIGS. 64A to 64D, and FIGS. 67A to 67D are graphs showing various aberrations in a middle focal length state in the 10th to 17th embodiments, respectively, and FIGS. 47A to 47D, FIGS. 50A to 50D, FIGS. 53A to 53D, FIGS. 56A to 56D, FIGS. 59A to 59D, FIGS. 62A to 62D, FIGS. 65A to 65D, and FIGS. 68A to 68D are graphs showing various aberrations at the telephoto end in the 10th to 17th embodiments, respectively. In each graph, H is the height of incident rays, Y is the image height, d is the d-line (λ=587.6 nm), and g is the g-line (λ=435.8 nm). In each graph showing an astigmatism, a dotted curve represents the meridional image plane, and a solid curve represents the sagittal image plane.

As can be seen from these graphs, various aberrations are satisfactorily corrected, and the respective embodiments have good imaging performance.

[18th Embodiment]

Figure 69:
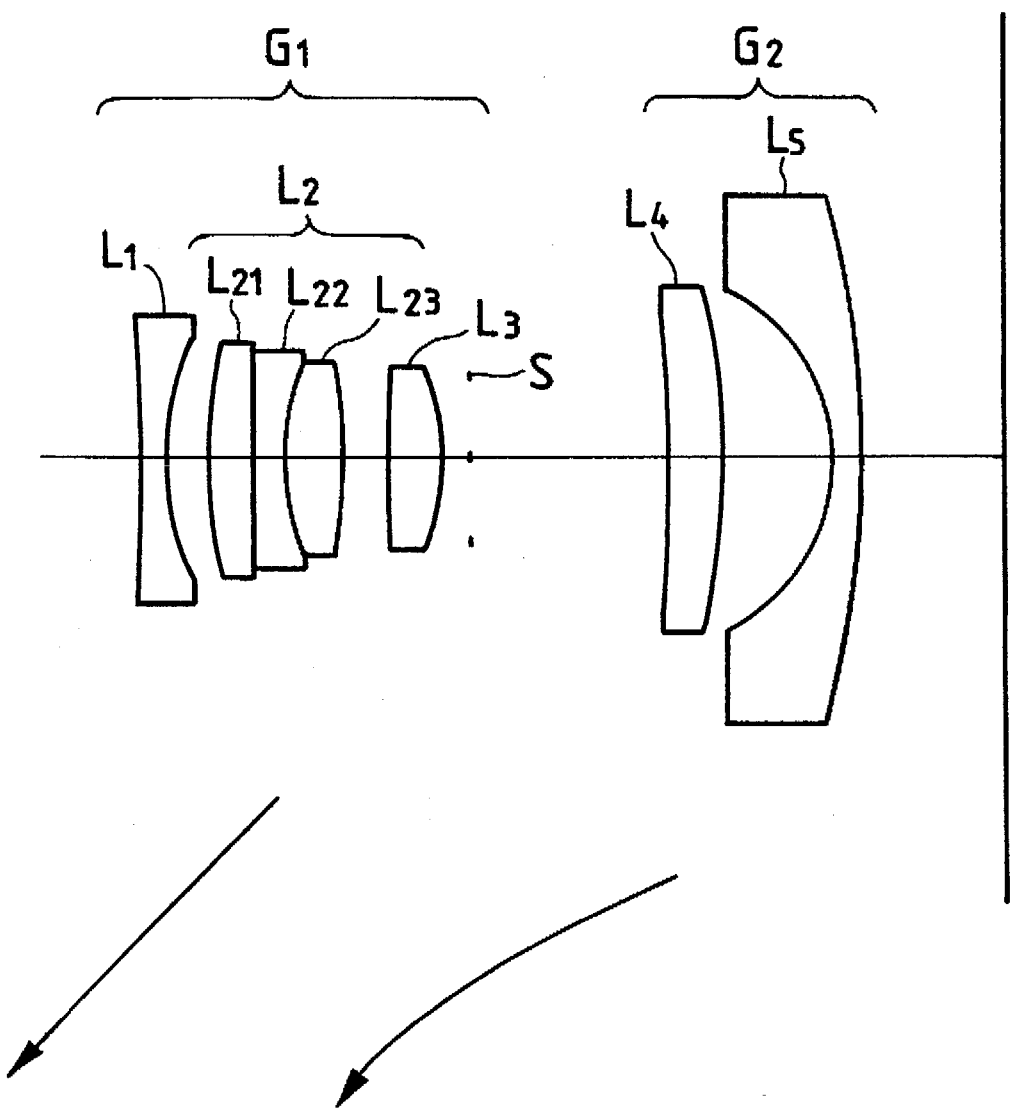
FIG. 69 is a view showing the arrangement of a zoom lens according to the 18th embodiment of the present invention.
Figures 70A, 70B, 70C, 70D:
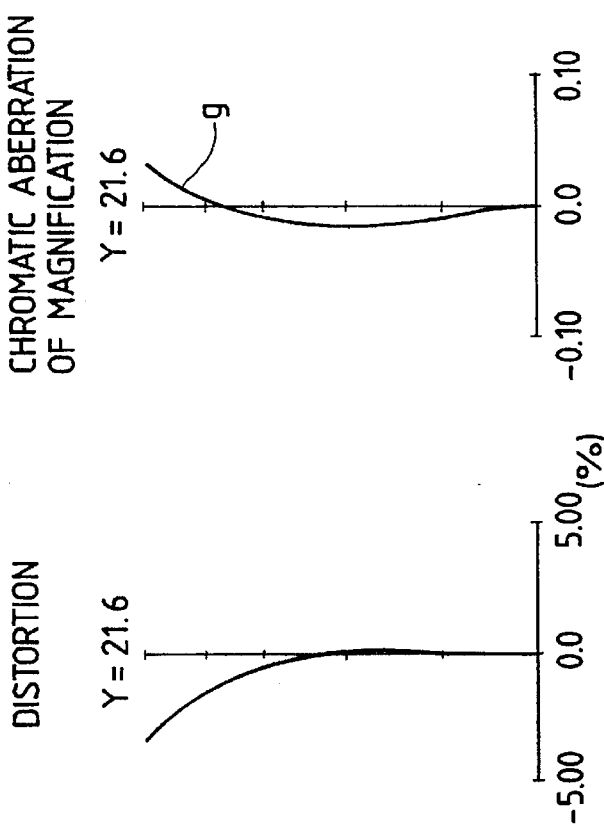
FIGS. 70A to 70D are graphs showing various aberrations at the wide-angle end in the 18th embodiment of the present invention.

FIG. 69 is a view showing the arrangement of a zoom lens according to the 18th embodiment of the present invention. The 18th embodiment of the present invention will be described in detail below with reference to FIG. 69.

As shown in FIG. 69, the zoom lens of the 18th embodiment comprises a first lens group G1 of a positive refractive power, and a second lens group G2 of a negative refractive power, and moves the two lens groups toward the object side while reducing the air gap between the first and second lens groups G1 and G2 upon zooming from the wide-angle end to the telephoto end.

The first lens group G1 consists of, in the following order from the object side, a biconcave negative lens L1, a three-element cemented lens L2 (i.e., a cemented lens consisting of three lens elements), and a biconvex positive lens L3 to have a retrofocus type arrangement. The three-element cemented lens L2 consists of, in the following order from the object side, a positive meniscus lens L21 with a convex surface facing the object side, a negative meniscus lens L22 with a concave surface facing the image side, and a biconvex positive lens L23. Both the object- and image-side surfaces of the biconcave negative lens L1 are aspherical surfaces.

The second lens group G1 consists of, in the following order from the object side, a positive meniscus lens L4 with a concave surface facing the object side, and a negative meniscus lens L5 with a concave surface facing the object side, and the object-side surface of the positive meniscus lens L4 is an aspherical surface. A stop S is located at a position between the first and second lens groups G1 and G2, and moves together with the first lens group G1 upon zooming.

The data values and condition corresponding values of the 18th embodiment of the present invention will be summarized below.

In the data value table of this embodiment, f is the focal length, F is the f-number, and 2ω is the field angle. Furthermore, numerals in the leftmost column represent the order of lens surfaces, r is the radius of curvature of each lens surface, d is the lens surface interval, n and ν are respectively the refractive index and Abbe's number for the d-line (λ=587.6 nm). In addition, a surface with a mark * attached to the corresponding numeral in the leftmost column is an aspherical surface. The aspherical surface shape is expressed by:

$$X(h) = (h^2/r)/[1+(1-kh^2/r^2)^{1/2}]+C4h^4+C6h^6+C8h^8+C10h^{10}$$

where X(h) is the distance, along the optical axis direction, of the vertex of the aspherical surface from a tangential plane at a height h in a direction perpendicular to the optical axis, r is the paraxial radius of curvature, k is a coefficient of cone, and Cn is an n-th order aspherical surface coefficient.

TABLE 18

Data Values of 18th Embodiment f = 28.4 to 54.9
F = 4.1 to 8.1
2ω = 76.5 to 43.7°

|     | r         | d      | ν    | n       |
|-----|-----------|--------|------|---------|
| 1*  | −130.9715 | 1.3814 | 49.4 | 1.74240 |
| 2*  | 20.3972   | 2.0093 |      |         |
| 3   | 22.0524   | 2.2604 | 27.6 | 1.75520 |
| 4   | 397.2898  | 1.6325 | 33.9 | 1.80384 |
| 5   | 11.6248   | 3.0139 | 70.2 | 1.48749 |
| 6   | −24.3855  | 2.2604 |      |         |
| 7   | 121.4281  | 2.6372 | 70.1 | 1.51860 |
| 8   | −11.2719  | 1.5070 |      |         |
| 9   | (stop)    | (d10)  |      |         |
| 10* | −40.2721  | 2.7628 | 49.4 | 1.74240 |
| 11  | −31.8522  | 5.6511 |      |         |
| 12  | −9.0519   | 1.5070 | 60.3 | 1.62041 |
| 13  | −44.1496  | (B.f)  |      |         |

(Aspherical Surface Coefficients of First Surface)

$k = -0.9800 \times 10^2$       $C4 = 0.5381 \times 10^{-4}$
$C6 = -0.8323 \times 10^{-6}$    $C8 = -0.5029 \times 10^{-8}$
$C10 = 0.1014 \times 10^{-9}$ (Aspherical Surface Coefficients of Second Surface)

$k = 0.7910 \times 10$           $C4 = 0.1272 \times 10^{-3}$
$C6 = -0.3605 \times 10^{-6}$    $C8 = -0.1576 \times 10^{-7}$
$C10 = 0.5002 \times 10^{-10}$ TABLE 18-continued Data Values of 18th Embodiment (Aspherical Surface Coefficients of 10th Surface)

k = −0.3119 × 10        C4 = 0.4964 × 10⁻⁴
C6 = 0.5815 × 10⁻⁶      C8 = −0.3636 × 10⁻⁸
C10 = 0.9267 × 10⁻¹⁰

Changes in interval upon zooming are summarized below:

| f | 28.3815 | 40.1868 | 54.8808 |
|---|---------|---------|---------|
| d9 | 10.2098 | 5.8355 | 3.0198 |
| B.f | 7.1465 | 19.2737 | 34.3683 |

Condition corresponding values are summarized below:

(1) f1/fW = 0.715
(2) f2/fW = −0.734
(3) N22 − N23 = 0.31635
(4) v22 − v21 = 6.3
(5) v23 − v22 = 36.3
(6) fL1/f1 = −1.168
(7) fL2/f1 = 1.805
(8) fL3/f1 = 0.987

FIGS. 70A to 70D are graphs showing various aberrations at the wide-angle end in the 18th embodiment. FIGS. 71A to 71D are graphs showing various aberrations in a middle focal length state in the 18th embodiment. FIGS. 72A to 72D are graphs showing various aberrations at the telephoto end in the 18th embodiment. In each graph, H is the height of incident rays, Y is the image height, d is the d-line (λ=587.6 nm), and g is the g-line (λ=435.8 nm). In each graph showing an astigmatism, a dotted curve represents the meridional image plane, and a solid curve represents the sagittal image plane.

As can be seen from these graphs, various aberrations are satisfactorily corrected, and this embodiment has good imaging performance.

[19th to 21st Embodiments]

Figure 73:
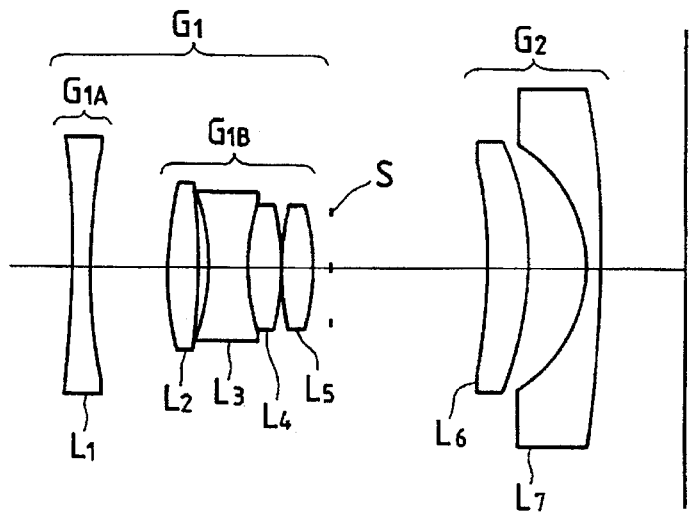
FIG. 73 is a view showing the arrangement of a zoom lens according to a 19th embodiment of the present invention.
Figure 74:
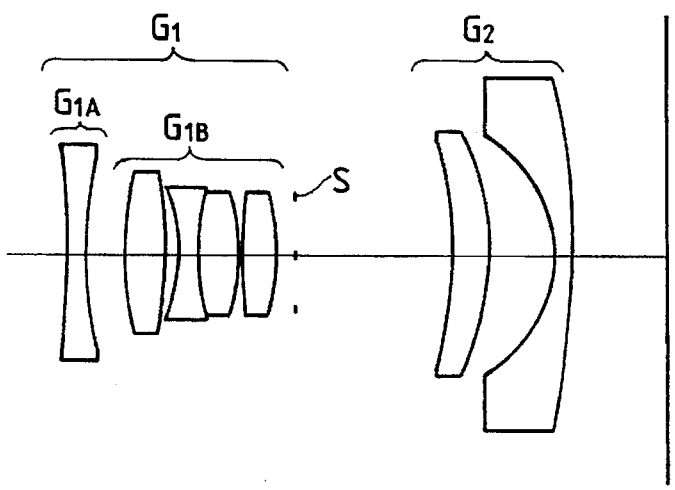
FIG. 74 is a view showing the arrangement of a zoom lens according to a 20th embodiment of the present invention.
Figure 75:
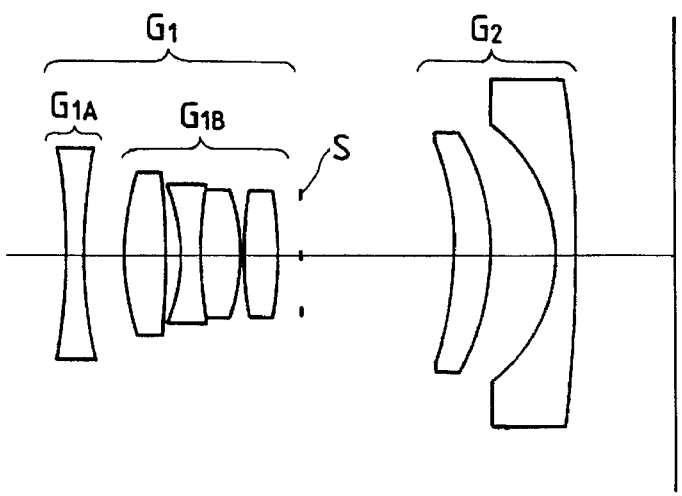
FIG. 75 is a view showing the arrangement of a zoom lens according to a 21st embodiment of the present invention.
Figures 76A, 76B, 76C:
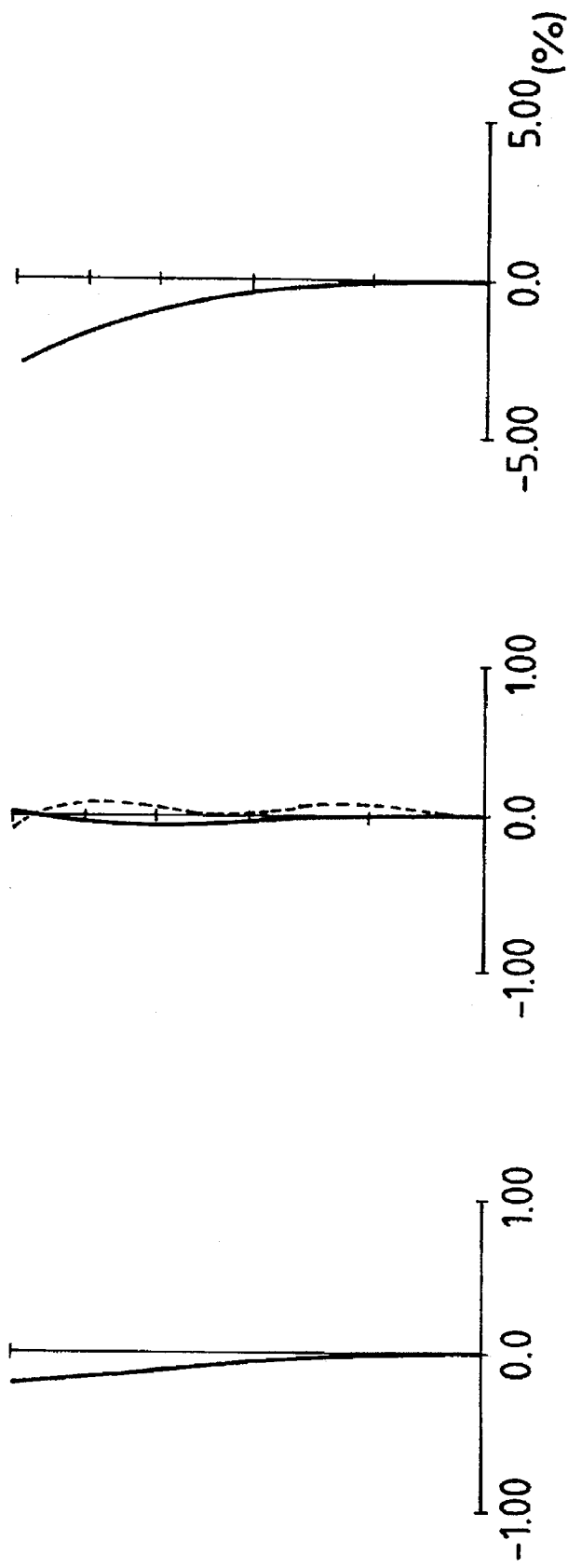
FIGS. 76A to 76C are graphs showing various aberrations in an infinity in-focus state at the wide-angle end in the 19th embodiment of the present invention.
Figure 77A:
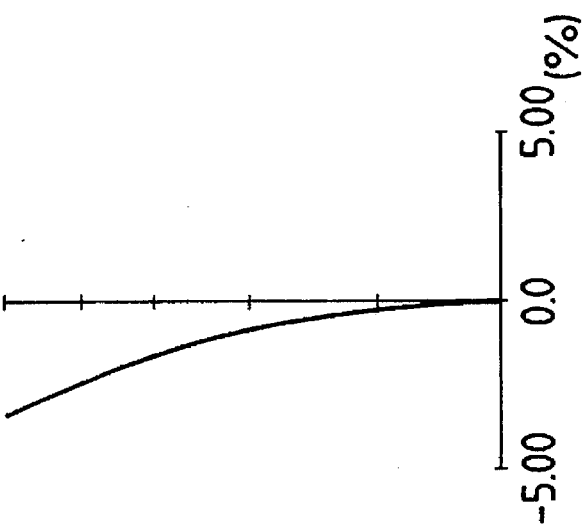
FIGS. 77A to 77C are graphs showing various aberrations in an infinity in-focus state in a middle focal length state in the 19th embodiment of the present invention.
Figure 77B:
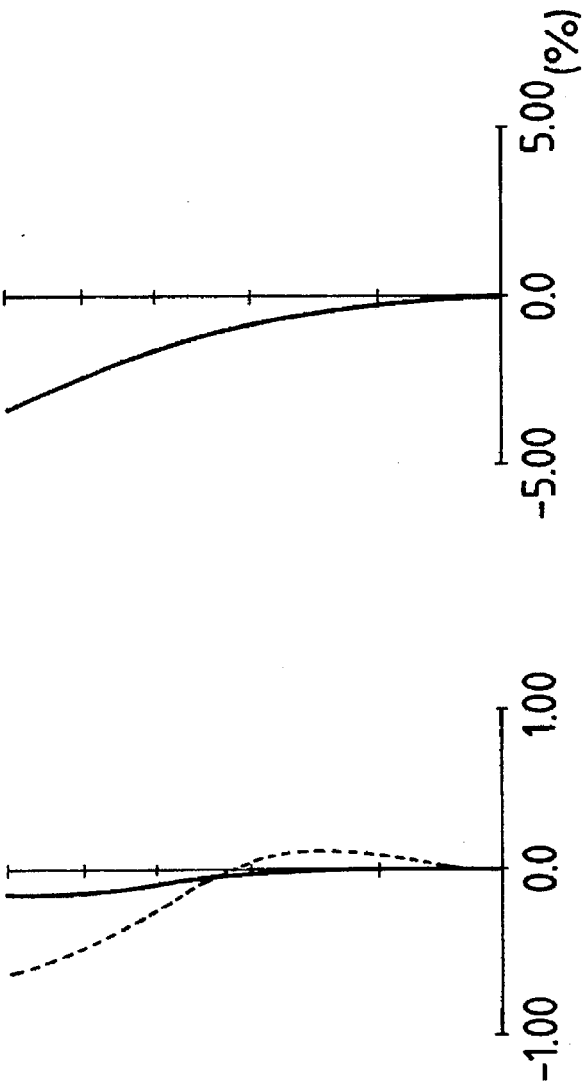
Figure 77C:
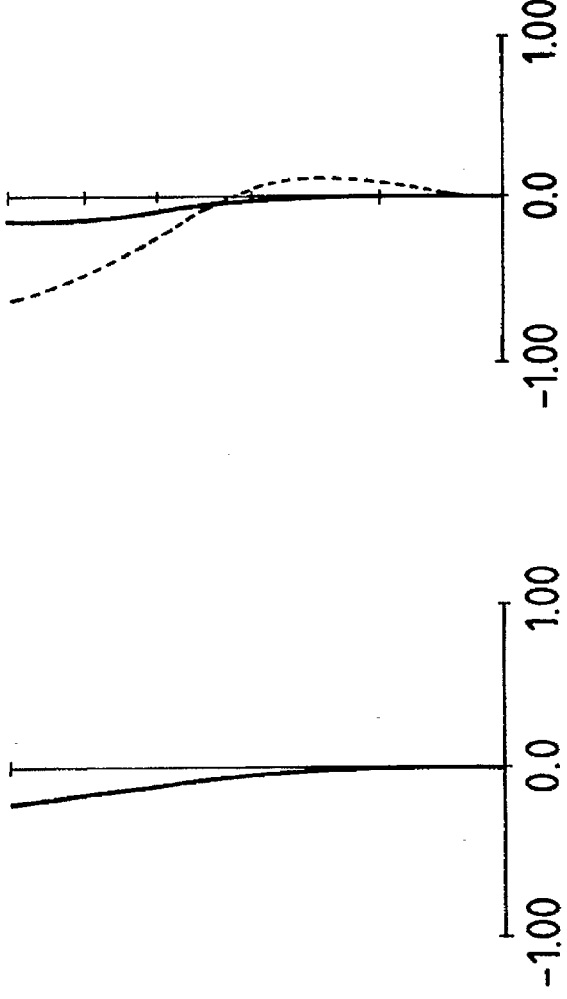
Figure 78C:
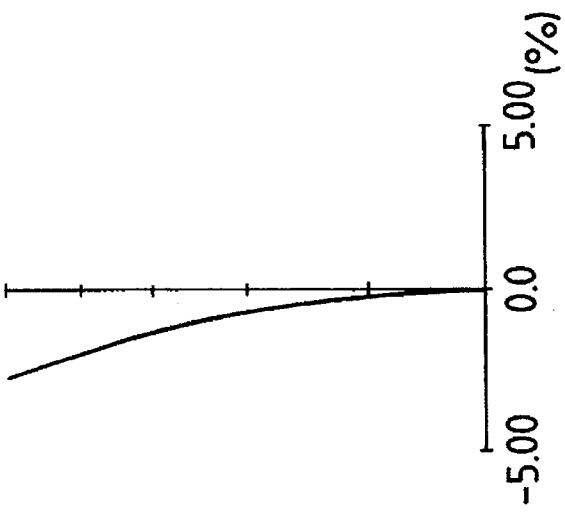
FIGS. 78A to 78C are graphs showing various aberrations in an infinity in-focus state at the telephoto end in the 19th embodiment of the present invention.
Figure 78B:
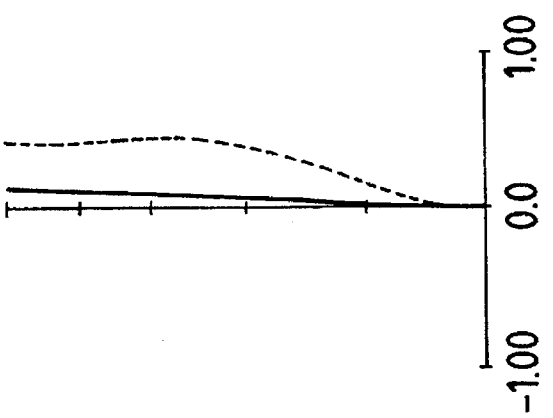
Figure 78A:
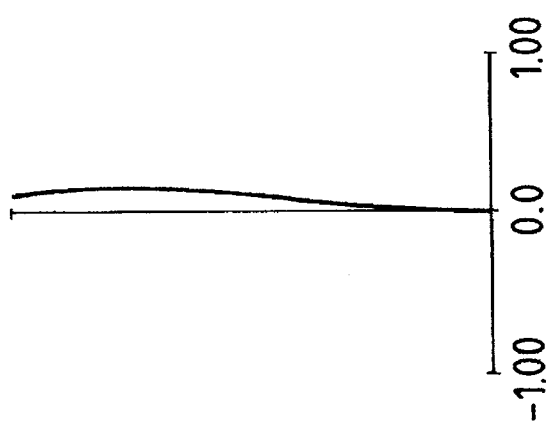
Figure 79C:
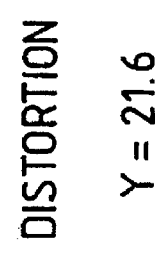
FIGS. 79A to 79C are graphs showing various aberrations in a near distance in-focus state at the wide-angle end in the 19th embodiment of the present invention.
Figure 79B:
Figure 79A:
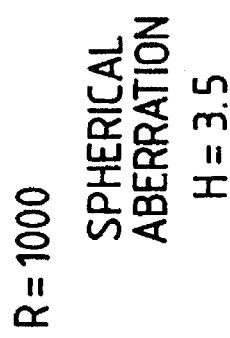
Figure 81A:
FIGS. 81A to 81C are graphs showing various aberrations in a near distance in-focus state at the telephoto end in the 19th embodiment of the present invention.
Figure 81B:
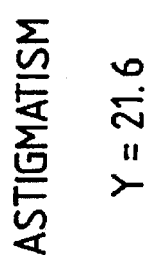
Figure 81C:
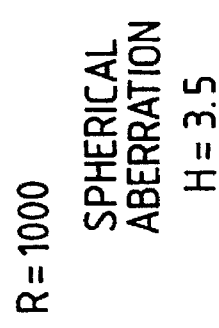
Figure 82A:
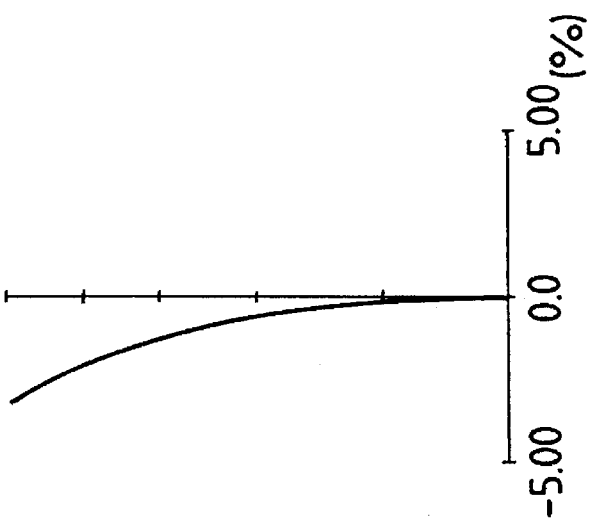
FIGS. 82A to 82C are graphs showing various aberrations in an infinity in-focus state at the wide-angle end in the 20th embodiment of the present invention.
Figure 82B:
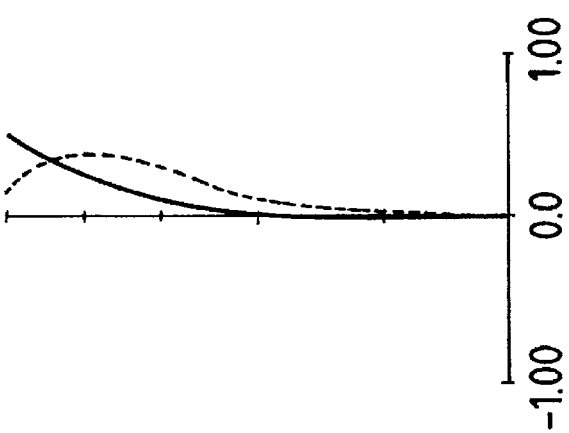
Figure 82C:
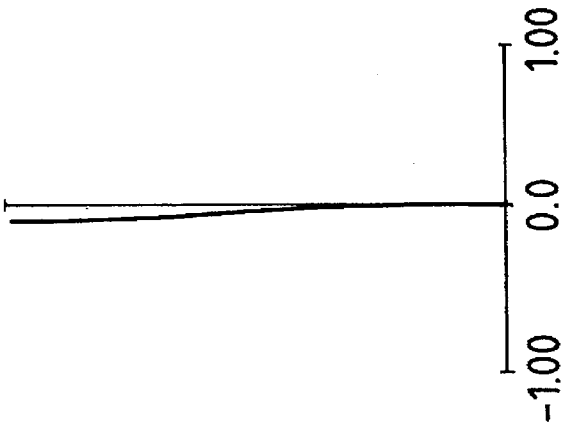
Figure 87A:
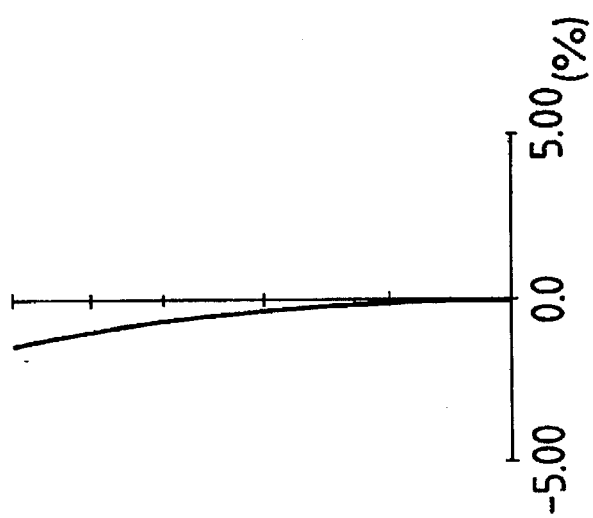
FIGS. 87A to 87C are graphs showing various aberrations n a near distance in-focus state at the telephoto end in the 20th embodiment of the present invention.
Figure 87B:
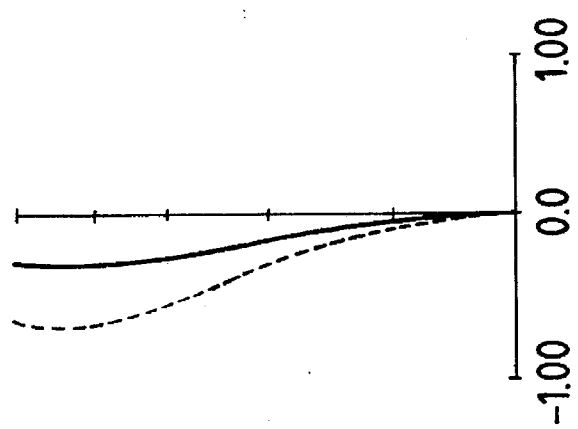
Figure 87C:
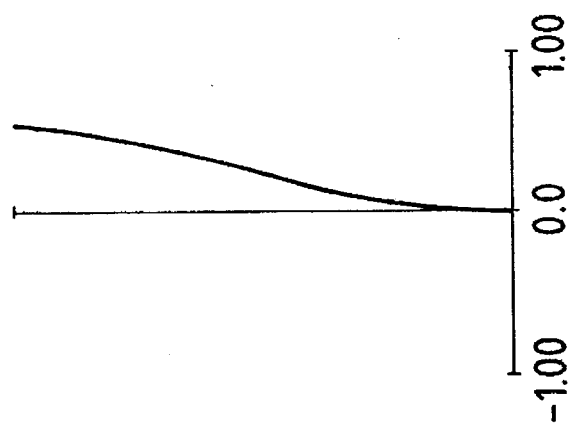
Figures 90A, 90B, 90C:
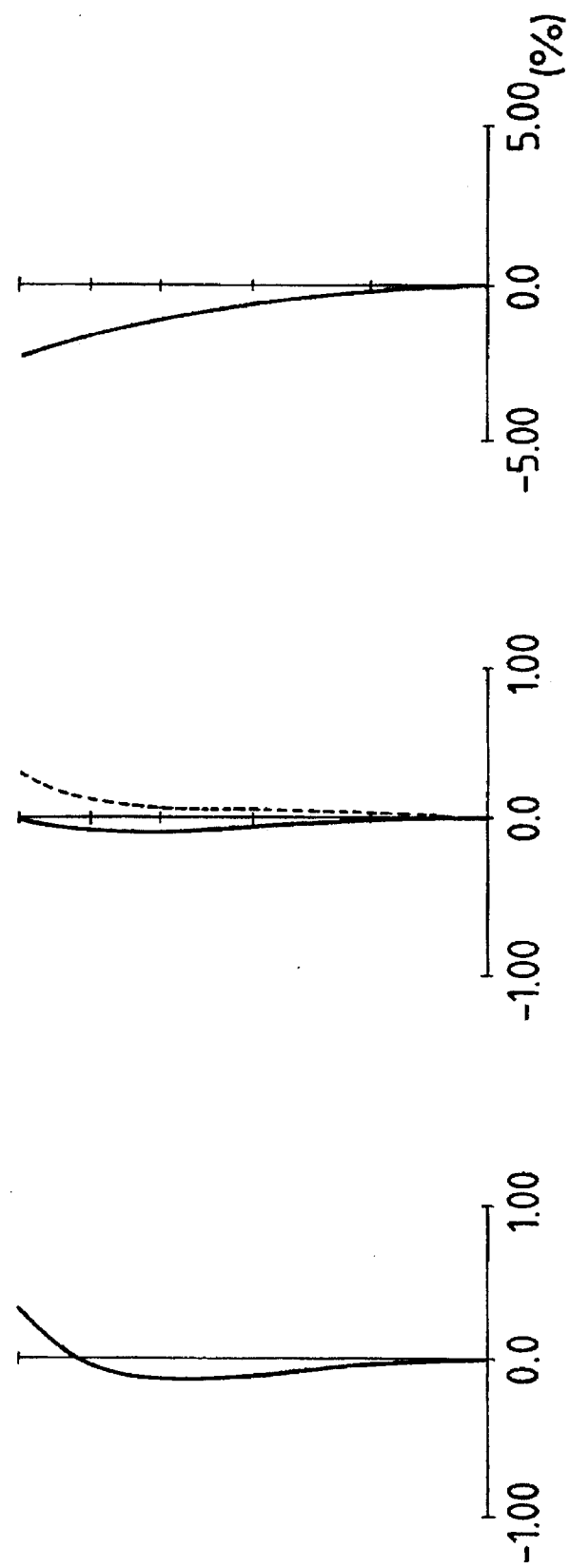
FIGS. 90A to 90C are graphs showing various aberrations n an infinity in-focus state at the telephoto end in the 21st embodiment of the present invention.
Figures 93A, 93B, 93C:
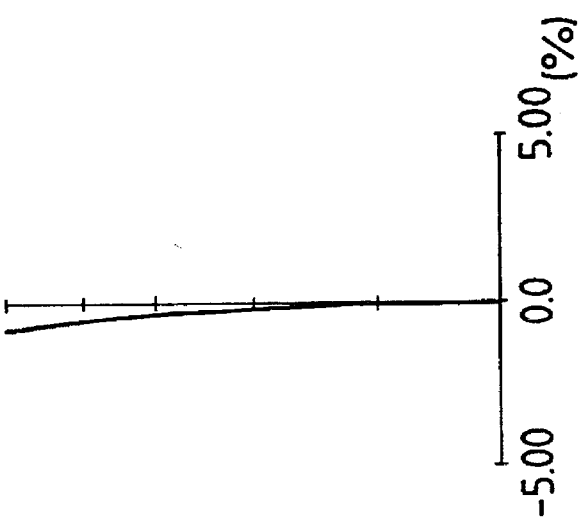
FIGS. 93A to 93C are graphs showing various aberrations in a near distance in-focus state at the telephoto end in the 21st embodiment of the present invention.

FIGS. 73 to 75 are views showing the arrangements of zoom lenses according to the 19th to 21st embodiments of the present invention, respectively. The 19th to 21st embodiments will be described in detail below.

Since the respective embodiments have substantially the same lens arrangements, the lens arrangements of the respective lens groups will be explained in detail below with reference to FIG. 73 showing the 19th embodiment as a representative.

As shown in FIG. 73, a first lens group G1 of a positive refractive power is constituted by, in the following order from the object side, a front lens subgroup G1A of a negative refractive power and a rear lens subgroup G1B of a positive refractive power to have a so-called retrofocus type arrangement. The front lens subgroup G1A consists of a biconcave negative lens L1, and the rear lens subgroup G1B consists of, in the following order from the object side, a biconvex positive lens L2, a biconcave negative lens L3, a biconvex positive lens L4, and a biconvex positive lens L5. The biconcave negative lens L3 and the biconvex positive lens L4 are cemented together. The second lens group of a negative refractive power consists of, in the following order from the object side, a positive meniscus lens L6 with a concave surface facing the object side, and a negative meniscus lens L7 with a concave surface facing the object side, and the object-side surface of the positive meniscus lens L6 is an aspherical surface.

A stop S is located at a position between the first and second lens groups G1 and G2. The stop S moves together with the first lens group G1 upon zooming, and stands still together with the front lens subgroup G1A upon focusing.

In the above arrangement, the image-side surface of the biconcave negative lens L1 is an aspherical surface in the 19th embodiment, and both the surfaces of the biconcave negative lens L1 are aspherical surfaces in the 20th embodiment. In the 21st embodiment, the object-side surface of the biconvex positive lens L2 is an aspherical surface.

The data values and condition corresponding values of the 19th to 21st embodiments of the present invention will be summarized below.

In the following tables, f is the focal length, F is the f-number, and $2\omega$ is the field angle. Furthermore, numerals in the leftmost column represent the order of lens surfaces, r is the radius of curvature of each lens surface, d is the lens surface interval, n and v are respectively the refractive index and Abbe's number for the d-line (λ=587.6 nm). In addition, a surface with a mark * attached to the corresponding numeral in the leftmost column is an aspherical surface. The aspherical surface shape is expressed by:

$$X(h)=(h^2/r)/[1+(1-kh^2/r^2)^{1/2}]+C4h^4+C6h^6+C8h^8+C10h^{10}$$

where X(h) is the distance, along the optical axis direction, of the vertex of the aspherical surface from a tangential plane at a height h in a direction perpendicular to the optical axis, r is the paraxial radius of curvature, k is a coefficient of cone, and Cn is an n-th order aspherical surface coefficient.

TABLE 19

Data Values of 19th Embodiment f = 28.4 to 54.9
F = 4.1 to 7.9
2ω = 76.0 to 44.0°

| | r | d | v | n |
|---|---|---|---|---|
| 1 | −87.7100 | 1.5070 | 49.3 | 1.74330 |
| 2* | 54.2410 | (d2) | | |
| 3 | 22.1377 | 2.6372 | 35.7 | 1.62588 |
| 4 | −37.7897 | 0.7535 | | |
| 5 | −15.4057 | 3.2023 | 37.9 | 1.72342 |
| 6 | 13.9738 | 2.7628 | 56.4 | 1.50137 |
| 7 | −18.9375 | 0.1256 | | |
| 8 | 29.4218 | 2.3860 | 70.4 | 1.48749 |
| 9 | −17.0143 | (d9) | | |
| 10 | (stop) | (d10) | | |
| 11* | −31.1612 | 3.3907 | 49.3 | 1.74330 |
| 12 | −21.0138 | 4.6465 | | |
| 13 | −10.2781 | 1.2558 | 58.5 | 1.65160 |
| 14 | −76.0150 | (B.f) | | |

Aspherical Surface Coefficients of Second Surface k = −0.1230 × 10        C4 = 0.3267 × 10⁻⁴
C6 = −0.1395 × 10⁻⁶     C8 = 0.2415 × 10⁻⁸
C10 = −0.1632 × 10⁻¹⁰

Aspherical Surface Coefficients of 11th Surface k = 0.1630 × 10         C4 = 0.3820 × 10⁻⁴
C6 = 0.2280 × 10⁻⁶      C8 = −0.1741 × 10⁻⁸
C10 = 0.4222 × 10⁻¹⁰

Changes in interval upon zooming are summarized below:

| f | 28.4013 | 40.2782 | 54.9201 |
|---|---------|---------|---------|
| d2 | 6.0278 | 6.0278 | 6.0278 |
| d9 | 1.5070 | 1.5070 | 1.5070 |
| d10 | 12.5469 | 6.9554 | 3.3906 |
| B.f | 6.8643 | 20.2858 | 36.8322 |

Changes in interval when a photographing distance R = 1,000 (mm) are summarized below:

| d2 | 5.3219 |
|---|---|
| d9 | 2.2129 |

TABLE 19-continued

Data Values of 19th Embodiment

Condition corresponding values are summarized below:

(1) f1/fW = 0.769
(2) β1B = −0.486
(3) D2/f1 = 0.276

TABLE 20

Data Values of 20th Embodiment f = 28.4 to 54.9
F = 4.0 to 7.7
2ω = 76.4 to 44.1°

|   | r | d | v | n |
|---|---|---|---|---|
| 1* | −76.5278 | 1.5070 | 49.4 | 1.74240 |
| 2* | 40.2179 | (d2) | | |
| 3 | 25.7127 | 3.3907 | 42.0 | 1.66755 |
| 4 | −29.2007 | 1.0046 | | |
| 5 | −12.1866 | 1.5070 | 33.9 | 1.80384 |
| 6 | 18.2780 | 3.3907 | 41.4 | 1.57501 |
| 7 | −14.0414 | 0.2512 | | |
| 8 | 42.8368 | 2.7628 | 69.9 | 1.51860 |
| 9 | −16.1793 | (d9) | | |
| 10 | (stop) | (d10) | | |
| 11* | −27.9881 | 3.0139 | 49.4 | 1.74240 |
| 12 | −20.3641 | 5.2744 | | |
| 13 | −10.6593 | 1.5070 | 47.1 | 1.67003 |
| 14 | −60.2907 | (B.f) | | |

Aspherical Surface Coefficients of First Surface k = 0.1000          C4 = 0.3602 × $10^{-6}$
C6 = 0.2475 × $10^{-7}$   C8 = 0.1399 × $10^{-9}$
C10 = 0.9289 × $10^{-13}$ Aspherical Surface Coefficients of Second Surface k = 0.8823 × 10     C4 = 0.2947 × $10^{-4}$
C6 = −0.7058 × $10^{-7}$  C8 = 0.3026 × $10^{-8}$
C10 = −0.6801 × $10^{-10}$ Aspherical Surface Coefficients of 11th Surface k = 0.5274          C4 = 0.2817 × $10^{-4}$
C6 = 0.3224 × $10^{-6}$   C8 = −0.4034 × $10^{-8}$
C10 = 0.4582 × $10^{-10}$ Changes in interval upon zooming are summarized below:

| f | 28.3883 | 40.1897 | 54.8760 |
|---|---|---|---|
| d2 | 3.0139 | 3.0139 | 3.0139 |
| d9 | 1.5463 | 1.5463 | 1.5463 |
| d10 | 12.6392 | 6.7872 | 3.0198 |
| B.f | 6.7368 | 20.5611 | 37.7647 |

Changes in interval when a photographing distance R = 1,000 (mm) are summarized below:

| d2 | 2.0790 |
|---|---|
| d9 | 2.4813 |

Condition corresponding values are summarized below:

(1) f1/fW = 0.774
(2) β1B = −0.622
(3) D2/f1 = 0.137

TABLE 21

Data Values of 21st Embodiment f = 28.4 to 54.9
F = 4.0 to 7.9
2ω = 73.6 to 43.9°

|   | r | d | v | n |
|---|---|---|---|---|
| 1 | −44.4733 | 1.5070 | 49.4 | 1.77279 |
| 2 | 39.5118 | (d2) | | |
| 3* | 17.6256 | 3.3907 | 33.8 | 1.64831 |
| 4 | −45.7168 | 1.0046 | | |
| 5 | −13.8657 | 1.5070 | 33.9 | 1.80384 |
| 6 | 23.9837 | 3.3907 | 59.0 | 1.51823 |
| 7 | −12.3057 | 0.2512 | | |
| 8 | 28.7016 | 2.7628 | 69.9 | 1.51860 |
| 9 | −24.1907 | (d9) | | |
| 10 | (stop) | (d10) | | |
| 11* | −23.2902 | 3.0139 | 49.4 | 1.74240 |
| 12 | −16.5211 | 5.2744 | | |
| 13 | −11.6765 | 1.5070 | 52.3 | 1.74810 |
| 14 | −95.1569 | (B.f) | | |

Aspherical Surface Coefficients of Third Surface k = 0.1000 × 10     C4 = −0.4989 × $10^{-4}$
C6 = −0.1043 × $10^{-8}$  C8 = −0.1190 × $10^{-7}$
C10 = 0.1632 × $10^{-9}$ Aspherical Surface Coefficients of 11th Surface k = 0.1000 × 10     C4 = 0.6652 × $10^{-5}$
C6 = −0.9996 × $10^{-7}$  C8 = −0.8917 × $10^{-9}$
C10 = 0.2542 × $10^{-10}$ Changes in interval upon zooming are summarized below:

| f | 28.3882 | 40.1893 | 54.8751 |
|---|---|---|---|
| d2 | 3.1395 | 3.1395 | 3.1395 |
| d9 | 1.7171 | 1.7171 | 1.7171 |
| d10 | 12.2468 | 6.3948 | 2.6274 |
| B.f | 7.1622 | 20.9862 | 38.1895 |

Changes in interval when a photographing distance R = 1,000 (mm) are summarized below:

| d2 | 1.7453 |
|---|---|
| d9 | 3.1112 |

Condition corresponding values are summarized below:

(1) f1/fW = 0.774
(2) β1B = −0.818
(3) D2/f1 = 0.143

FIGS. 76A to 76C, FIGS. 82A to 82C, and FIGS. 88A to 88C are graphs showing various aberrations in an infinity in-focus state at the wide-angle end in the 19th to 21st embodiments, respectively, FIGS. 77A to 77C, FIGS. 83A to 83C, and FIGS. 89A to 89C are graphs showing various aberrations in an infinity in-focus state in a middle focal length state in the 19th to 21st embodiments, respectively, and FIGS. 78A to 78C, FIGS. 84A to 84C, and FIGS. 90A to 90C are graphs showing various aberrations in an infinity in-focus state at the telephoto end in the 19th to 21st embodiments, respectively.

FIGS. 79A to 79C, FIGS. 85A to 85C, and FIGS. 91A to 91C are graphs showing various aberrations in a near distance in-focus state at the wide-angle end in the 19th to 21st embodiments, respectively, FIGS. 80A to 80C, FIGS. 86A to 86C, and FIGS. 92A to 92C are graphs showing various aberrations in a near distance in-focus state in a middle focal length state in the 19th to 21st embodiments, respectively, and FIGS. 81A to 81C, FIGS. 87A to 87C, and FIGS. 93A to 93C are graphs showing various aberrations in a near distance in-focus state at the telephoto end in the 19th to 21st embodiments, respectively. In each graph, H is the height of incident rays, and in each graph showing an astigmatism, a dotted curve represents the meridional image plane, and a solid curve represents the sagittal image plane.

As can be seen from these graphs, various aberrations are satisfactorily corrected, and the respective embodiments have good imaging performance.

The zoom lens of each of the 19th to 21st embodiments has a novel focusing method which allows a compact structure and high performance, can prevent a change in focusing moving amount upon a change in zoom position, and can prevent a focusing mechanism from being influenced by an external force. This focusing method can be applied to zoom lenses suitable for a photographing lens integrated auto-focus camera and a video camera.

Note that the focusing method can be applied to a wide-angle zoom lens including a field angle region of 70° or more. When the focusing method of the present invention is adopted in a zoom lens mounted on a drip-proof camera, a dust-proof camera, a water-proof camera, or the like, water droplets or dust can be prevented from entering the focusing mechanism.

What is claimed is:

1. A wide-angle zoom lens comprising in the following order from the object side:

a first lens group having a positive refractive power, said first lens group consisting of, in the following order from the object side, a front lens subgroup which consists of a negative lens, and a rear lens subgroup which includes of at least one positive lens and at least one negative lens; and a second lens group having a negative refractive power, wherein an air gap between said first and second lens groups decreases upon zooming from a wide-angle end to a telephoto end, and said zoom lens satisfies the following conditions:

$$0.09 \leq D2/fW \leq 0.4$$

$$-0.6 \leq Q1 \leq 0.5$$

where fW is the focal length of the entire zoom lens at the wide-angle end, D2 is the air gap between said front and rear lens subgroups, and Q1 is the shape factor of said negative lens in said front lens subgroup, the shape factor Q1 being defined by $Q1=(R2+R1)/(R2-R1)$, where R1 is the radius of curvature of an object-side lens surface of said negative lens in said front lens subgroup, and R2 is the radius of curvature of an image-side lens surface of said negative lens in said front lens subgroup.

2. A zoom lens according to claim 1, wherein said rear lens subgroup has a positive refractive power, and comprises, in the following order from the object side, a positive lens, a negative lens, and two positive lenses.

3. A zoom lens according to claim 1, wherein said rear lens subgroup has a positive refractive power, and comprises, in the following order from the object side, a biconvex positive lens, a biconcave negative lens, and two biconvex positive lenses.

4. A zoom lens according to claim 1, wherein said rear lens subgroup comprises at least one cemented lens.

5. A zoom lens according to claim 1, wherein said second lens group comprises, in the following order from the object side, a positive meniscus lens with a concave surface facing the object side, and a negative meniscus lens with a concave surface facing the object side.

6. A zoom lens according to claim 5, wherein at least one lens surface in said second lens group is an aspherical surface.

7. A zoom lens according to claim 6, wherein the aspherical surface in said second lens group is formed on an object side of said positive meniscus lens, and has a shape in which the positive refractive power decreases from a central portion toward a peripheral portion.

8. A zoom lens according to claim 1, wherein at least one aspherical surface is arranged in said first lens group.

9. A zoom lens according to claim 8, wherein the aspherical surface is formed on at least one side of said negative lens in said front lens subgroup.

10. A zoom lens according to claim 3, wherein an aspherical surface is formed on an object side of the biconvex positive lens closest to the object side in said rear lens subgroup.

11. A zoom lens according to claim 1, wherein said zoom lens satisfies the following conditional formula:

$$-2.8 \leq f1A/f1 \leq -1.0$$

where f1 is the focal length of said first lens group, and f1A is the focal length of said front lens subgroup.

12. A zoom lens according to claim 1, wherein said zoom lens satisfies the following conditional formula:

$$0.60 \leq f1B/f1 \leq 0.95$$

where f1 is the focal length of said first lens group, and f1B is the focal length of said rear lens subgroup.

13. A zoom lens according to claim 1, wherein said zoom lens satisfies the following conditional formulas:

$$N1 \geq 1.60$$

$$v1 \geq 40$$

where N1 and v1 are respectively the refractive index and Abbe's number of said negative lens constituting said front lens subgroup.

14. A zoom lens according to claim 2, wherein said zoom lens satisfies the following conditional formulas:

$$1.55 \leq N2 1.75$$

$$30 \leq v2 \leq 45$$

where N2 and v2 are respectively the refractive index and Abbe's number of said positive lens closest to the object side in said rear lens subgroup.

15. A wide-angle zoom lens comprising in the following order from the object side:

a first lens group having a positive refractive power and front and rear lens subgroups, a lens closest to the object side in said first lens group being a negative lens; and a second lens group having a negative refractive power, wherein an air gap between said first and second lens groups decreases upon zooming from a wide-angle end to a telephoto end, and said zoom lens satisfies the following conditions:

$$0.09 \leq D2/fW \leq 0.4$$

$$-0.6 \leq Q1 \leq 0.5$$

where fW is the focal length of the entire zoom lens at the wide-angle end, D2 is the air gap between said front and rear lens subgroups, and Q1 is the shape factor of said negative lens, the shape factor Q1 being defined by $Q1=(R2+R1)/(R2-R1)$, where R1 is the radius of curvature of an object-side lens surface of said negative lens, and R2 is the radius of curvature of an image-side lens surface of said negative lens.

16. A wide-angle zoom lens comprising in the following order from the object side:

a first lens group having a positive refractive power, said first lens group consisting of, in the following order from the object side, a front lens subgroup which includes at least one negative lens, and a rear lens subgroup which includes at least one positive lens and at least one negative lens, and an air gap between said front and rear lens subgroups being largest of air gaps in said first lens group; and a second lens group having a negative refractive power, wherein an air gap between said first and second lens groups decreases upon zooming from a wide-angle end to a telephoto end, and said zoom lens satisfies the following conditions:

$$0.09 \leq D2/fW \leq 0.4$$

$$-0.6 \leq Q1 \leq 0.5$$

where fW is the focal length of the entire zoom lens at the wide-angle end, D2 is the air gap between said front and rear lens subgroups, and Q1 is the shape factor of said negative lens in said front lens subgroup, the shape factor Q1 being defined by $Q1=(R2+R1)/(R2-R1)$, where R1 is the radius of curvature of an object-side lens surface of said negative lens in said front lens subgroup, and R2 is the radius of curvature of an image-side lens surface of said negative lens in said front lens subgroup.

17. A wide-angle zoom lens comprising in the following order from the object side:

a first lens group having a positive refractive power, said first lens group consisting of, in the following order from the object side, a first lens component of a negative refractive power, a second lens component of a positive refractive power, a third lens component of a positive or negative refractive power, and a fourth lens component of a positive refractive power; and a second lens group having a negative refractive power, wherein an air gap between said first and second lens groups decreases upon zooming from a wide-angle end to a telephoto end, and said zoom lens satisfies the following conditions:

$$0 < f1/fL2 < 2.5$$

$$0.5 < f1/fL4 < 2.0$$

$$D/f1 < 0.84$$

$$0.085 < DL3/fW < 0.400$$

where f1 is the focal length of said first lens group, fL2 is the focal length of said second lens component in said first lens group, fL4 is the focal length of said fourth lens component in said first lens group, and D is the on-axis distance from a lens surface closest to the object side to a lens surface closest to the image side in said first lens group, fW is the focal length of said wide-angle zoom lens at a wide-angle end, and DL3 is the on-axis lens thickness of said third lens component.

18. A zoom lens according to claim 17, wherein said zoom lens satisfies the following conditional formula:

$$-1.5 < f1/fL3 < 1.0$$

where fL3 is the focal length of said third lens component.

19. A zoom lens according to claim 17, wherein said zoom lens satisfies the following conditional formula:

$$-2.0 < f1/fL1 < -0.4$$

where fL1 is the focal length of said first lens component.

20. A zoom lens according to claim 17, wherein said third lens component is a cemented lens forward of positive and negative lenses.

21. A zoom lens according to claim 20, wherein said zoom lens satisfies the following conditional formula:

$$N3n - N3p > 0.2$$

where $N3n$ and $N3p$ are respectively the refractive indices of said negative and positive lenses constituting said third lens component.

22. A zoom lens according to claim 20, wherein said zoom lens satisfies the following conditional formula:

$$v3p - v3n > 4$$

where $v3n$ and $v3p$ are respectively the Abbe's numbers of said negative and positive lenses constituting said third lens component.

23. A zoom lens according to claim 17, wherein an object-side surface of said second lens component is an aspherical surface.

24. A zoom lens according to claim 23, wherein said second lens component has a meniscus shape with a convex surface facing the object side.

25. A zoom lens according to claim 17, wherein an image-side surface of said first lens component is an aspherical surface.

26. A zoom lens according to claim 17, wherein an object-side surface of said first lens component is an aspherical surface.

27. A zoom lens according to claim 17, wherein an object-side surface of said fourth lens component is an aspherical surface.

28. A zoom lens according to claim 27, wherein said fourth lens component has a meniscus shape with a concave surface facing the object side.

29. A zoom lens comprising in the following order from the object side:

a first lens group having a positive refractive power, said first lens group comprising a cemented lens consisting of three lens elements, and at least one negative lens disposed at the object side of said cemented lens; and a second lens group having a negative refractive power, wherein an air gap between said first and second lens groups decreases upon zooming from a wide-angle end to a telephoto end, and wherein said zoom lens satisfies the following conditional formulas:

$$0.50 \leq f1/fW \leq 0.95$$

$$-1.5 \leq f2/fW \leq -0.4$$

where fW is the focal length of said zoom lens at the wide-angle end, f1 is the focal length of said first lens group, and f2 is the focal length of said second lens group.

30. A zoom lens according to claim 29, wherein the three lens elements of said cemented lens are, in the following order from the object side, a first positive lens, a negative lens, and a second positive lens, and said cemented lens has a positive refractive power as a whole.

31. A zoom lens according to claim 30, wherein said zoom lens satisfies the following conditional formula:

$$N22-N23>0.2$$

where N22 and N23 are respectively the refractive indices of said negative lens of said cemented lens and said second positive lens of said cemented lens.

32. A zoom lens according to claim 31, wherein said zoom lens satisfies the following conditional formulas:

$$\nu22-\nu21>0$$

$$\nu23-\nu22>20$$

where $\nu21$, $\nu22$, and $\nu23$ are respectively the Abbe's numbers of said first positive lens of said cemented lens, said negative lens of said cemented lens, and said second positive lens of said cemented lens.

33. A zoom lens according to claim 32, wherein said first lens group comprises, in the following order from the object side, said negative lens disposed at the object side of said cemented lens, said cemented lens, and a positive lens disposed at an image side of said cemented lens.

34. A zoom lens according to claim 33, wherein said zoom lens satisfies at least one of the following conditional formulas:

$$-5.0 \leq fL1/f1 \leq -0.5$$

$$0.5 \leq fL2/f1 \leq 5.0$$

$$0.5 \leq fL3/f1 \leq 2.0$$

where fL1, fL2, and fL3 are respectively the focal lengths of said negative lens disposed at the object side of said cemented lens, said cemented lens, and said positive lens disposed at the image side of said cemented lens in said first lens group.

35. A zoom lens comprising in the following order from the object side:

a first lens group having a positive refractive power, said first lens group comprising, in the following order from the object side, a front lens subgroup which has a negative refractive power and comprises at least one negative lens, and a rear lens subgroup which has a positive refractive power and has at least one positive lens; and a second lens group having a negative refractive power, wherein an air gap between said first and second lens groups decreases upon zooming from a wide-angle end to a telephoto end, and only said rear lens subgroup is moved in an object direction along an optical axis upon focusing from a far distance end to a near distance end.

36. A zoom lens according to claim 35, wherein said zoom lens satisfies the following conditions:

$$0.30 \leq f1/fW \leq 0.95$$

$$-0.9 \leq \beta1B \leq -0.1$$

where fW is the focal length of the entire zoom lens at the wide-angle end, f1 is the focal length of said first lens group, and $\beta1B$ is the imaging magnification of said rear lens subgroup in an infinity in-focus state.

37. A zoom lens according to claim 35, wherein said rear lens subgroup comprises two or more positive lenses and at least one negative lens.

38. A zoom lens according to claim 35, wherein said rear lens subgroup comprises, in the following order from the object side, a positive lens, a negative lens, and two positive lenses.

39. A zoom lens according to claim 35, wherein said rear lens subgroup comprises, in the following order from the object side, a biconvex positive lens, a biconcave negative lens, and two biconvex positive lenses.

40. A zoom lens according to claim 35, wherein said rear lens subgroup comprises at least one cemented lens.

41. A zoom lens according to claim 35, wherein said zoom lens satisfies the following condition:

$$0.1 \leq D2/f1 \leq 0.6$$

where D2 is the air gap between said front and rear lens subgroups and f1 is the focal length of said first lens group.

42. A zoom lens according to claim 35, further comprising a stop between said first and second lens groups, wherein said stop moves together with said first lens group upon zooming, and stands still together with said front lens subgroup upon focusing.

43. A zoom lens according to claim 35, wherein at least one aspherical surface is arranged in said first lens group.

44. A zoom lens according to claim 35, wherein an aspherical surface is formed on at least one side of said negative lens in said front lens subgroup.

45. A zoom lens according to claim 39, wherein an aspherical surface is formed on an object side of said biconvex positive lens closest to the object side in said rear lens subgroup.

46. A zoom lens according to claim 35, wherein a lens of said front lens subgroup is a front-most lens of said zoom lens.

47. A wide-angle zoom lens with an angle of field exceeding 70° at a wide-angle end and comprising in the following order from the object side:

a first lens group having a positive refractive power, said first lens group consisting of, in the following order from the object side, a first lens component of a negative refractive power, a second lens component of a positive refractive power, a third lens component of a positive or negative refractive power, and a fourth lens component of a positive refractive power; and a second lens group having a negative refractive power, wherein an air gap between said first and second lens groups decreases upon zooming from the wide-angle end to a telephoto end, and said zoom lens satisfies the following conditions:

$$0 < f1/fL2 < 2.5$$

$$0.5 < f1/fL4 < 2.0$$

$$D/f1 < 0.84$$

where f1 is the focal length of said first lens group, fL2 is the focal length of said second lens component in said first lens group, fL4 is the focal length of said fourth lens component in said first lens group, and D is the on-axis distance from a lens surface closest to the object side to a lens surface closest to the image side in said first lens group.

* * * * *